United States Patent
Kacik et al.

(10) Patent No.: US 8,434,513 B2
(45) Date of Patent: May 7, 2013

(54) VALVE CARTRIDGE WITH LOW POINT OF CONTACT FOR INSTALLATION

(75) Inventors: Mark S. Kacik, Strongsville, OH (US); W. Randall Tucker, Oberlin, OH (US)

(73) Assignee: Moen Incorporated, North Olmsted, OH (US)

( * ) Notice: Subject to any disclaimer, the term of this patent is extended or adjusted under 35 U.S.C. 154(b) by 1263 days.

(21) Appl. No.: 12/023,784

(22) Filed: Jan. 31, 2008

(65) Prior Publication Data

US 2009/0025808 A1 Jan. 29, 2009

Related U.S. Application Data

(60) Provisional application No. 60/898,542, filed on Jan. 31, 2007.

(51) Int. Cl.
*F16K 11/06* (2006.01)

(52) U.S. Cl.
USPC ........................................... 137/625.4

(58) Field of Classification Search ............... 137/625.4, 137/625.41
See application file for complete search history.

(56) References Cited

U.S. PATENT DOCUMENTS

| | | | | | |
|---|---|---|---|---|---|
| 3,384,119 | A | * | 5/1968 | Manoogian | 137/625.17 |
| 3,805,842 | A | * | 4/1974 | Thompson et al. | 137/636.4 |
| 3,854,493 | A | * | 12/1974 | Farrell | 137/360 |
| 3,861,421 | A | * | 1/1975 | Thompson | 137/636.4 |
| 3,880,400 | A | * | 4/1975 | Cole et al. | 251/155 |
| 4,633,906 | A | * | 1/1987 | Tuchman | 137/625.17 |
| 4,736,772 | A | * | 4/1988 | Ostertag et al. | 137/625.17 |
| 4,768,749 | A | | 9/1988 | Oberdorfer | |
| 4,905,732 | A | * | 3/1990 | Bright et al. | 137/605 |
| 4,969,483 | A | * | 11/1990 | Knapp | 137/218 |
| 4,971,113 | A | | 11/1990 | Pawelzik et al. | |
| 5,060,692 | A | | 10/1991 | Pawelzik et al. | |
| 5,573,037 | A | * | 11/1996 | Cole et al. | 137/636.4 |
| 5,613,520 | A | * | 3/1997 | Knapp | 137/625.17 |
| 5,755,258 | A | | 5/1998 | Pawelzik | |
| 5,794,650 | A | | 8/1998 | Nikolayczik | |
| 6,070,611 | A | | 6/2000 | Becker | |
| 6,131,611 | A | | 10/2000 | Knapp | |
| 6,209,581 | B1 | | 4/2001 | Gyozo | |
| 6,405,756 | B2 | | 6/2002 | Creswell et al. | |
| 6,431,849 | B1 | | 8/2002 | Capodieci | |
| 6,575,196 | B1 | | 6/2003 | Creswell | |
| 6,757,921 | B2 | * | 7/2004 | Esche | 4/677 |
| 6,830,072 | B2 | | 12/2004 | Gautschi et al. | |
| 6,892,761 | B2 | | 5/2005 | Chen | |
| 7,044,162 | B2 | * | 5/2006 | Bolgar et al. | 137/625.17 |
| 7,063,106 | B2 | * | 6/2006 | Knapp | 137/625.4 |
| 7,819,137 | B2 | * | 10/2010 | Nelson et al. | 137/625.4 |
| 2001/0029984 | A1 | | 10/2001 | Creswell et al. | |
| 2003/0178071 | A1 | | 9/2003 | Gautschi et al. | |

OTHER PUBLICATIONS

International Search Report and Written Opinion dated Jun. 25, 2008, issued in application PCT/US08/052670 entitled Valve Cartridge With Low Point of Contact for Installation, filed on Jan. 31, 2008 by Moen Incorporated.

* cited by examiner

*Primary Examiner* — John Fox
(74) *Attorney, Agent, or Firm* — Calfee, Halter & Griswold LLP

(57) ABSTRACT

A one-handle valve cartridge has a low point of contact for installing the valve cartridge in a valve body. A retention nut bears down on the low point of contact to secure the valve cartridge in the valve body.

25 Claims, 59 Drawing Sheets

SECTION A-A

SECTION B-B

SECTION C-C

SECTION A-A

SECTION A-A

SECTION B-B

SECTION A-A

SECTION B-B

SECTION A-A

SECTION A-A

SECTION A-A

SECTION A-A

SECTION A-A

SECTION B-B

VALVE CARTRIDGE WITH LOW POINT OF CONTACT FOR INSTALLATION

RELATED APPLICATION

The present application is being filed as a non-provisional patent application claiming priority under 35 U.S.C. §119(e) from, and any other benefit of, U.S. Provisional Patent Application No. 60/898,542 filed on Jan. 31, 2007, the entire disclosure of which is herein incorporated by reference.

FIELD

The invention relates generally to valve cartridges and, more particularly, to a valve cartridge having a low point of contact for installing the valve cartridge in a valve body.

BACKGROUND

Typically, for a plumbing fixture (e.g., a faucet, a tub spout, a shower head), a valve body conveys water flowing from a main water source to a desired destination (e.g., a sink, a tub, a basin). The valve body generally has two water inlet passages through which cold water and hot water from the main water source can respectively flow. The valve body also has a water outlet passage through which the cold water, the hot water or a mixture of the cold and hot water can be discharged to an outlet portion of the plumbing fixture (e.g., a spout). In a one-handle version of the valve body, the valve body has a cavity for receiving a valve cartridge which allows a user to control the flow rate and the temperature of the water flowing through the water inlet passages to the water outlet passage using a single valve actuating mechanism.

One type of (conventional) valve cartridge is a structural assembly including a housing in which two or more disks, plates or the like are disposed. The disks are generally made of a hard material (e.g., ceramic or metal). At least one of the disks (i.e., a fixed disk) is fixed relative to the housing. Another of the disks (i.e., a movable disk) is disposed above the fixed disk and is movable relative to the fixed disk. The valve cartridge includes the actuating mechanism that is directly or indirectly connected at one end to the movable disk. Another end of the actuating mechanism extends through an opening in the housing for manipulation by a user. The end of the actuating mechanism extending through the opening in the housing can be connected to a handle, knob or the like to assist the user in operating the valve cartridge.

In a one-handle version of this type of valve cartridge for use in the one-handle version of the valve body, the fixed disk includes two inlet openings (i.e., a cold water inlet opening and a hot water inlet opening) that substantially align with the water inlet passages of the valve body when the valve cartridge is installed in the valve body. Furthermore, the fixed disk includes an outlet opening that substantially aligns with the water outlet passage of the valve body when the valve cartridge is installed in the valve body. The actuating mechanism is connected to the movable disk via a coupling. The actuating mechanism can be pivoted to cause translational movement of the movable disk. The actuating mechanism can be rotated to cause angular movement of the movable disk.

In this manner, the movable disk can assume different positions relative to the fixed disk. In particular, pivoting of the actuating mechanism changes the flow rate of the water from zero to a maximum flow rate, whereas rotation of the actuating mechanism changes the temperature of the water. Accordingly, a one-handle actuating mechanism can control both the flow rate and the temperature of the water flowing through the valve cartridge.

The valve cartridge also includes one or more seals for preventing water from leaking out of the valve cartridge. The seals can be located, for example, below, between and/or above the disks in the valve cartridge. When the valve cartridge is installed in the valve body, a retention nut is used to secure the valve cartridge in the valve body. The retention nut engages an installation ledge of the housing of the valve cartridge such that the seals in the valve cartridge are compressed and, thus, apply a loading force to the components (including the disks) in the valve cartridge. Accordingly, the fixed disk and the movable disk are kept in water tight contact after installation of the valve cartridge in the valve body.

Typically, the conventional valve cartridge has the installation ledge formed high on the housing of the valve cartridge, for example, near an upper opening of the valve cartridge. The high installation ledge forms the point of contact between the retention nut and the valve cartridge when the valve cartridge is installed in the valve body.

As one example, a conventional valve cartridge 100 is illustrated in FIGS. 1A-1C and also illustrated in U.S. Pat. No. 7,063,106. As shown in FIGS. 1A-1B, the conventional valve cartridge 100 has several discrete components including a housing 102, a lower seal 104, a bottom member 106, an upper seal 108, a fixed plate 110, a mobile plate 112, a carrier 114, a rotatable support member 116, an operating lever 118 and a cover 120. The housing 102 has a tubular shape for receiving the remaining components of the valve cartridge 100.

The operating lever 118 is part of the actuating mechanism of the valve cartridge 100. The operating lever 118 is connected to the rotatable support member 116 via a pin 122. A lower surface of the rotatable support member 116 rests on an upper surface of the carrier 114. The rotatable support member 116 can rotate relative to the housing 102. A portion of the operating lever 118 extends below the rotatable support member 116 and into the housing 102 which facilitates connecting the operating lever 118 to the mobile plate 112, as described below. A portion of the operating lever 118 extends above the rotatable support member 116 and out of the housing 102 which facilitates connecting the operating lever 118 to an operating member (not shown), such as a handle, a knob or the like.

The housing 102 has an internal shoulder 124 formed near a lower opening of the housing 102, wherein the internal shoulder 124 is shaped to receive a correspondingly shaped portion of the bottom member 106. The cover 120 has teeth 126 that snap fit into openings 128 formed near an upper opening of the housing 102. Accordingly, the lower opening of the housing 102 is closed by the bottom member 106 and the upper opening of the housing 102 is closed by the cover 120, thereby securing the components in the valve cartridge 100.

The fixed plate 110 has a pair of water inlet passages 130 and a water outlet passage 132. The fixed plate 110 is disposed above the bottom member 106. The mobile plate 112 is supported on top of the fixed plate 110 and can slide on top of the fixed plate 110. The mobile plate 112 includes a mixing chamber 134 for mixing cold and hot water flowing into the valve cartridge 100 through the respective water inlet passages 130 in the fixed plate 110. The mixed water then flows out of the valve cartridge 100 through the water outlet passage 132 in the fixed plate 110.

The carrier 114 and the rotatable support member 116 function to translate movement of the of the operating lever 118 into movement of the mobile plate 112. A lower portion of the carrier 114 engages an upper portion of the mobile plate 112. An upper portion of the carrier 114 has a recess 136 for receiving a lower end 138 of the operating lever 118, thereby connecting the operating lever 118 (which is connected to the rotatable support member 116 via the pin 122) to the carrier 114 and the mobile plate 112.

The lower seal 104 fits in a recess on a lower surface of the bottom member 106 and the upper seal 108 fits into a recess on an upper surface of the bottom member 106. The lower seal 104 forms a water tight seal between a valve body 140 in which the valve cartridge 100 is installed and the bottom member 106 (see FIG. 1C). The upper seal 108 forms a water tight seal between the bottom member 106 and the fixed plate 110 (see FIG. 1B). The lower seal 104 and the upper seal 108 prevent water from leaking out of the valve cartridge 100.

As shown in FIG. 1C, when the valve cartridge 100 is installed in the valve body 140 of the plumbing fixture 142 (e.g., a faucet), a retention nut 144 is used to secure the valve cartridge 100 in the valve body 140. The retention nut 144 engages an installation ledge 146 formed on the cover 120 of the housing 102 of the valve cartridge 100 such that the seals 104 and 108 in the valve cartridge 100 are compressed and, thus, apply a loading force to the components (including the fixed plate 110 and the mobile plate 112) in the valve cartridge 100. Accordingly the fixed plate 110 and the mobile plate 112 are kept in water tight contact after installation of the valve cartridge 100 in the valve body 140.

The position and the orientation of the mobile plate 112 relative to the fixed plate 110 are controlled by the operating lever 118 projecting out of the housing 102. In particular, the operating lever 118 can be pivoted within the rotatable support member 116 about the pin 122 and can cause the rotatable support member 116 to rotate by rotation of the operating lever 118. The operating member (not shown) can be connected to the operating lever 118 to facilitate manipulation of the operating lever 118 by the user. Accordingly, after the valve cartridge 100 is installed in the valve body 140, the user can manipulate the operating member which moves the operating lever 118 to change the position and/or orientation of the mobile plate 112 relative to the fixed plate 110, thereby controlling the flow rate and/or the temperature of the water flowing through the valve cartridge 100 and out the plumbing fixture 142, such as through a spout 148 (see FIG. 1C).

The installation ledge 146 is formed on the cover 120 so as to be disposed high on the valve cartridge 100. As noted above, the retention nut 144 engages the installation ledge 146 to secure the valve cartridge 100 in the valve body 140. In this manner, the seals 104 and 108 are compressed and a loading force resulting from the compression of the seals 104 and 108 is transmitted up to the components in the valve cartridge 100.

The high installation ledge 146 of the valve cartridge 100, however, has several drawbacks. For example, the high installation ledge 146 results in less freedom in the design of plumbing fixtures for receiving the valve cartridge 100. Furthermore, the high installation ledge 146 can result in increased costs, as a height of sidewalls 150 of the valve body 140 is often at least as high as the installation ledge 146.

Consequently, there is a need in the art for a valve cartridge having a low point of contact for installing the valve cartridge in a valve body.

SUMMARY

In view of the above, it is an exemplary aspect to provide a valve cartridge having a housing with a low point of contact formed on the housing for installing the valve cartridge in a valve body.

It is another exemplary aspect to provide a valve cartridge having a housing with at least one installation ledge formed on the housing, wherein a ratio of a height of a highest installation ledge of the housing to a largest outer diameter of the housing is less than or equal to 0.53.

It is yet another exemplary aspect to provide a valve cartridge having a housing with at least one installation ledge formed on the housing, wherein a ratio of a height of a highest installation ledge of the housing to a largest outer diameter of the housing is less than or equal to 0.50.

It is still another exemplary aspect to provide a valve cartridge having a housing with at least one installation ledge formed on the housing, wherein a ratio of a height of a highest installation ledge of the housing to a largest outer diameter of the housing is less than or equal to 0.41.

It is another exemplary aspect to provide a valve cartridge having a housing with at least one installation ledge formed on the housing, wherein a ratio of a height of a highest installation ledge of the housing to a height of the housing is less than or equal to 0.49.

It is yet another exemplary aspect to provide a valve cartridge having a housing with at least one installation ledge formed on the housing, wherein a ratio of a height of a highest installation ledge of the housing to a height of the housing is less than or equal to 0.39.

It is still another exemplary aspect to provide a valve cartridge having a housing with at least one installation ledge formed on the housing, wherein a ratio of a height of a highest installation ledge of the housing to a height of a pin of the valve cartridge is less than or equal to 0.67.

It is another exemplary aspect to provide a valve cartridge having a housing with at least one installation ledge formed on the housing, wherein a ratio of a height of a highest installation ledge of the housing to a height of a pin of the valve cartridge is less than or equal to 0.55.

It is yet another exemplary aspect to provide a valve cartridge having a housing with at least one installation ledge formed on the housing, wherein a highest installation ledge of the housing is below an actuating mechanism of the valve cartridge.

It is still another exemplary aspect to provide a valve cartridge having a housing with at least one installation ledge formed on the housing, wherein a highest installation ledge of the housing is below an actuating mechanism of the valve cartridge and above a mixing chamber of the valve cartridge.

It is another exemplary aspect to provide a valve cartridge having a housing with at least one installation ledge formed on the housing, wherein a highest installation ledge of the housing is below an actuating mechanism of the valve cartridge and above a fixed disk of the valve cartridge. The highest installation ledge of the housing can extend over a portion of the fixed disk.

It is yet another exemplary aspect to provide a valve cartridge having a housing with at least one installation ledge formed on the housing, wherein a height of a highest installation ledge of the housing is between 0.641 and 0.651 inches.

It is still another exemplary aspect to provide a valve cartridge having a housing with at least one installation ledge formed on the housing, wherein a height of a highest installation ledge of the housing is between 0.486 and 0.494 inches.

BRIEF DESCRIPTION OF THE DRAWINGS

The above aspects and additional aspects, features and advantages will become readily apparent by describing in detail exemplary embodiments thereof with reference to the attached drawings, wherein like reference numerals denote like elements, and:

FIG. 1A shows the valve cartridge in unassembled form, as a cross-section. FIG. 1B shows the valve cartridge of FIG. 1A in assembled form, as a cross-section. FIG. 1C shows the valve cartridge of FIG. 1B after installation in a plumbing fixture, as a cross-section.

FIG. 3A is a perspective view of the housing. FIG. 3B is a side elevational view of the housing. FIG. 3C is a cross-sectional view of the housing shown in FIG. 10A, along line A-A. FIG. 3D is a cross-sectional view of the housing shown in FIG. 10A, along line B-B. FIG. 3E is a cross-sectional view of the housing of FIG. 3C, along line C-C.

FIG. 5A is a perspective view of the spring. FIG. 5B is a plan view of the spring. FIG. 5C is a side elevational view of the spring.

FIG. 6A is a perspective view of the bushing. FIG. 6B is a side elevational view of the bushing. FIG. 6C is a bottom view of the bushing. FIG. 6D is a cross-sectional view of the bushing of FIG. 6C, along line A-A.

FIG. 7A is a perspective view of the flow plate. FIG. 7B is a plan view of the flow plate. FIG. 7C is a cross-sectional view of the flow plate of FIG. 7B, along line A-A. FIG. 7D is a cross-sectional view of the flow plate of FIG. 7B, along line B-B.

FIG. 9A is a top perspective view of the base seal. FIG. 9B is a bottom perspective view of the base seal.

FIG. 10A is a plan view of the valve cartridge in assembled form. FIG. 10B is a cross-sectional view of the valve cartridge of FIG. 10A, along line A-A. FIG. 10C is a cross-sectional view of the valve cartridge of FIG. 10A, along line B-B.

FIG. 13A is a perspective view of the upper housing. FIG. 13B is a side elevational view of the upper housing. FIG. 13C is a cross-sectional view of the upper housing of FIG. 13B, along line A-A.

FIG. 15A is a perspective view of the spring. FIG. 15B is a plan view of the spring. FIG. 15C is a cross-sectional view of the spring of FIG. 15B, along line A-A.

FIG. 16A is a side elevational view of the bushing. FIG. 16B is a cross-sectional view of the bushing of FIG. 16A along line A-A. FIG. 16C is a plan view of the bushing.

FIG. 17A is a perspective view of the carrier. FIG. 17B is a plan view of the carrier. FIG. 17C is a bottom view of the carrier. FIG. 17D is a side elevational view of the carrier.

FIG. 18A is a plan view of the movable disk. FIG. 18B is a cross-sectional view of the movable disk of FIG. 18A, along line A-A. FIG. 18C is a bottom view of the movable disk.

FIG. 19A is a top perspective view of the fixed disk. FIG. 19B is a bottom perspective view of the fixed disk. FIG. 19C is a plan view of the fixed disk. FIG. 19D is a bottom view of the fixed disk.

FIG. 20A is a top perspective view of the base seal. FIG. 20B is a plan view of the base seal.

FIG. 21A is a top perspective view of the lower housing. FIG. 21B is a bottom perspective view of the lower housing. FIG. 21C is a plan view of the lower housing. FIG. 21D is a bottom view of the lower housing.

FIG. 22A is a plan view of the valve cartridge in assembled form. FIG. 22B is a cross-sectional view of the valve cartridge of FIG. 22A, along line A-A. FIG. 22C is a cross-sectional view of the valve cartridge of FIG. 22A, along line B-B.

DETAILED DESCRIPTION

Figure 1A:
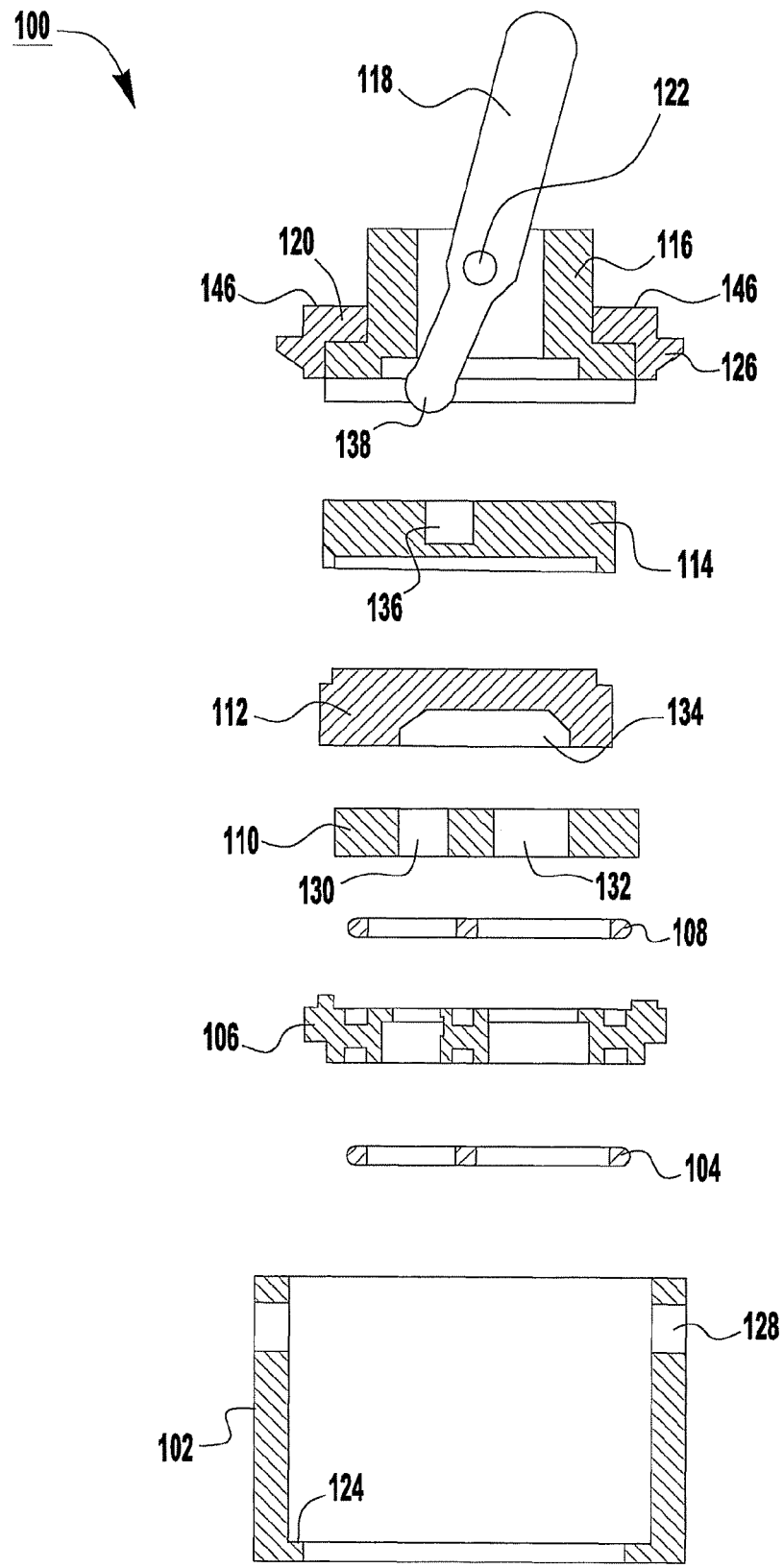
FIGS. 1A-1C show a conventional valve cartridge in which a point of contact between the valve cartridge and a retention nut for securing the valve cartridge in a valve body is high.
Figure 1B:
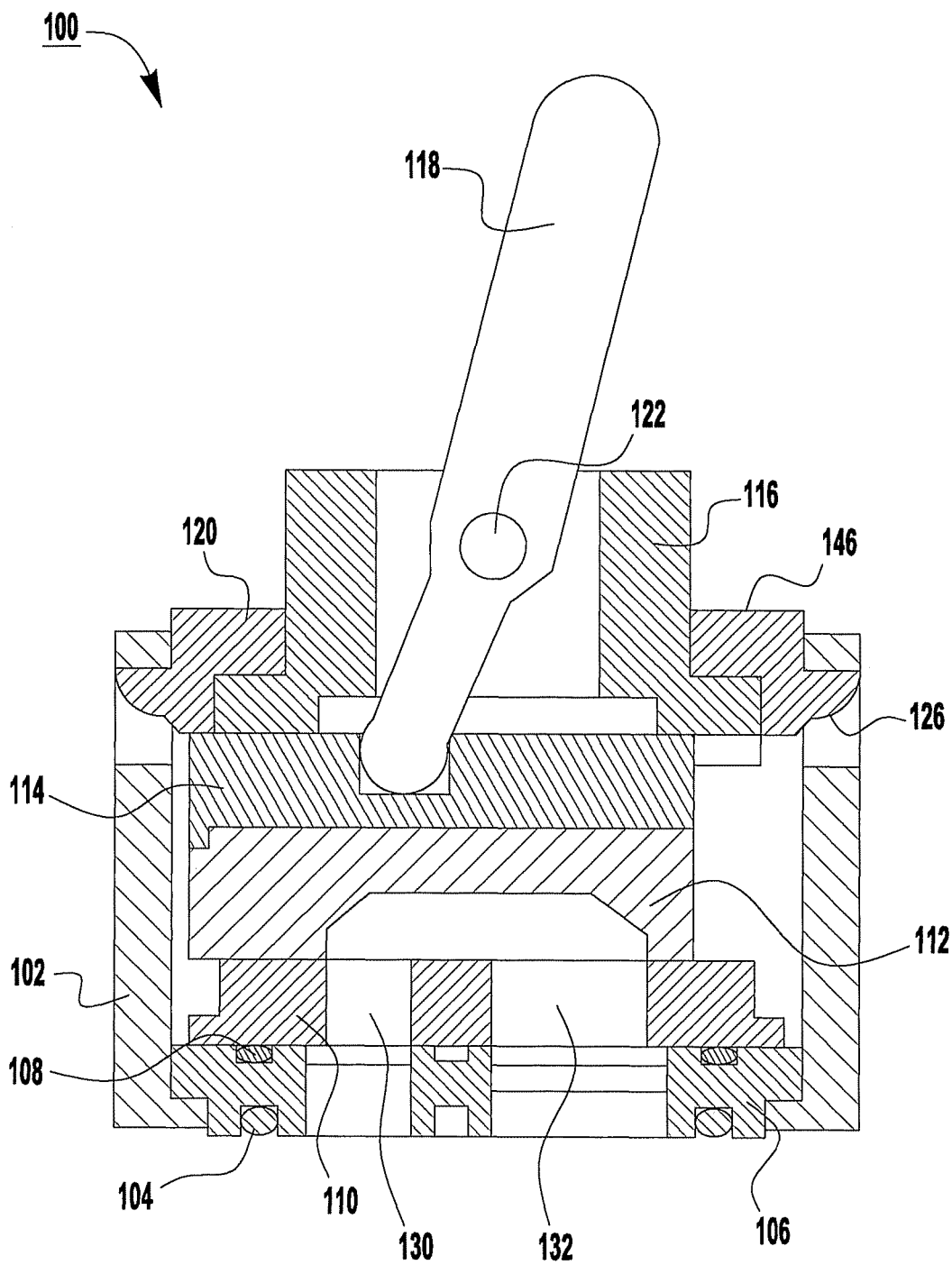
Figure 1C:
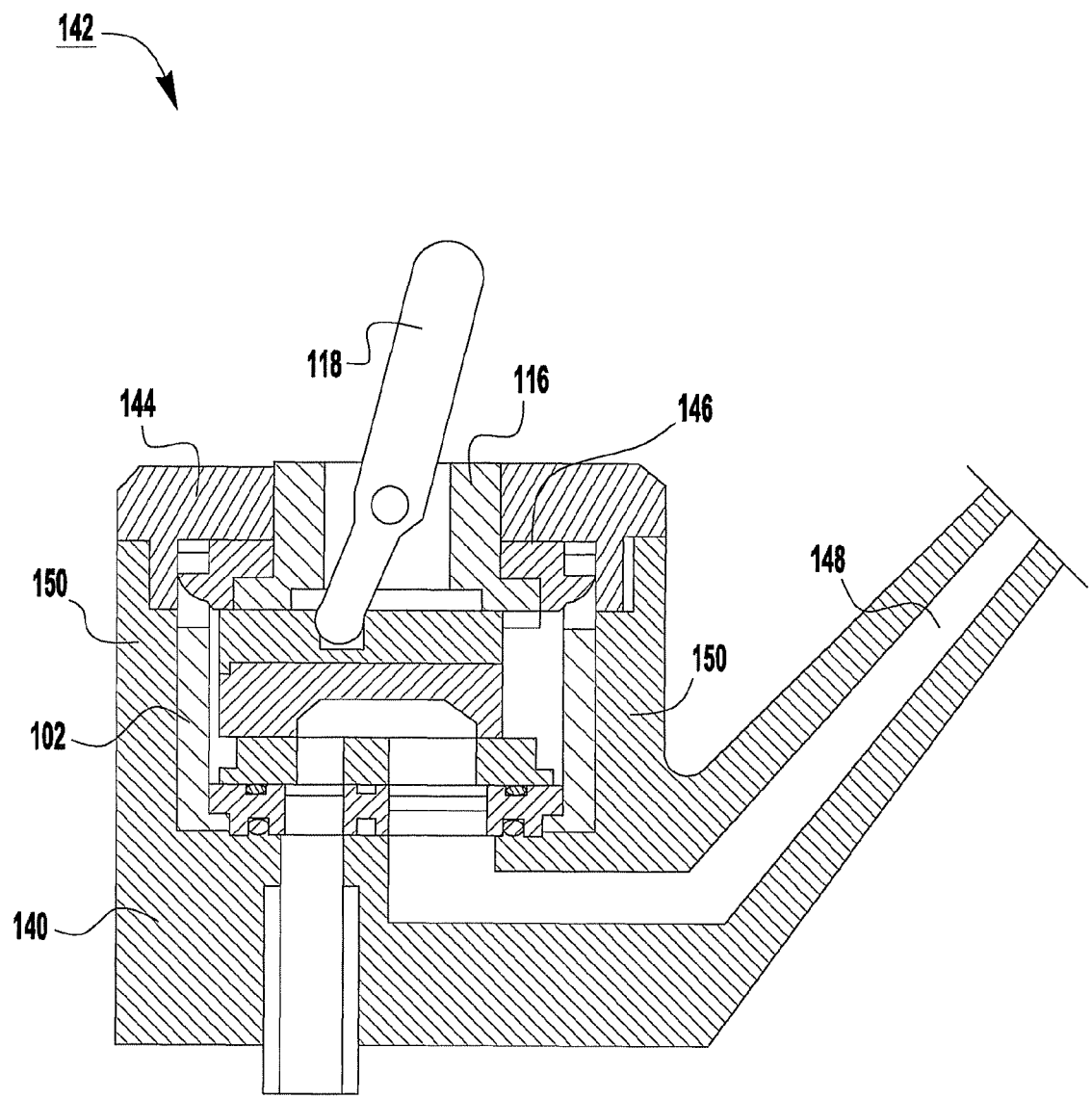
Figure 2:
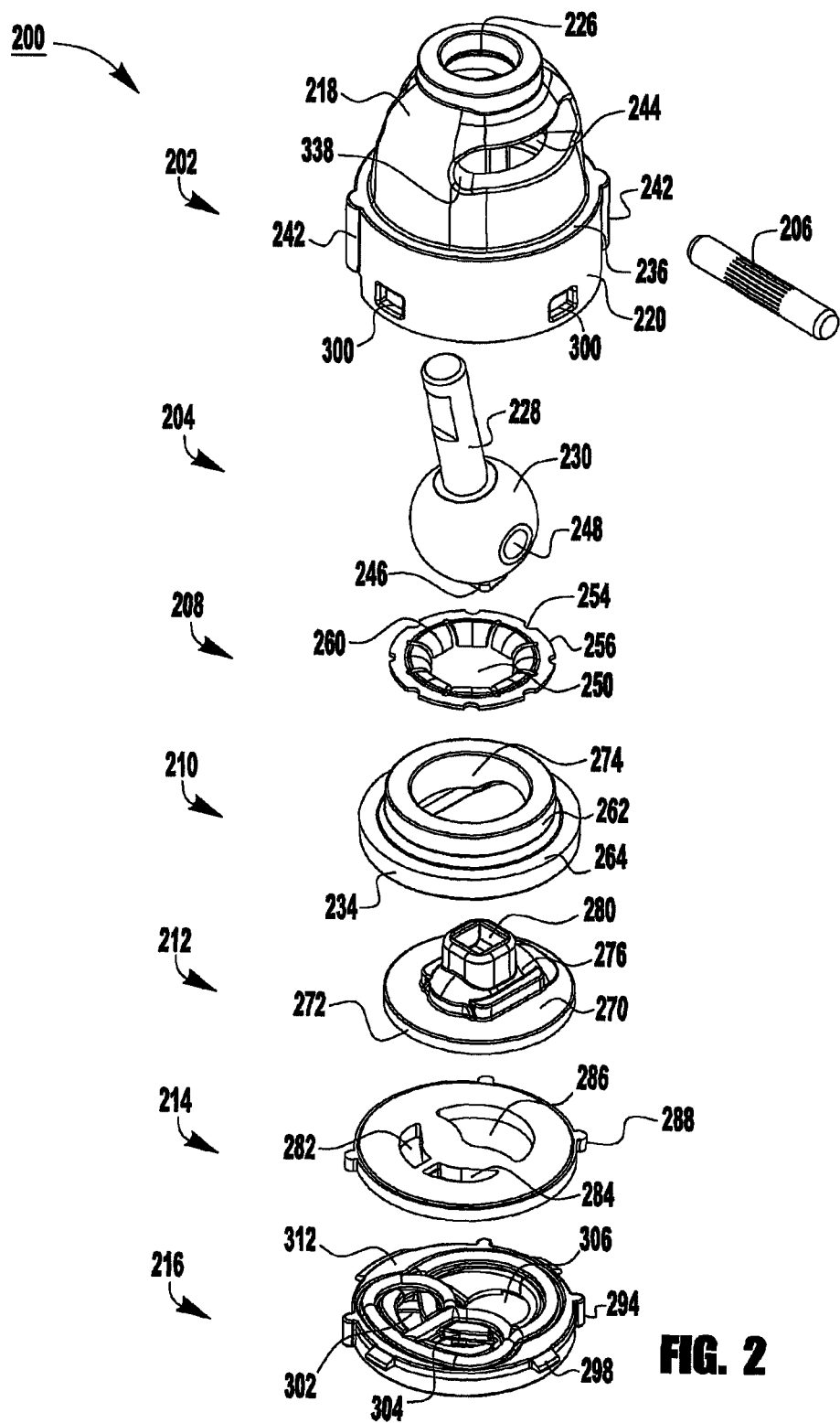
FIG. 2 is a perspective exploded view of a valve cartridge, according to an exemplary embodiment.
Figure 3A:
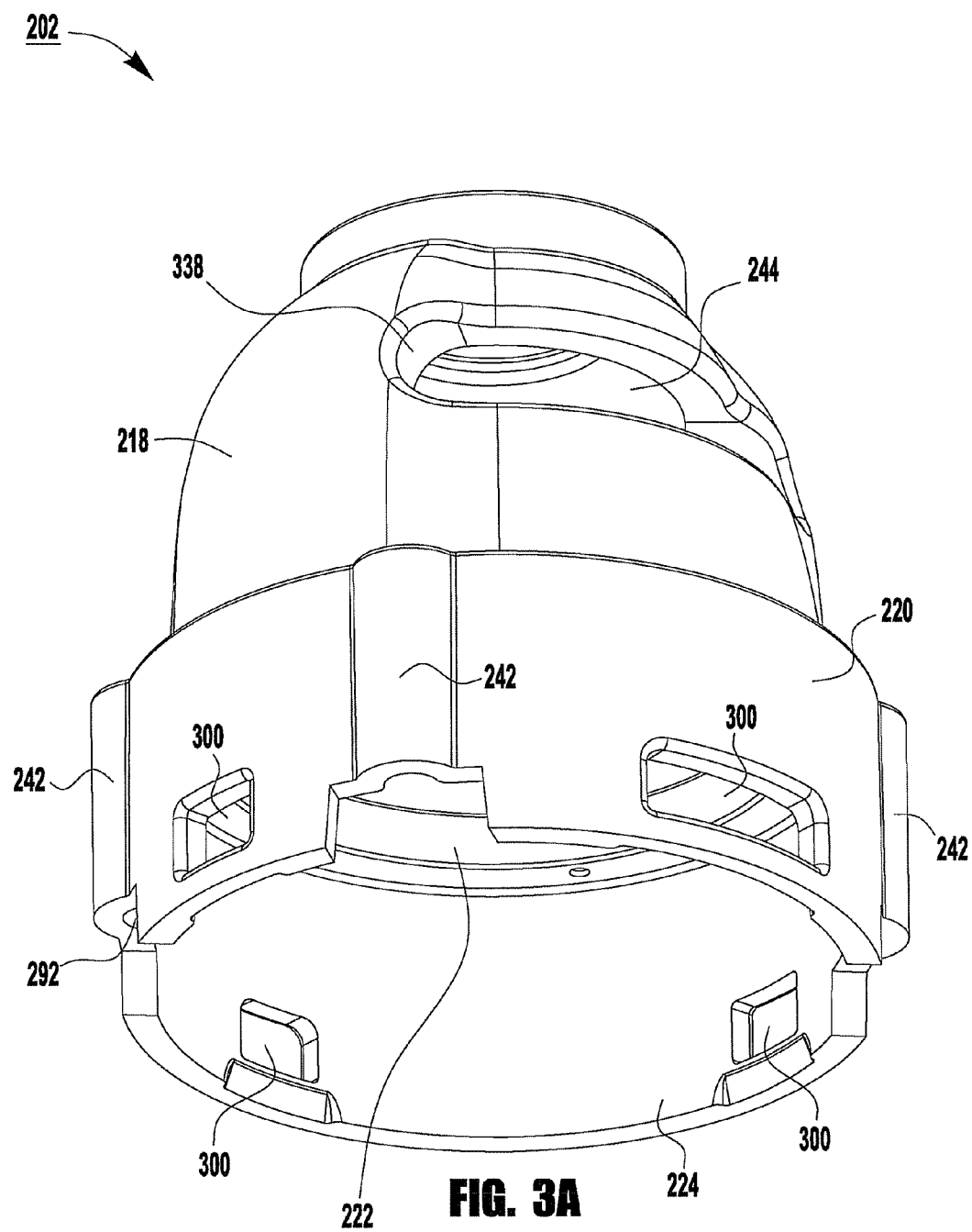
FIGS. 3A-3E show an exemplary housing used in the exemplary valve cartridge of FIG. 2.
Figure 3B:
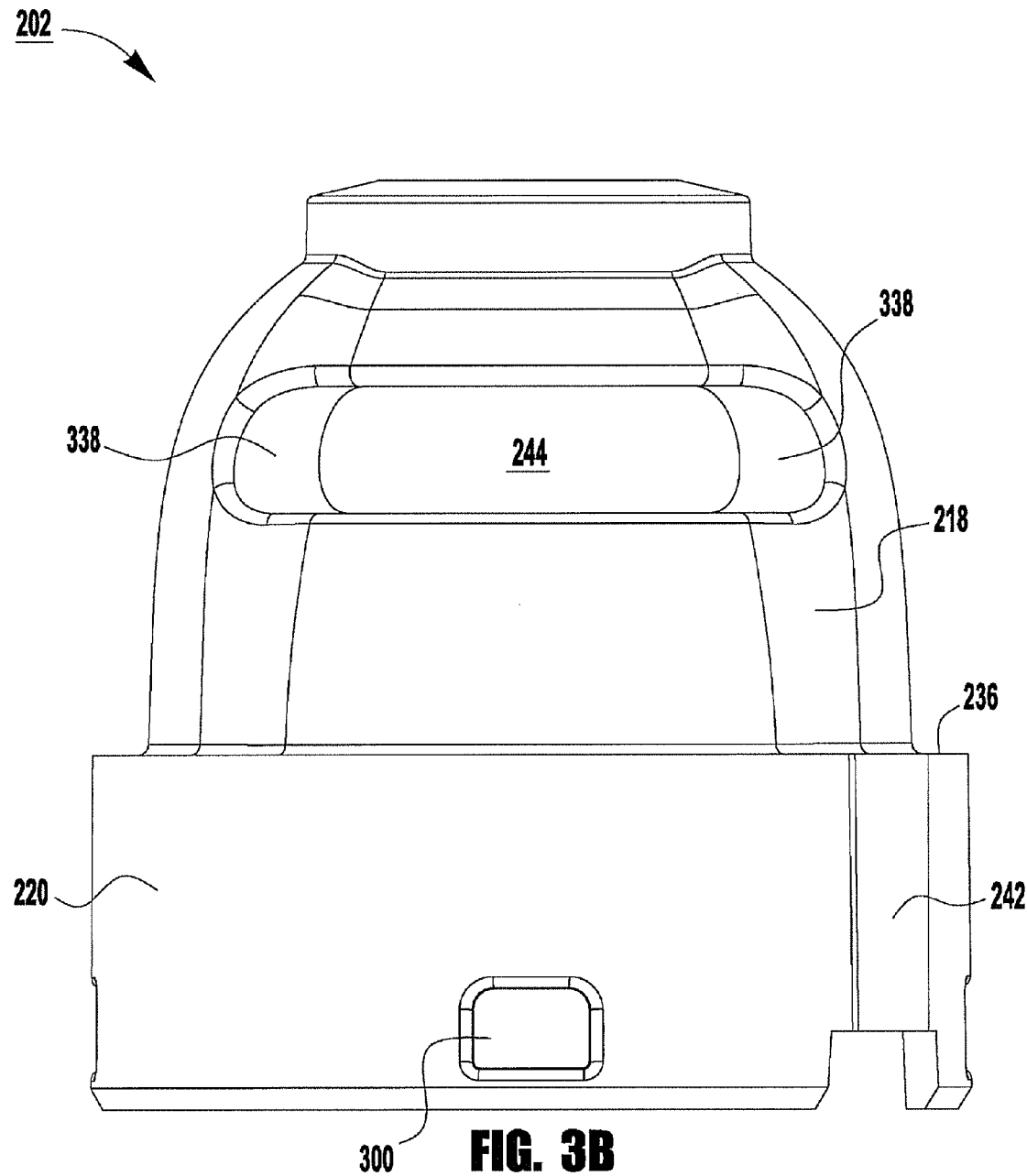
Figure 3C:
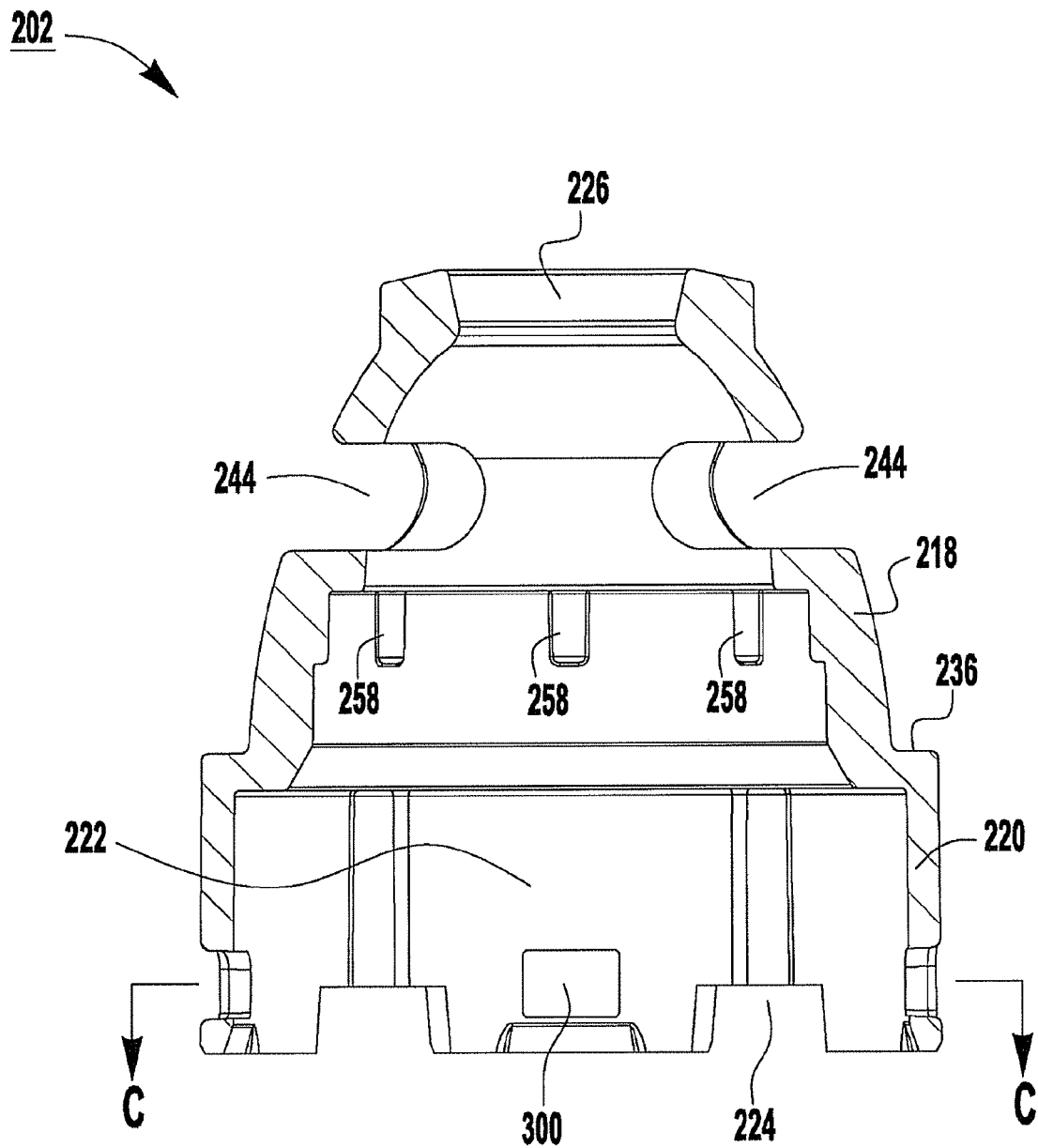
Figure 3D:
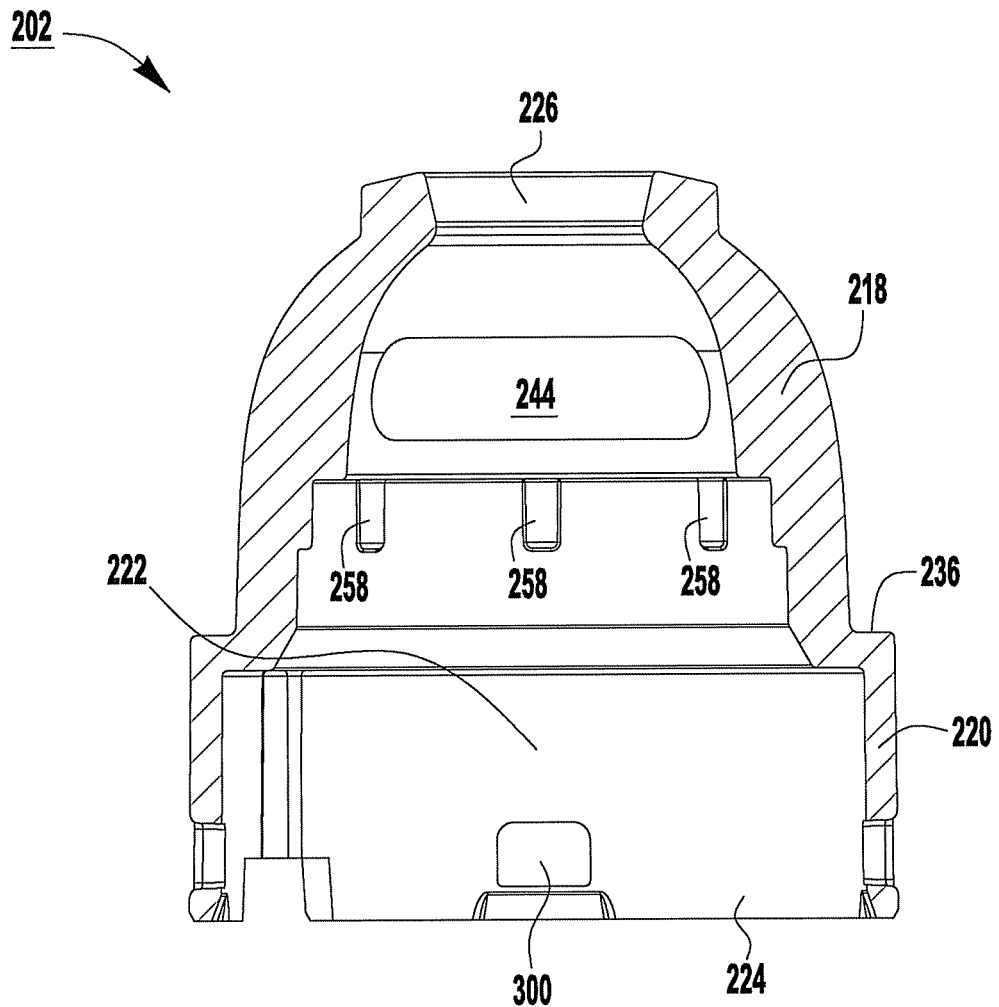
Figure 3E:
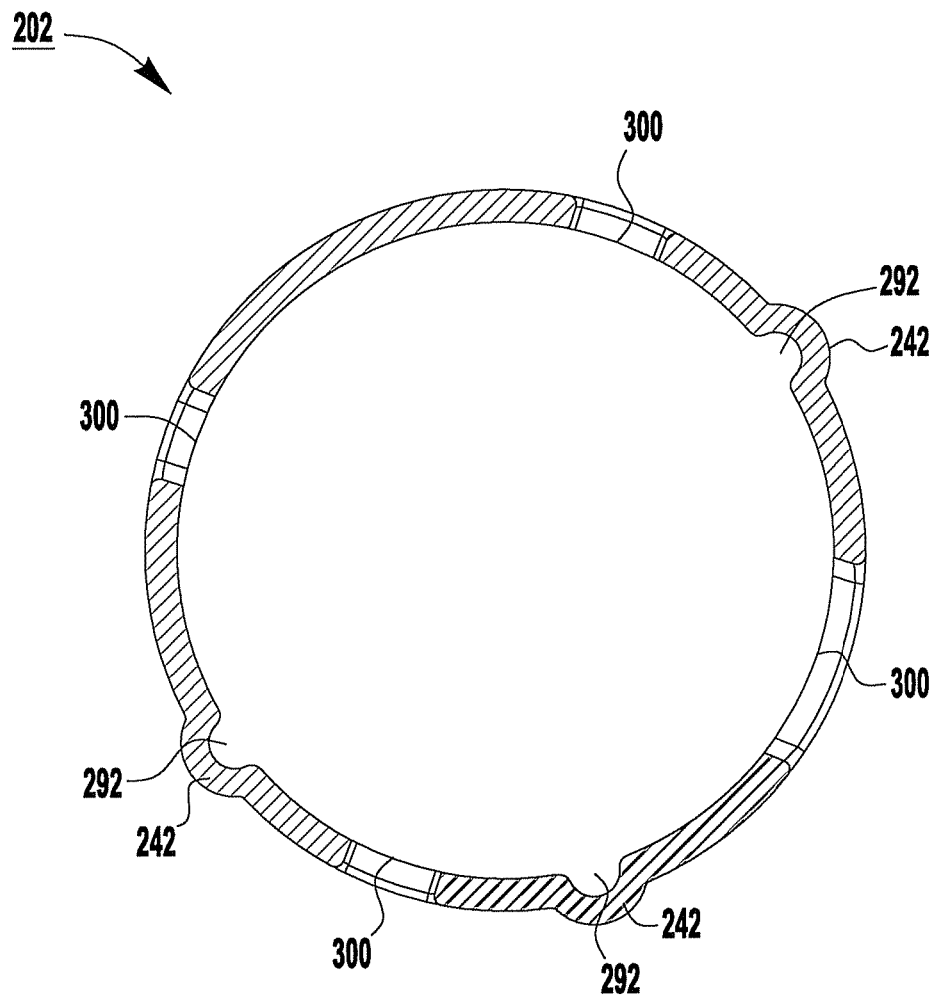

While the general inventive concept is susceptible of embodiment in many different forms, there are shown in the drawings and will be described herein in detail specific embodiments thereof with the understanding that the present disclosure is to be considered as an exemplification of the principles of the general inventive concept. Accordingly, the general inventive concept is not intended to be limited to the specific embodiments illustrated herein.

A one-handle valve cartridge 200, according to an exemplary embodiment, has a low point of contact for securing the valve cartridge 200 in a valve body 240. Accordingly, the valve cartridge 200 may overcome the drawbacks of conventional valve cartridges having a high point of contact.

As shown in FIGS. 2 and 10A-10C, the exemplary valve cartridge 200 has several discrete components including a housing 202, a ball-stem 204, a pin 206, a spring 208, a bushing 210, a flow plate 212, a manifold 214 and a base seal 216. The flow plate 212 and/or the manifold 214 can be made of a hard material. For example, the flow plate 212 and/or the manifold 214 can be made of stainless steel. The housing 202, for example, can be made of plastic or metal.

As shown in FIGS. 3A-3E, the housing 202 has a domed portion 218 and a cylindrical portion 220. A cavity 222 is formed in the housing 202 for receiving the remaining components of the valve cartridge 200. The cavity 222 extends inside the domed portion 218 and the cylindrical portion 220 of the housing 202. The cylindrical portion 220 of the housing 202 includes a lower opening 224 through which the components can be inserted into the housing 202. The domed portion 218 of the housing 202 includes an upper opening 226 through which a stem portion 228 of the ball-stem 204 extends. The cavity 222 in the housing 202 is wider near the lower opening 224 than near the upper opening 226. A portion of the cavity 222 near the upper opening 226 of the housing 202 receives a ball portion 230 of the ball-stem 204. Accordingly, a first inner surface 232 of the portion of the cavity 222 near the upper opening 226 has a shape that substantially conforms to a shape of the ball portion 230 of the ball-stem 204 (see FIGS. 10B-10C and 11).

A portion of the cavity 222 near the lower opening 224 of the housing 202 receives the bushing 210, the flow plate 212, the manifold 214 and the base seal 216. A diameter of the cavity 222 near the lower opening 224 is substantially the same as a diameter of the base seal 216, the manifold 214 and a flat annular portion 234 of the bushing 210, such that only a small gap is present between these components and the housing 202 when the components are received in the housing 202.

A portion of the housing 202 where the domed portion 218 meets the cylindrical portion 220 forms an installation ledge 236 on an outer surface of the housing 202. The installation ledge 236 is substantially below the upper opening 226 of the housing 202. A retention nut 238 engages the installation ledge 236 to secure the valve cartridge 200 in a valve body 240 (see FIG. 11). Furthermore, the housing 202 has one or more keys 242 that each engage a complementary-shaped recess (not shown) in the valve body 240 to prevent rotation of the housing 202 relative to the valve body 240 after the valve cartridge 200 is installed. The one or more keys 242 can have a lobular shape. The housing 202 also includes a pair of slots 244 formed on opposing sides of the housing 202 that interface with distal ends of the pin 206 to function as temperature-limit stops, as described below.

Figure 4:
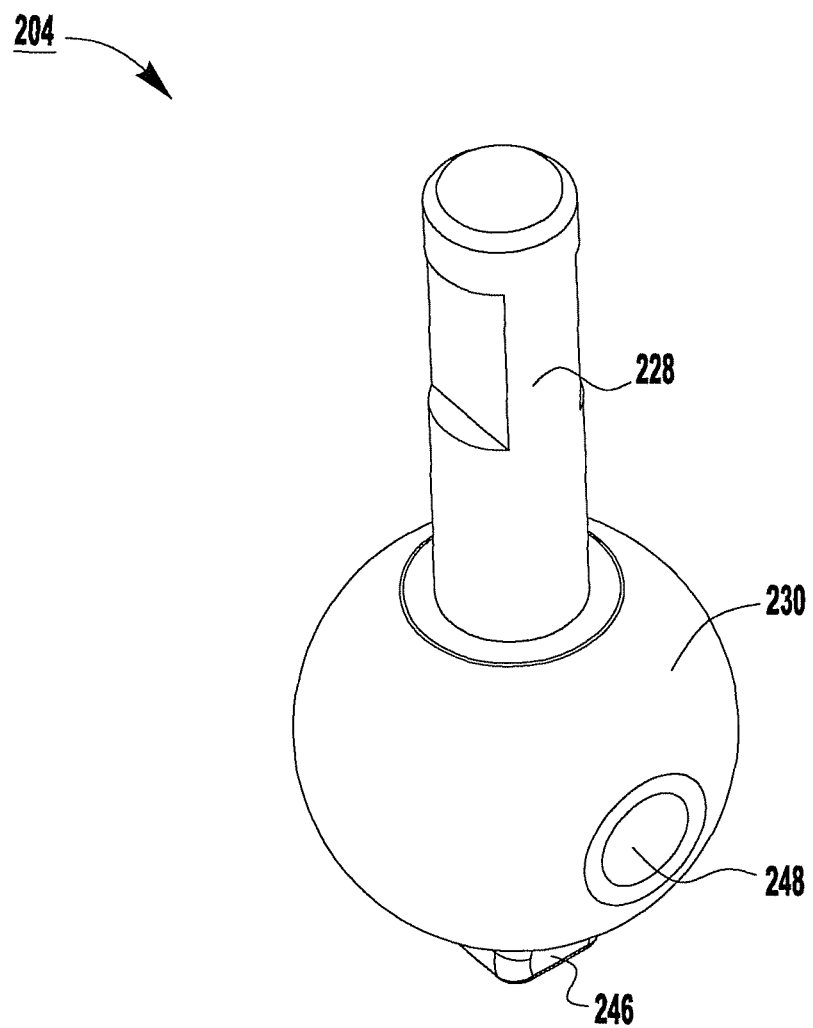
FIG. 4 is a perspective view of an exemplary ball-stem of the exemplary valve cartridge of FIG. 2.

As shown in FIG. 4, the ball-stem 204 is the actuating mechanism for the valve cartridge 200. The ball-stem 204 includes the ball portion 230 and the stem portion 228. The ball portion 230 and the stem portion 228 can be discrete components or can be formed integrally. The ball portion 230 includes a projection 246 extending from a side of the ball portion 230 that is opposite a side of the ball portion 230 from which the stem portion 228 extends. The projection 246 acts as a coupling device for connecting the ball-stem 204 to the flow plate 212, as described below. The ball portion 230 and the projection 246 can be discrete components or can be formed integrally.

A bore 248 is formed through a center of the ball portion 230 of the ball-stem 204. The bore 248 is orthogonal to the stem portion 228 of the ball-stem 204. After the ball-stem 204 is inserted into the cavity 222 of the housing 202, the pin 206 can be inserted through one of the slots 244 in the housing 202 and into the bore 248 of the ball-stem 204. In this manner, the pin 206 retains the ball-stem 204 in the housing 202.

Figure 5A:
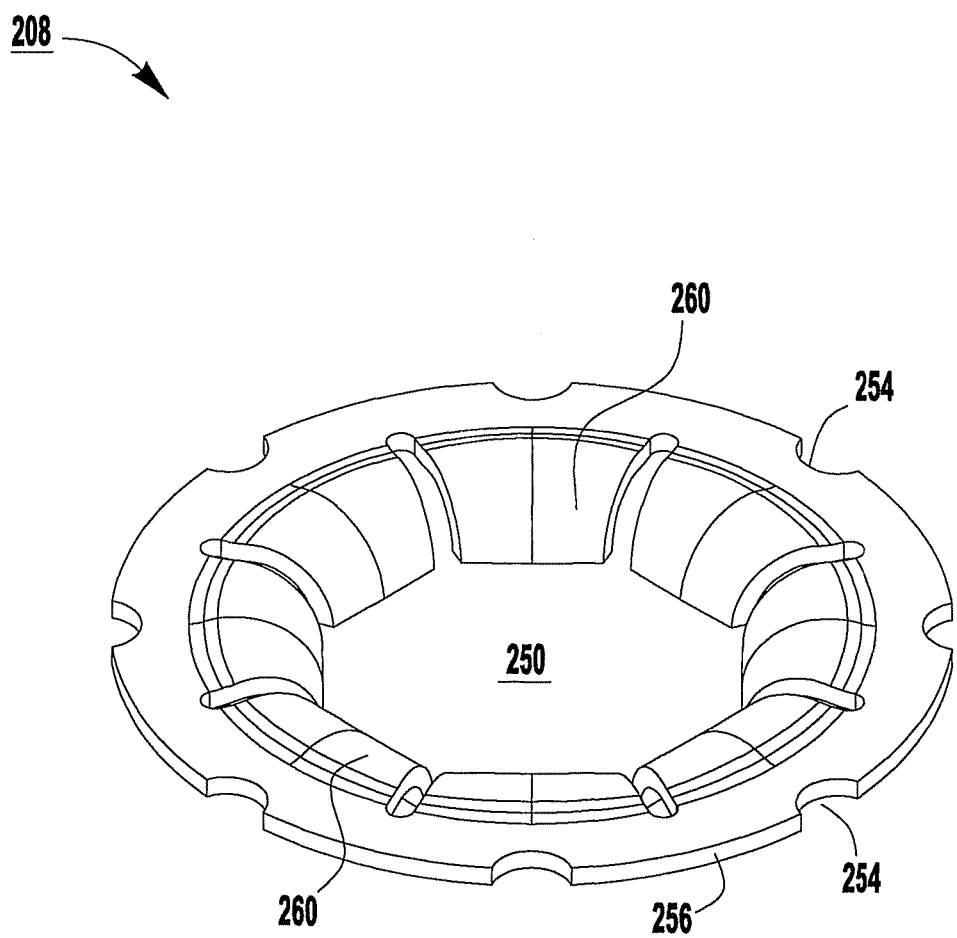
FIGS. 5A-5C show an exemplary spring used in the exemplary valve cartridge of FIG. 2.
Figure 5B:
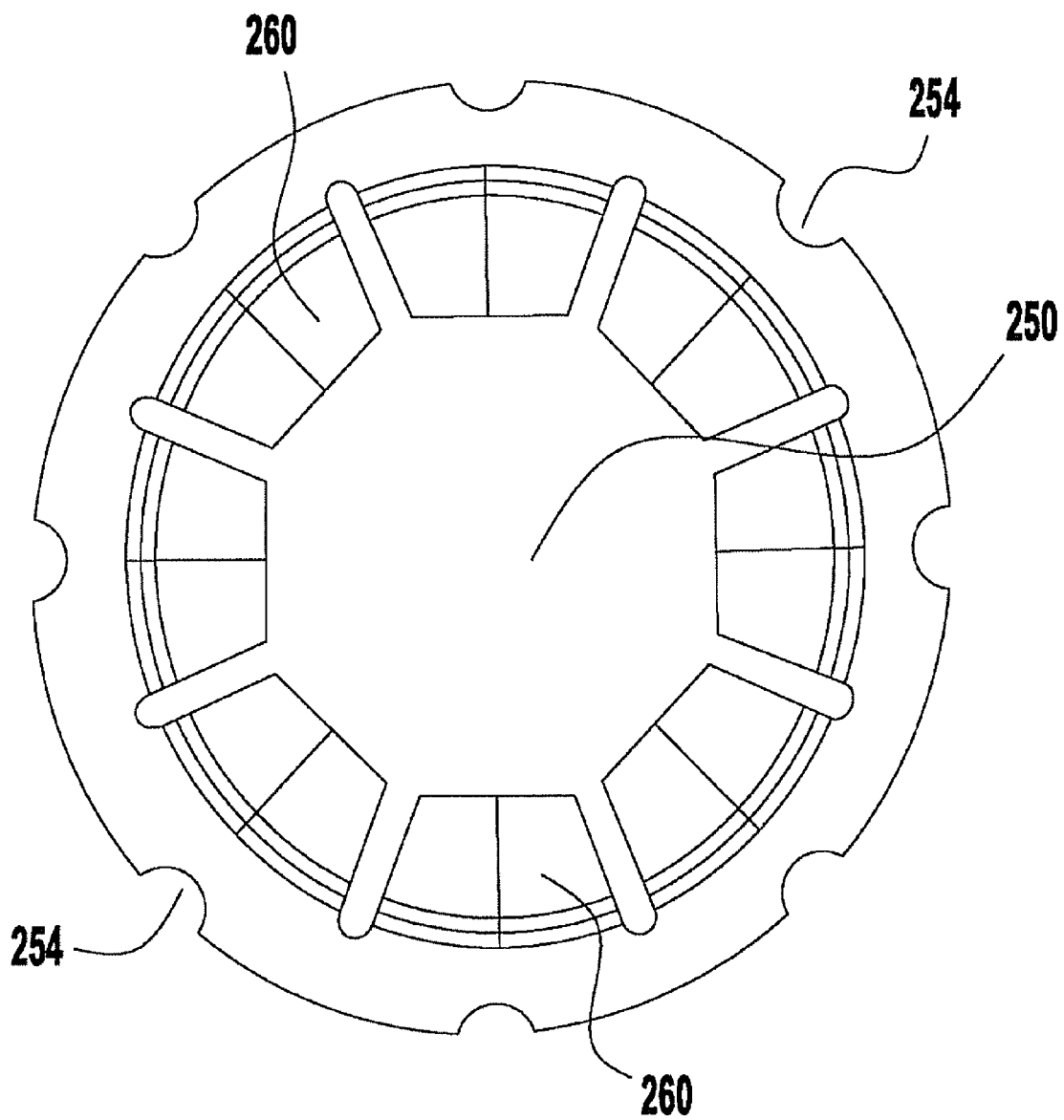
Figure 5C:
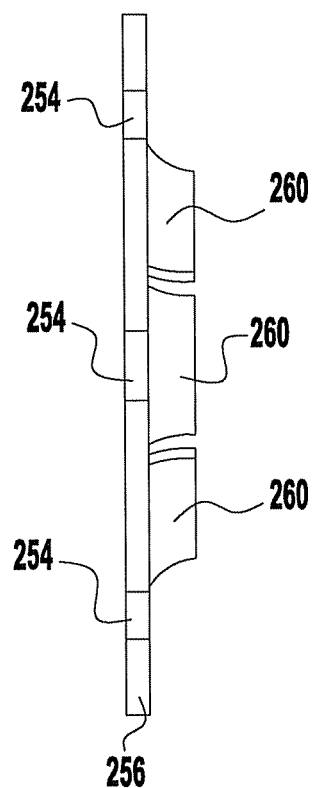
Figure 6A:
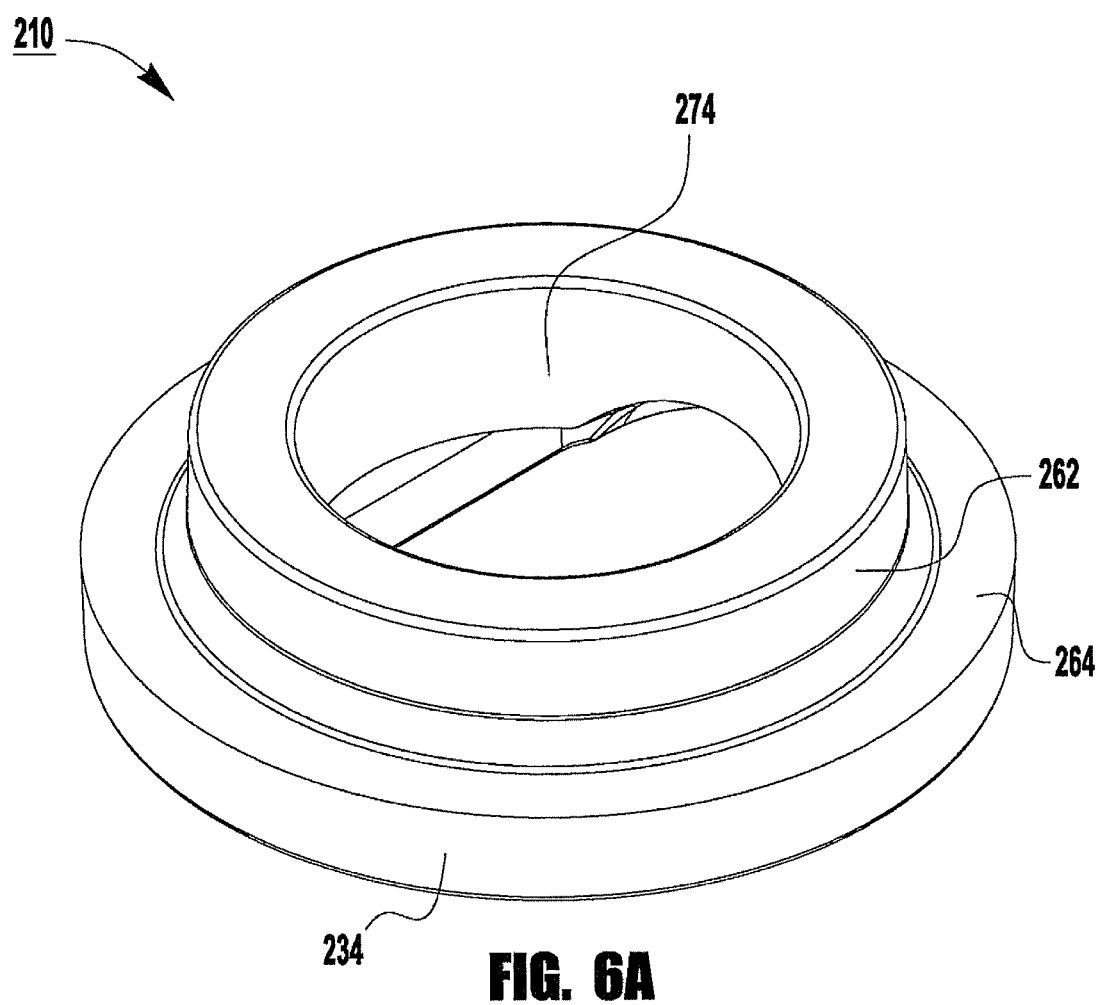
FIGS. 6A-6D show an exemplary bushing used in the exemplary valve cartridge of FIG. 2.
Figure 6B:
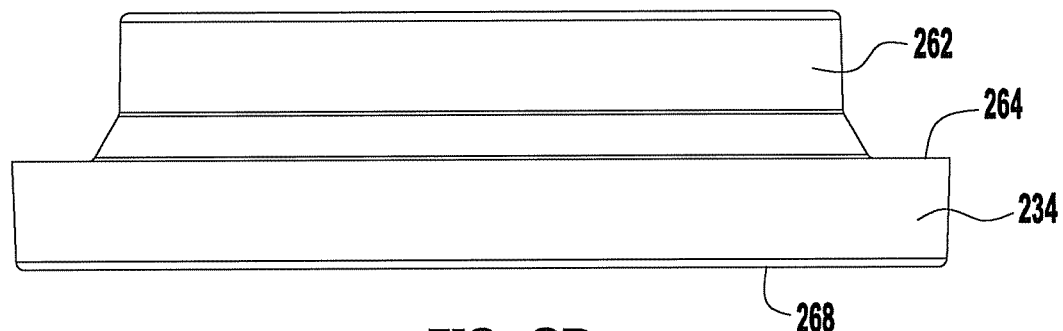
Figure 6C:
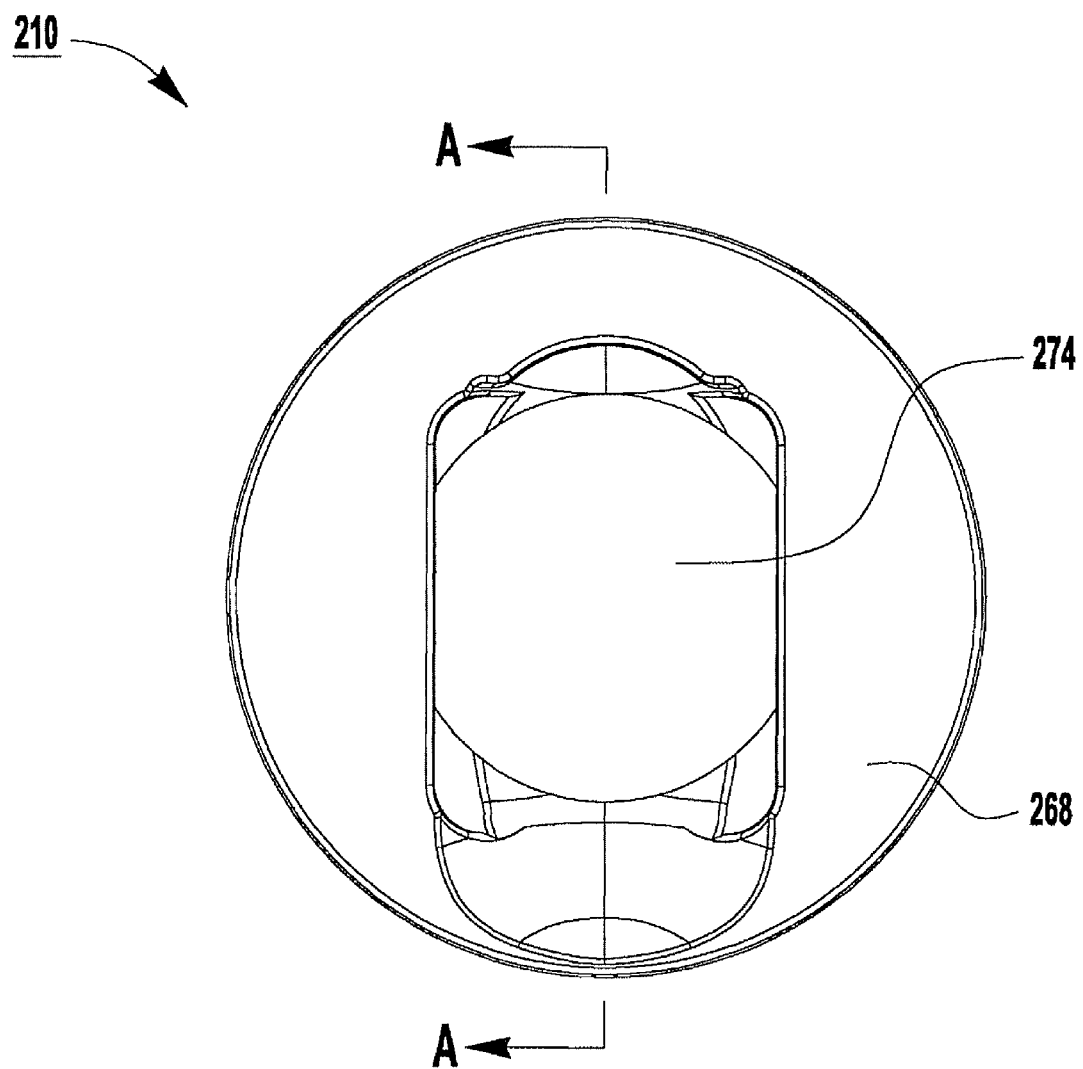
Figure 6D:
Figure 6D:
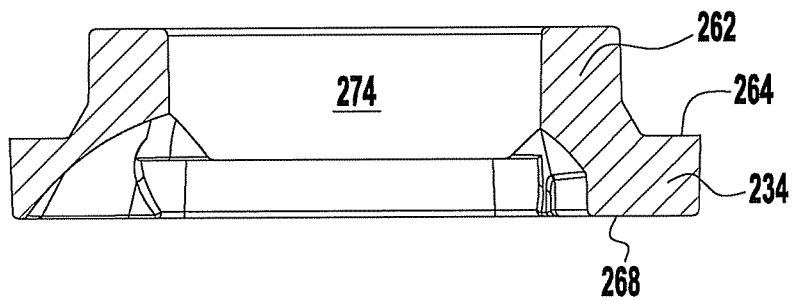
Figure 7A:
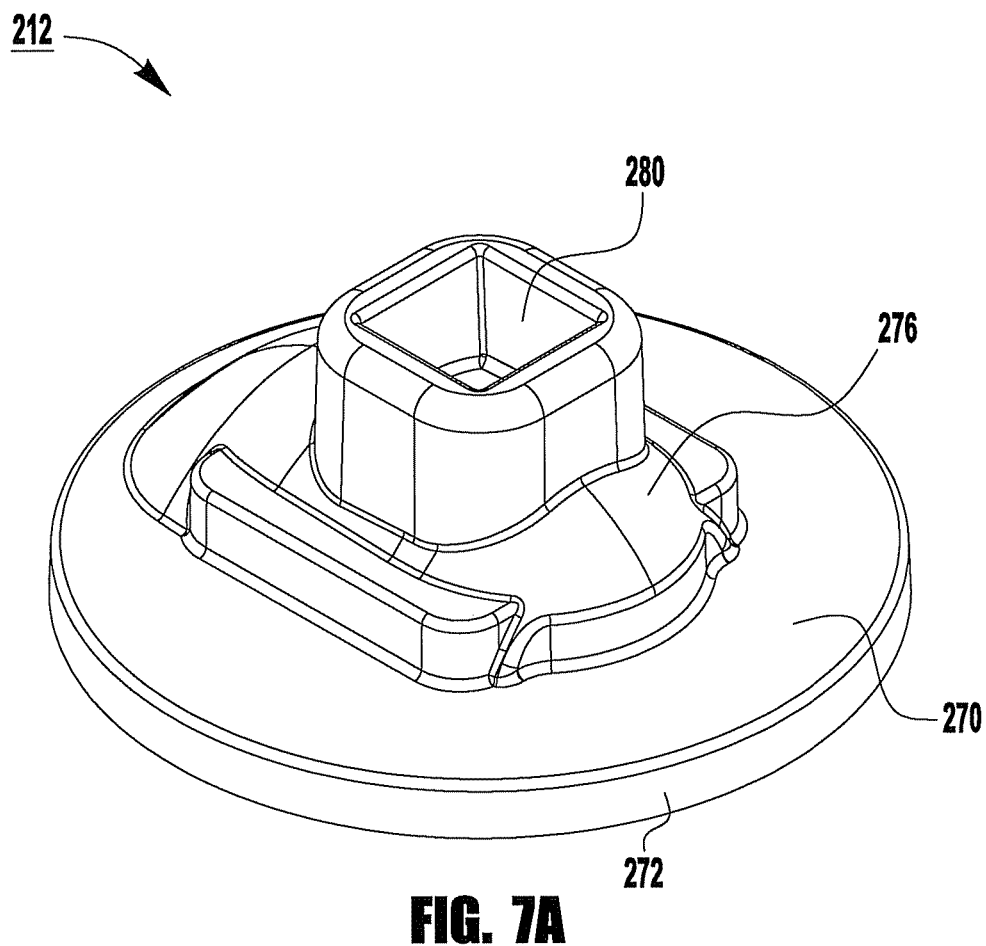
FIGS. 7A-7D show an exemplary flow plate used in the exemplary valve cartridge of FIG. 2.
Figure 7B:
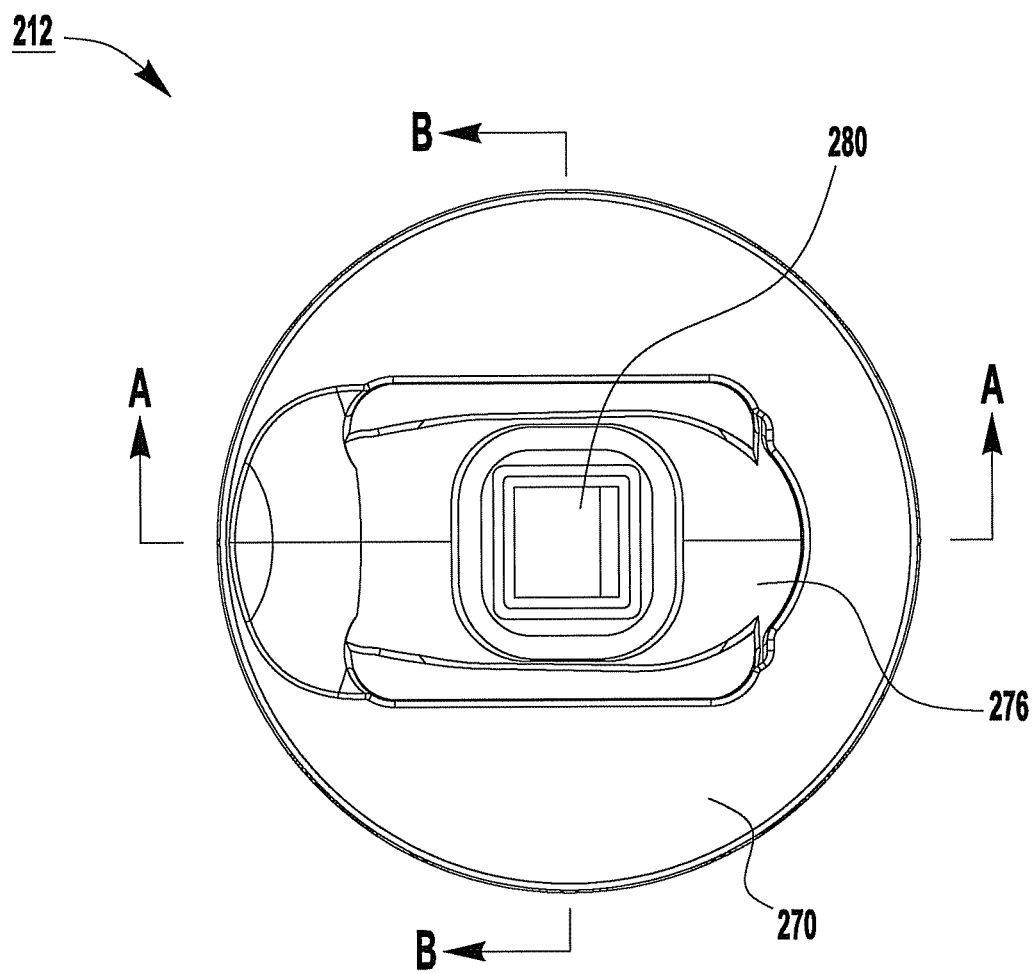
Figure 7C:
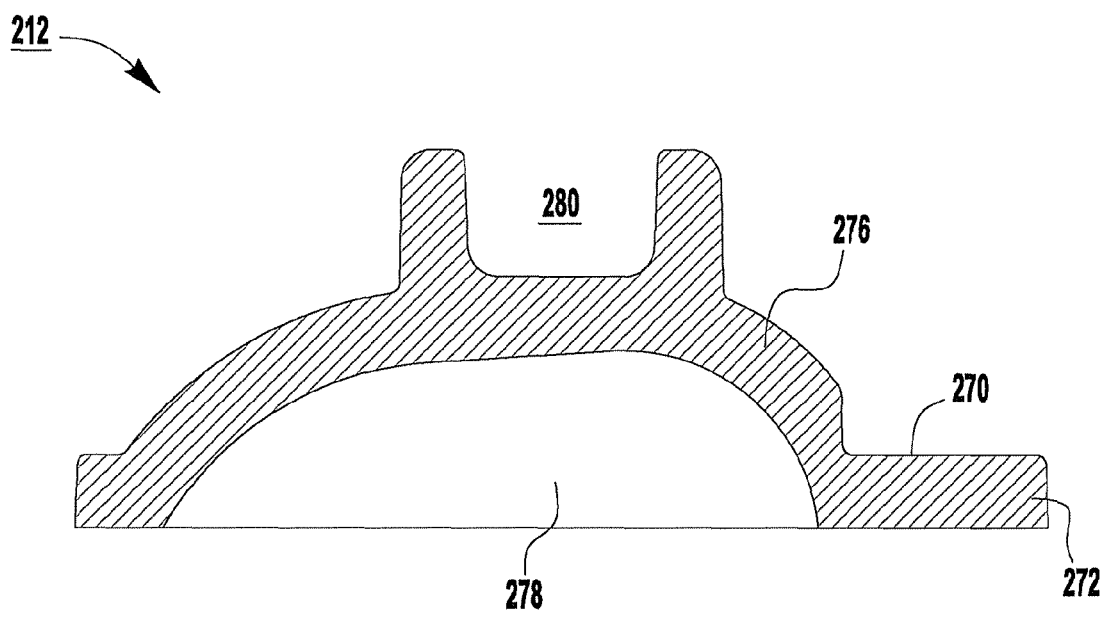
Figure 7D:
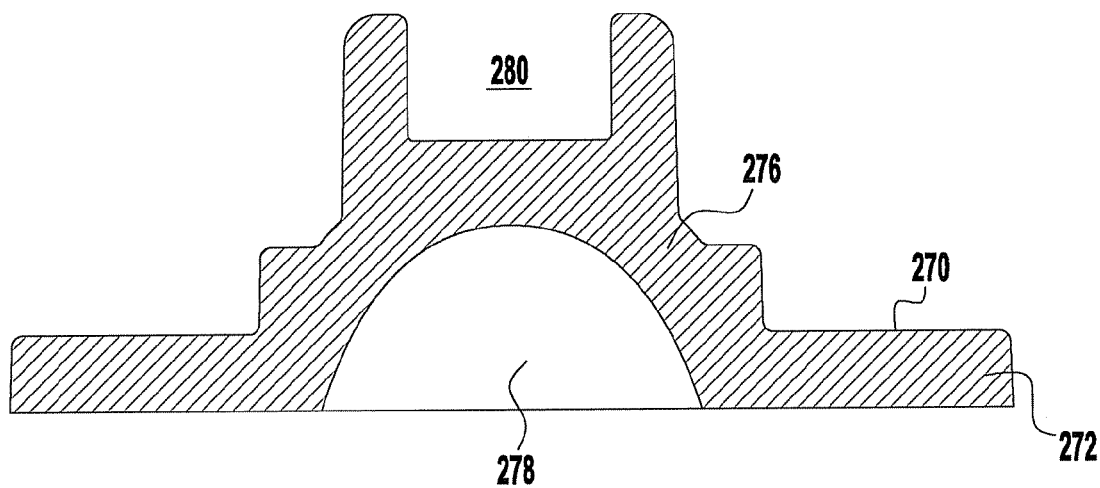

As shown in FIGS. 5A-5C, the spring 208 has an annular shape with a central opening 250. The spring 208 is disposed below the ball portion 230 of the ball-stem 204 in the housing 202 (see FIGS. 10B-10C). The spring 208 is connected to a second inner surface 252 of the housing 202 (e.g., by or through threading, friction fitting, snap fitting, welding), such that the spring 208 also retains the ball-stem 204 in the housing 202. The spring 208 has a plurality of notches 254 formed on an outer periphery 256 of the spring 208. The notches 254 engage corresponding tabs 258 formed on the second inner surface 252 of the housing 202 (see FIG. 3C), thereby securing the spring 208 within the housing 202 below the ball-stem 204.

The projection 246 of the ball-stem 204 extends through the central opening 250 in the spring 208. Some of the ball portion 230 of the ball-stem 204 can also extend through the central opening 250 in the spring 208. The spring includes a plurality of elastic flanges 260 surrounding the central opening 250. The elastic flanges 260 of the spring 208 contact the ball portion 230 of the ball-stem 204 and urge the ball portion 230 of the ball-stem 204 against the complementary-shaped first inner surface 232 of the housing 202.

As shown in FIGS. 6A-6D, the bushing 210 includes the flat annular portion 234 and a raised annular portion 262. A diameter of the flat annular portion 234 is greater than a diameter of the raised annular portion 262. The bushing 210 is disposed below and can be spaced apart from the spring 208 in the cavity 222 of the housing 202 (see FIGS. 10B-10C). An upper surface 264 of the flat annular portion 234 of the bushing 210 contacts a third inner surface 266 of the housing 202, which is located below the installation ledge 236 (see FIGS. 3C-3D and 10B-10C). A lower surface 268 of the flat annular portion 234 of the bushing 210 rests on an upper surface 270 of a flat portion 272 of the flow plate 212. Additionally, the raised annular portion 262 of the bushing 210 extends into a portion of the cavity 222 of the housing 202 immediately above the installation ledge 236. The raised annular portion 262 of the bushing 210 is sized to fit closely in that portion of the cavity 222 of the housing 202 receiving the raised annular portion 262 of the bushing 210. Accordingly, the bushing 210 provides a support surface between the housing 202 and the flow plate 212.

The bushing 210 has an opening 274 that extends through the flat annular portion 234 and the raised annular portion 262 of the bushing 210. A raised portion 276 of the flow plate 212 extends into the opening 274 of the bushing 210. The raised portion 276 of the flow plate 212 forms a mixing chamber 278. A portion of the opening 274 of the bushing 210 has an inner surface shaped to conform to a shape of the raised portion 276 of the flow plate 212 (see FIGS. 6C-6D). Additionally, a coupling recess 280 is formed on the raised portion 276 of the flow plate 212 (see FIGS. 7A-7D). After the flow plate 212 is installed in the valve cartridge 200, the coupling recess 280 is positioned within the opening 274 of the bushing 210 and surrounded by the raised annular portion 262 of the bushing 210 (see FIGS. 10B-10C).

The coupling recess 280 of the flow plate 212 receives the projection 246 of the ball-stem 204, thereby connecting the actuating mechanism (i.e., the ball-stem 204) and the flow plate 212. The projection 246 of the ball-stem 204 can have four sides that contact four corresponding sides of the coupling recess 280. The projection 246 of the ball-stem 204 does not contact a bottom surface of the coupling recess 280. It will be appreciated that notwithstanding the exemplary embodiments described herein, the ball-stem 204 can be connected to the flow plate 212 in any suitable manner that allows the ball-stem 204 to impart translational and angular movement to the flow plate 212.

As shown in FIGS. 7A-7D, the flow plate 212 is a valve member formed as a plate, disk or the like that is movable relative to the housing 202. The flow plate 212 includes the flat portion 272 and the raised portion 276. The flat portion 272 of the flow plate 212 forms a sealing surface that can cover and uncover water inlet apertures 282 and 284 in the manifold 214 to allow only cold water, only hot water or both cold and hot water to flow through the manifold 214. The water flowing through the water inlet apertures 282 and 284 in the manifold 214 enters the mixing chamber 278 (i.e., a cavity formed under the raised portion 276 of the flow plate 212) where the cold and hot water mixes prior to being discharged through a water outlet aperture 286 in the manifold 214. Furthermore, as noted above, the flow plate 212 also includes the coupling recess 280, which is formed on the raised portion 276 of the flow plate 212.

Figure 8:
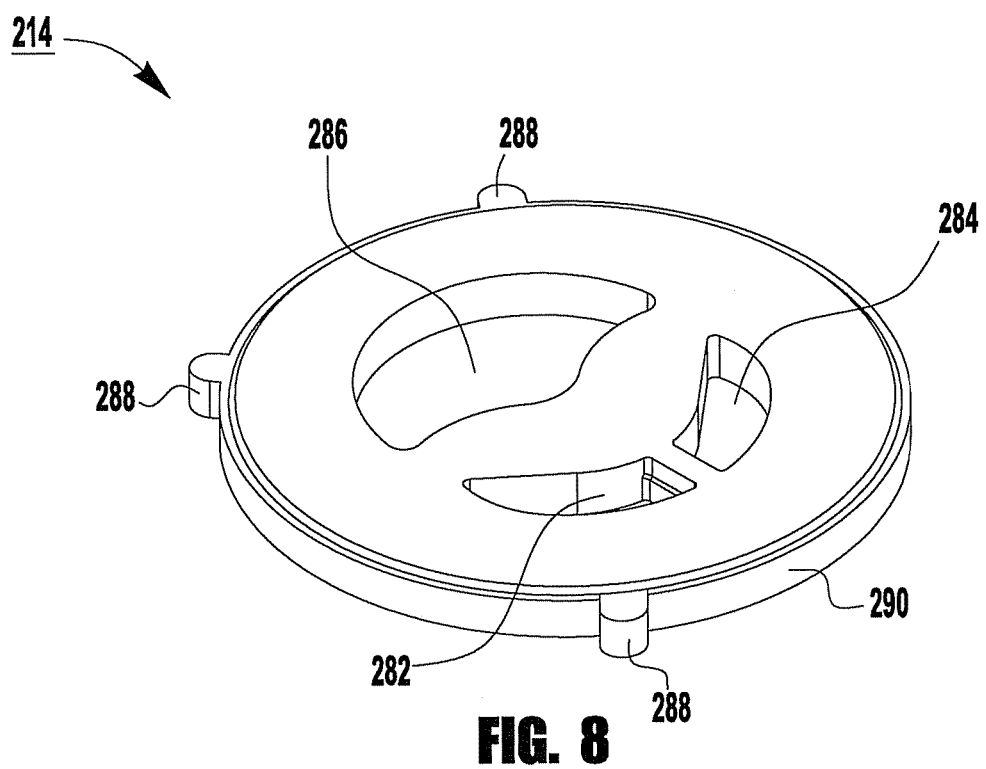
FIG. 8 is a perspective view of an exemplary manifold of the exemplary valve cartridge of FIG. 2.

As shown in FIG. 8, the manifold 214 is a valve member formed as a plate, disk or the like that is fixed relative to the housing 202. The manifold 214 includes one or more projections 288 formed on a periphery 290 of the manifold 214, wherein each of the projections 288 fits inside an internal cavity 292 of one of the keys 242 of the housing 202 (see FIGS. 3A and 3E). The projections 288 fix the manifold 214 relative to the housing 202, thereby preventing rotation of the manifold 214 within the housing 202.

The manifold 214 includes the water inlet apertures 282 and 284, which correspond to a cold water inlet aperture and a hot water inlet aperture, respectively. The manifold 214 also includes the water outlet aperture 286 through which cold water flowing through the cold water inlet aperture 282, hot water flowing through the hot water inlet aperture 284 or a mixture of the cold and hot water can flow to a water outlet passage (not shown) of the valve body 240.

Figure 9A:
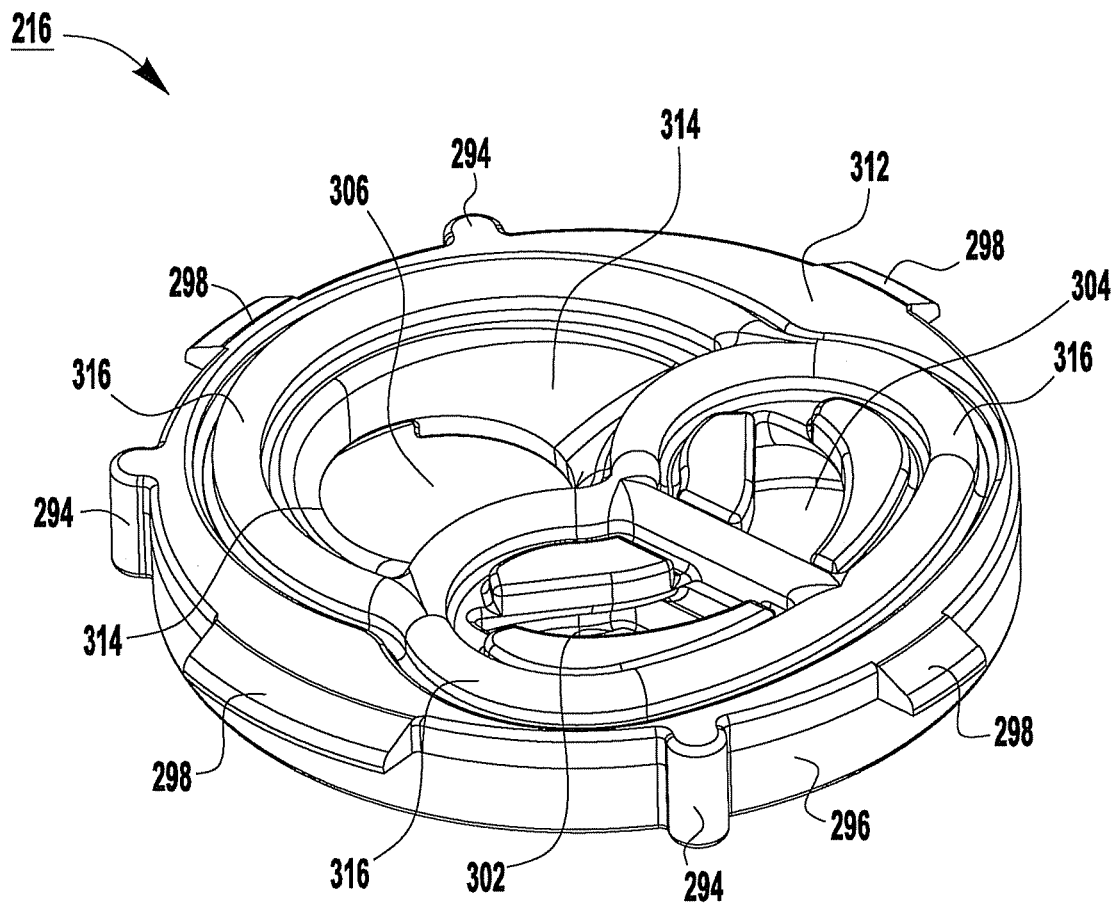
FIGS. 9A-9B show an exemplary base seal used in the exemplary valve cartridge of FIG. 2.
Figure 9B:
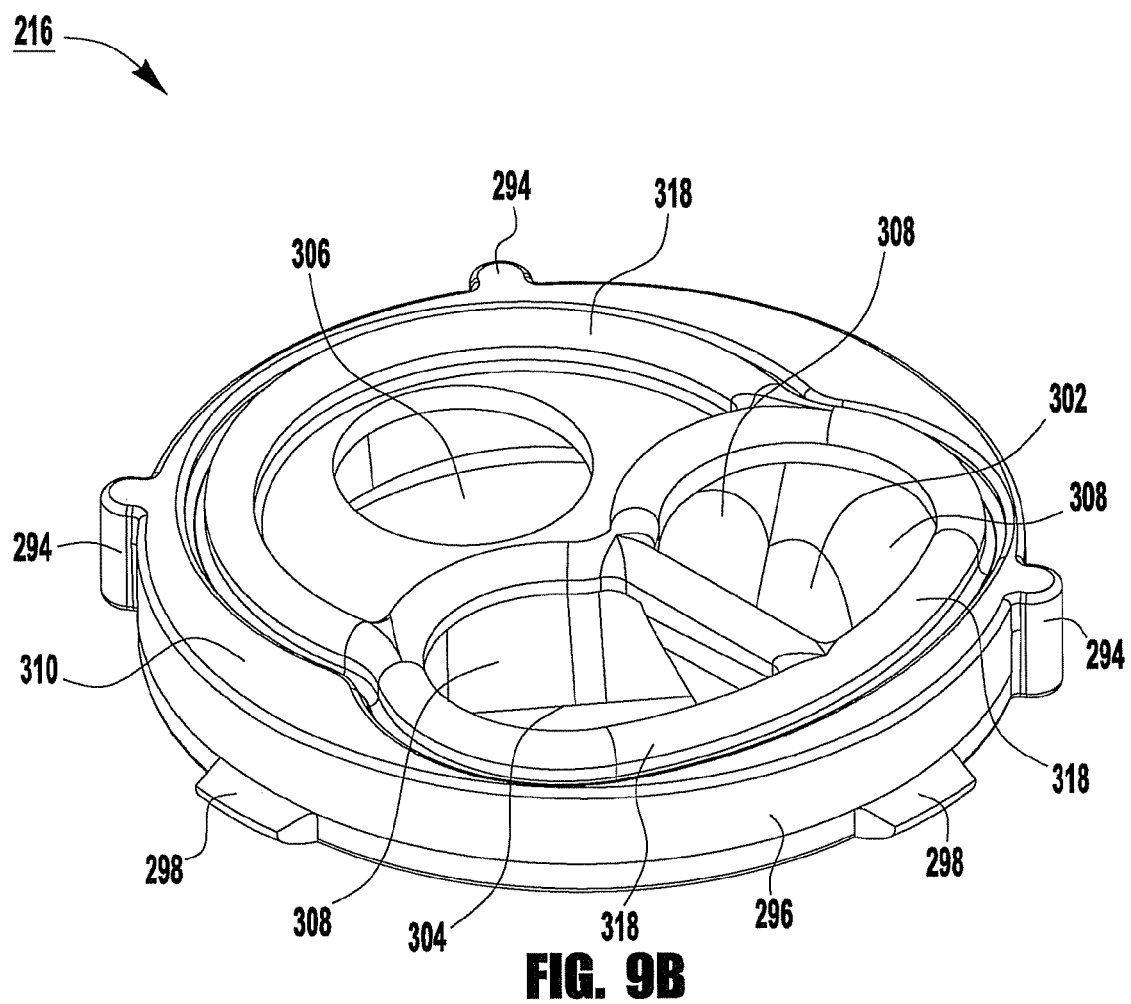

As shown in FIGS. 9A-9B, the base seal 216 is a sealing member formed of an elastic material (e.g., rubber). The base seal 216 includes one or more projections 294 formed on a periphery 296 of the base seal 216, wherein each of the projections 294 fits inside the internal cavity 292 of one of the keys 242 of the housing 202. The projections 294 fix the base seal 216 relative to the housing 202, thereby preventing rotation of the base seal 216 within the housing 202. The base seal 216 also includes one or more tabs 298 formed on the periphery 296 of the base seal 216, wherein the one or more tabs 298 are deformable to fit in and extend through a corresponding one or more openings 300 formed in the housing 202 to secure the base seal 216 in the housing 202. The one or more tabs 298 can have different sizes.

Like the manifold 214, the base seal 216 has a cold water inlet aperture 302, a hot water inlet aperture 304 and a water outlet aperture 306. The cold water inlet aperture 302 and the hot water inlet aperture 304 of the base seal 216 each have walls 308 that slope from near a lower surface 310 of the base seal 216 to near an upper surface 312 of the base seal 216 to improve the flow of water through the base seal 216 and into the valve cartridge 200. The water outlet aperture 306 of the base seal 216 has walls 314 that slope from near the upper surface 312 of the base seal 216 to near the lower surface 310 of the base seal 216 to improve the flow of water through the base seal 216 and out of the valve cartridge 200. It is important that the apertures 282, 284 and 286 in the manifold 214 are aligned with the apertures 302, 304 and 306 in the base seal 216 when the valve cartridge 200 is assembled. Accordingly, the projections 288 on the manifold 214 and the projections 294 on the base seal 216 insure that the manifold 214 and the base seal 216 fit into the housing 202 in only one orientation, wherein the apertures 282, 284 and 286 in the manifold 214 are aligned with the apertures 302, 304 and 306 in the base seal 216 in this orientation.

A ridge 316 surrounds the apertures 302, 304 and 306 in the base seal 216 on the upper surface 312 of the base seal 216 (see FIG. 9A). Similarly, a ridge 318 surrounds the apertures 302, 304 and 306 in the base seal 216 on the lower surface 310 of the base seal 216 (see FIG. 9B). The ridges 316 and 318 of the base seal 216 are compressed when the valve cartridge 200 is installed in the valve body 240 (see FIGS. 10B-10C and 11 which show the ridges 316 and 318 overlapped with the compressing structure for purposes of illustration only). In particular, as the retention nut 238 is tightened down oil the installation ledge 236 of the housing 202, the ridge 316 is compressed between the manifold 214 of the valve cartridge 200 and the base seal 216, while the ridge 318 is compressed between the base seal 216 and a seating surface 320 of the valve body 240 (see FIG. 11). It should be noted that although the projections 288 of the manifold 214 prevent the manifold 214 from rotating within the housing 202, the projections 288 nonetheless allow the manifold 214 to move axially within the housing 202. In this manner, the compression of the ridges 316 and 318 of the base seal 216 exerts a loading force on the flow plate 212 and the manifold 214. Accordingly, the flow plate 212 and the manifold 214 are kept in water-tight engagement with one another, after installation of the valve cartridge 200.

Figure 11:
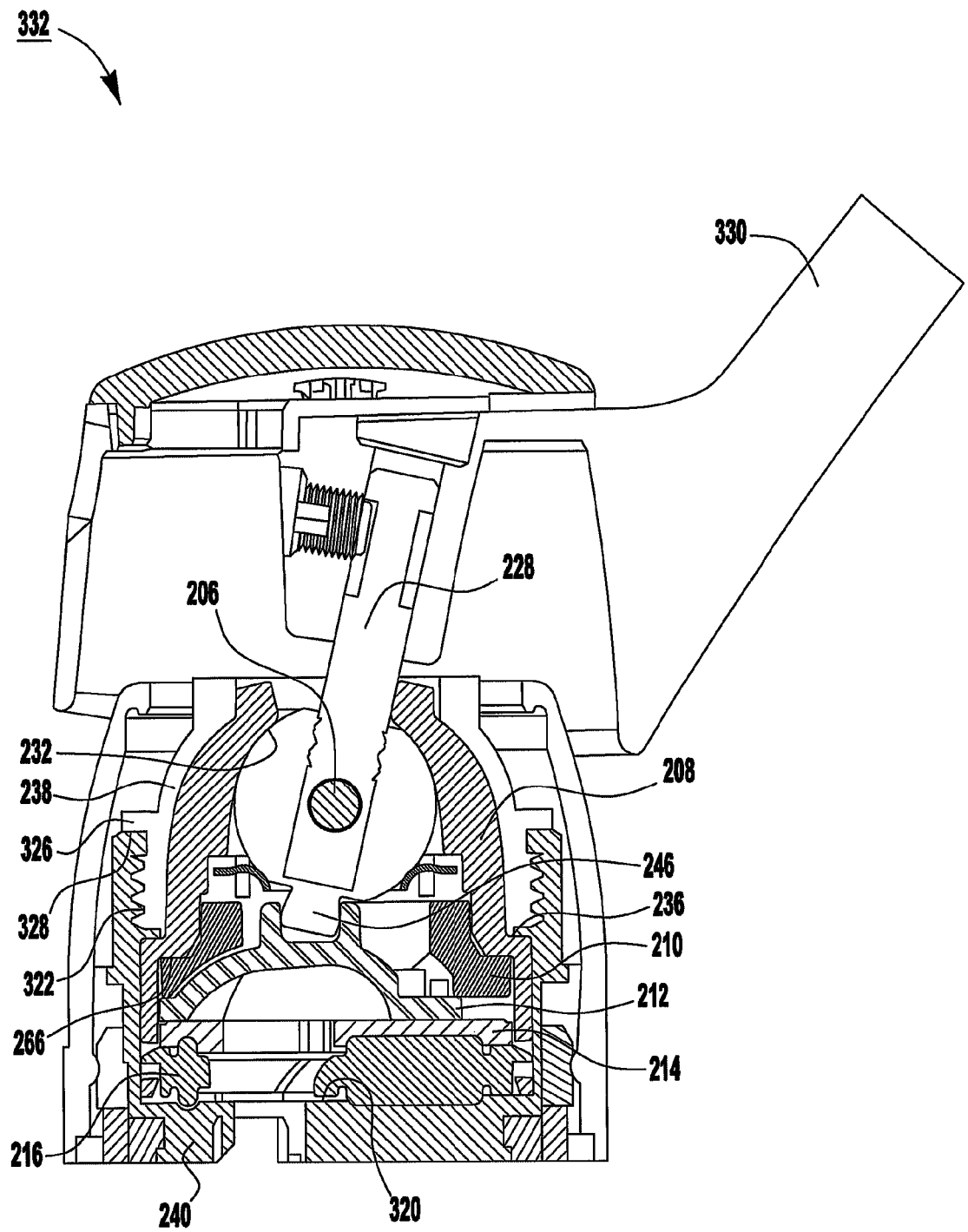
FIG. 11 is a mirror image of a cross-sectional view (along line B-B in FIG. 10A) of the exemplary valve cartridge of FIG. 2 after installation in a plumbing fixture.

The retention nut 238 is a hollow nut that engages sidewalls 322 of the valve body 240 to secure the valve cartridge 200 in the valve body 240 (see FIG. 11). For example, the retention nut 238 can have external threads for engaging complementary threads on the sidewalls 322. An inner surface of the retention nut 238 is shaped to conform substantially to a shape of the domed portion 218 of the housing 202. The installation ledge 236, however, is the only portion of the housing 202 that the retention nut 238 contacts during installation of the valve cartridge 200 in the valve body 240.

Additionally, the retention nut 238 and/or the valve body 240 can have structural features that prevent an excessive amount of torque from being transferred to the valve cartridge 200. For example, the retention nut 238 includes an annular flange 326 that bottoms out on a surface 328 of the valve body 240 to prevent excessive tightening of the retention nut 238 (see FIG. 11). Accordingly, the annular flange 326 functions to limit the maximum amount of torque that can be transferred from the retention nut 238 to the valve cartridge 200.

The position and the orientation of the flow plate 212 relative to the manifold 214 are controlled by the stem portion 228 of the ball-stem 204 projecting out of the housing 202 through the upper opening 226. For example, pivoting the stem portion 228 of the ball-stem 204 about the pin 206 changes the position of the flow plate 212 relative to the manifold 214, which changes the flow rate of the water. Rotating the stem portion 228 of the ball-stem 204 changes the orientation of the flow plate 212 relative to the manifold 214, which changes the temperature of the water.

An operating member 330 such as a handle, knob or the like (see FIG. 11) can be connected to the stem portion 224 of the ball-stem 204 to facilitate manipulation of the stem portion 228 by the user. Accordingly, after the valve cartridge 200 is installed in the valve body 240, the user can manipulate the operating member 330 which moves the stem portion 228 of the ball-stem 204 to change the position and/or orientation of the flow plate 212 relative to the manifold 214, thereby controlling the flow rate and temperature of the water flowing through the valve cartridge 200 and out a plumbing fixture 332, such as through a spout (not shown) of the plumbing fixture 332 (see FIG. 11).

Pivoting of the stem portion 228 of the ball-stem 204 about the pin 206 can be limited by the stem portion 228 contacting opposing surfaces of the upper opening 226 of the housing 202. Thus, the stem portion 224 of the ball-stem 204 contacts a first surface 334 of the upper opening 226 of the housing 202 when the valve cartridge 200 is in a fully closed position corresponding to a flow rate of zero (see FIG. 10C). The stem portion 228 of the ball-stem 204 contacts a second surface 336 of the upper opening 226 of the housing 202 when the valve cartridge 200 is in a fully open position corresponding to a maximum flow rate.

Rotation of the stem portion 228 of the ball-stem 204 can be limited by the distal ends of the pin 206 contacting end portions 338 of the slots 244 (see FIGS. 2, 3A-3B and 10A). Accordingly, the length of the slots 244, which function as temperature limit stops, define the range of temperatures for which the valve cartridge 200 can deliver the water.

The valve cartridge 200 has a low point of contact (i.e., the installation ledge 236 formed on the housing 202) on which the retention nut 238 bears down. The installation ledge 236 is a circular ledge that extends around the housing 202 where the domed portion 218 of the housing 202 meets the cylindrical portion 220 of the housing 202. The installation ledge 236 is the highest point on the housing 202 that contacts the retention nut 238.

In an exemplary embodiment of the exemplary valve cartridge 200, one or more installation ledges (e.g., the installation ledge 236) are formed on the housing 202 of the valve cartridge 200. The highest of the installation ledges is a low point of contact on the housing 202 for installing the valve cartridge 200 in the valve body 240.

A ratio $R_1$ of a height $h_1$ of the highest installation ledge on the housing 202 to a largest outer diameter d of the housing 202 is less than or equal to 0.50 (see FIG. 10B), which can be expressed as $h_1/d \leq 0.50$. In another exemplary embodiment of the exemplary valve cartridge 200, the ratio $R_1$ of the height $h_1$ to the largest outer diameter d is less than or equal to 0.41 (see FIG. 10B). In still another exemplary embodiment, the ratio $R_1$ of the height $h_1$ to the largest outer diameter d is approximately equal to 0.40.

According to still another exemplary embodiment of the exemplary valve cartridge 200, a ratio $R_2$ of the height $h_1$ to a height $h_2$ of the housing 202 is less than or equal to 0.39 (see FIG. 10B), which can be expressed as $h_1/h_2 \leq 0.39$. In another exemplary embodiment, the ratio $R_2$ of the height $h_1$ to the height $h_2$ is approximately equal to 0.38. In still another exemplary embodiment, the ratio $R_2$ of the height $h_1$ to the height $h_2$ is approximately equal to 0.36.

According to yet another exemplary embodiment of the exemplary valve cartridge 200, a ratio $R_3$ of the height $h_1$ to a height $h_3$ of the pin 206 (e.g., from a bottom of the housing 202 to a centerline of the pin 206) is less than or equal to 0.55 (see FIG. 10B), which can be expressed as $h_1/h_3 \leq 0.55$. In another exemplary embodiment, ratio $R_3$ of the height $h_1$ to the height $h_3$ is approximately equal to 0.54. In still another exemplary embodiment, ratio $R_3$ of the height $h_1$ to the height $h_3$ is approximately equal to 0.50.

Figure 10A:
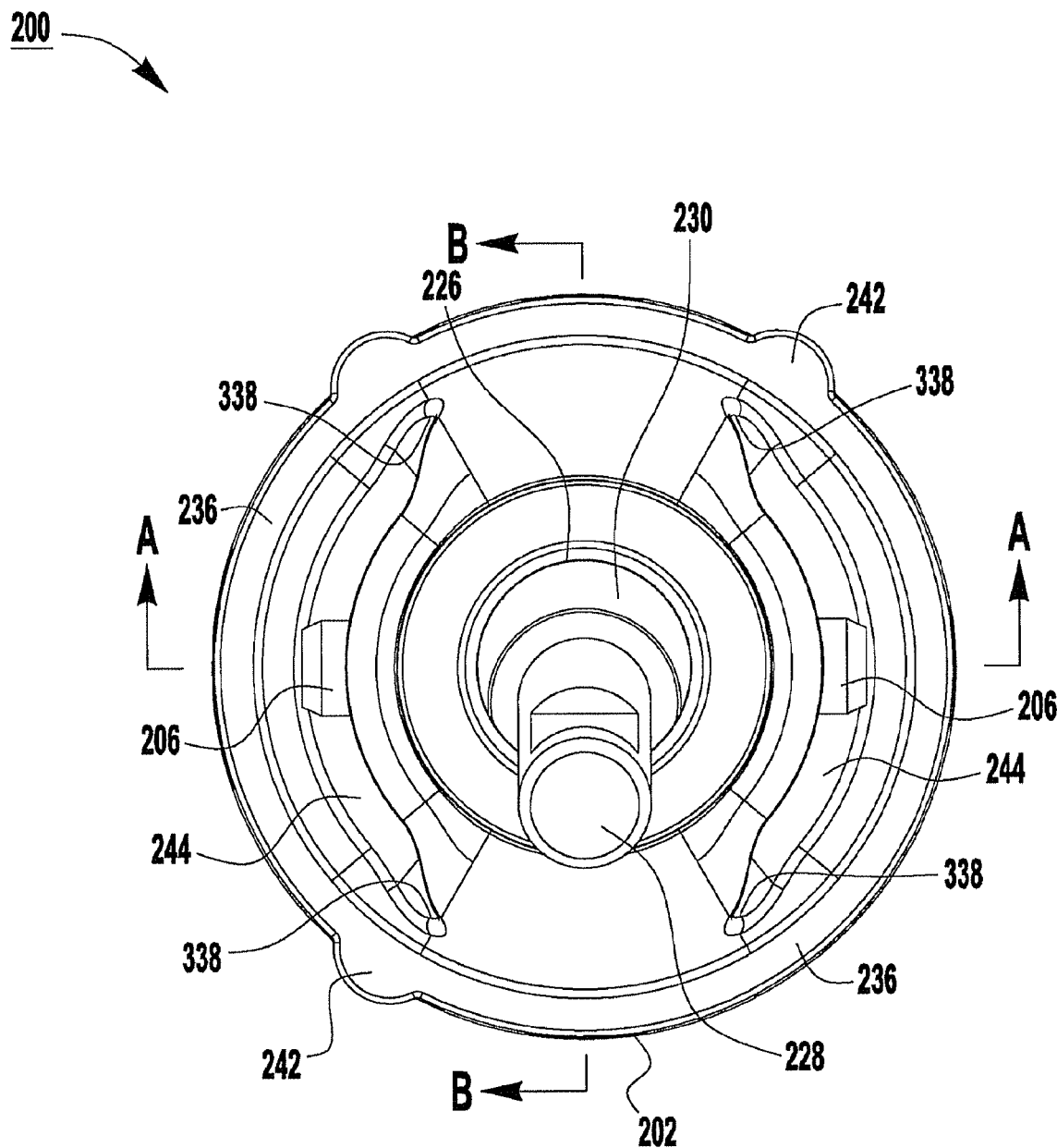
FIGS. 10A-10C show the exemplary valve cartridge of FIG. 2 in assembled form.
Figure 10B:
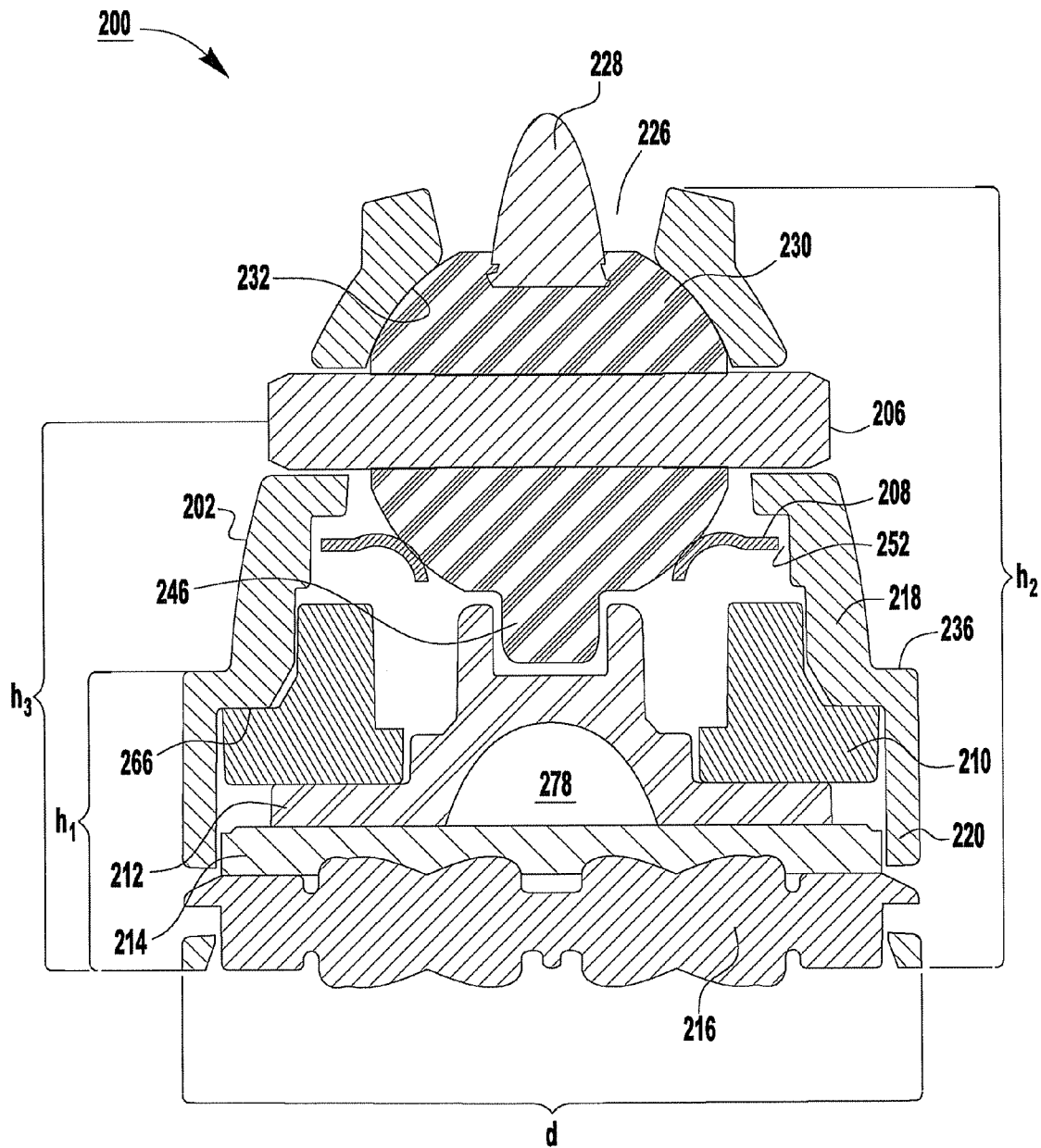
Figure 10C:
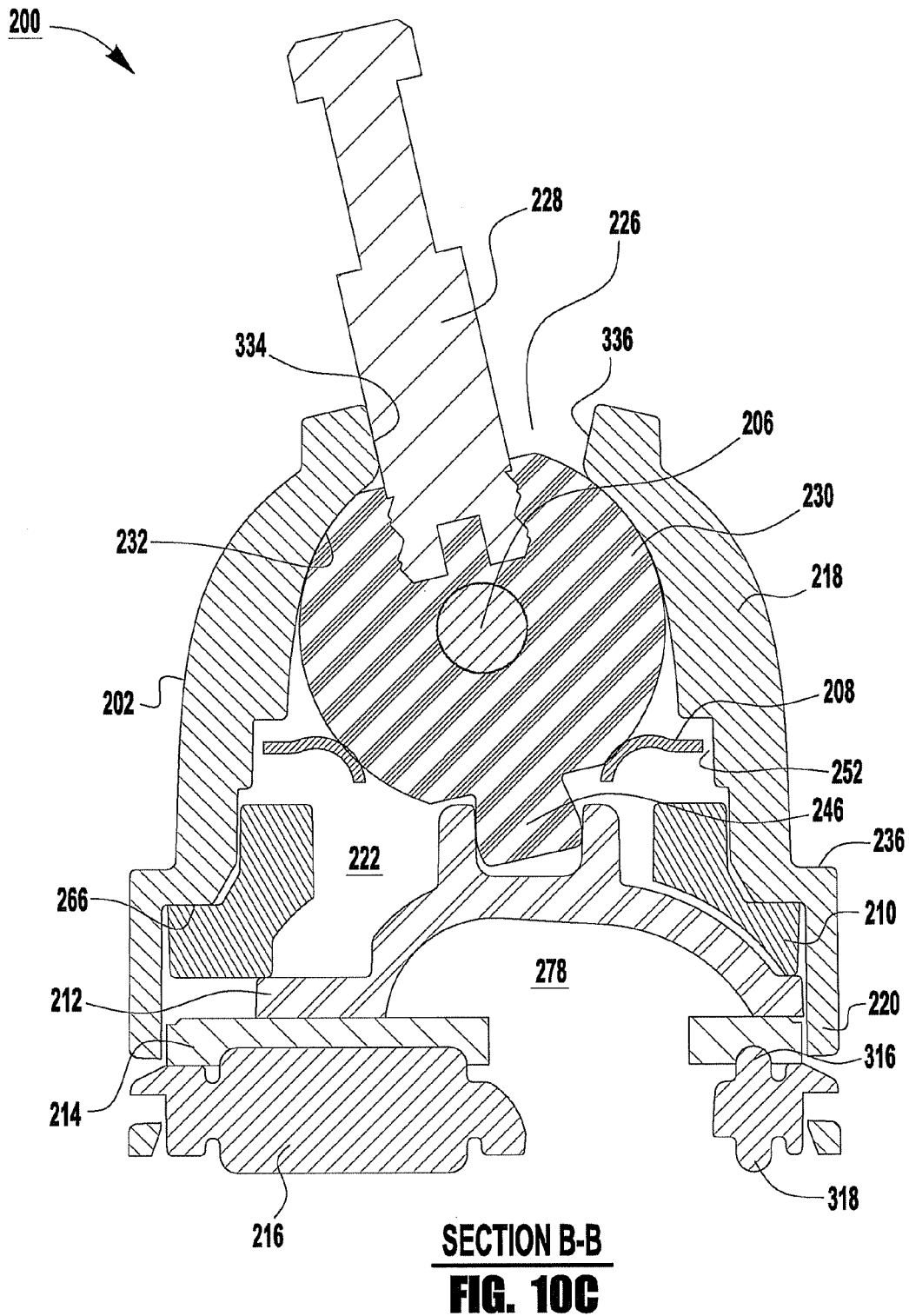

According to another exemplary embodiment of the exemplary valve cartridge 200, the highest installation ledge on the housing 202 is below an actuating mechanism (e.g., the ball-stem 204) of the valve cartridge 200 (see FIG. 10B). In still another exemplary embodiment of the exemplary valve cartridge 200, the highest installation ledge on the housing 202 is below the actuating mechanism and above a mixing chamber (e.g., the mixing chamber 278) of the valve cartridge 200. In yet another exemplary embodiment of the exemplary valve cartridge 200, the highest installation ledge on the housing 202 is below the actuating mechanism and above a fixed disk (e.g., the manifold 214) of the valve cartridge 200.

According to an exemplary embodiment of the exemplary valve cartridge 200, the height $h_1$ of the highest installation ledge on the housing 202 is between 0.486 and 0.494 inches. In one exemplary embodiment, the height $h_1$ of the highest installation ledge on the housing 202 is approximately equal to 0.490 inches.

According to another exemplary embodiment of the exemplary valve cartridge 200, the height $h_2$ of the housing 202 is between 1.377 and 1.385 inches. In another exemplary embodiment, the height $h_2$ of the housing 202 is between 1.277 and 1.285 inches. In one exemplary embodiment, the height $h_2$ of the housing 202 is approximately equal to 1.381 inches. In another exemplary embodiment, the height $h_2$ of the housing 202 is approximately equal to 1.281 inches.

According to still another exemplary embodiment of the exemplary valve cartridge 200, the height $h_3$ of the pin 206 is between 0.977 and 0.994 inches. In another exemplary embodiment, the height $h_3$ of the pin 206 is between 0.902 and 0.919 inches. In one exemplary embodiment, the height $h_3$ of the pin 206 is approximately equal to 0.986 inches. In another exemplary embodiment, the height $h_3$ of the pin 206 is approximately equal to 0.911 inches.

According to yet another exemplary embodiment of the exemplary valve cartridge 200, the outer diameter d of the housing 202 is between 1.216 and 1.224 inches. In one exemplary embodiment, the outer diameter d of the housing 202 is approximately equal to 1.220 inches.

As illustrated by way of the exemplary embodiments described herein, the installation ledge 236 (as a highest installation ledge on the housing 202) is a low point of contact on the housing 202 on which the retention nut 238 can bear down during installation of the valve cartridge 200 in the valve body 240. Accordingly, the valve cartridge 200 has a compact structure that provides increased flexibility in the design of plumbing fixtures (e.g., the plumbing fixture 332 shown in FIG. 11) that will accommodate the valve cartridge 200. Furthermore, the low installation ledge 236 allows less material to be used in forming the valve body 240, since sidewalls 322 of the valve body 240 can be made shorter (see FIG. 11). As a result, the low installation ledge 236 provides a cost savings.

A one-handle valve cartridge 400, according to another exemplary embodiment, has a low point of contact for securing the valve cartridge 400 in a valve body (e.g., the exemplary valve body 240 shown in FIG. 11). Accordingly, the valve cartridge 400 may overcome the drawbacks of conventional valve cartridges having a high point of contact.

Figure 12:
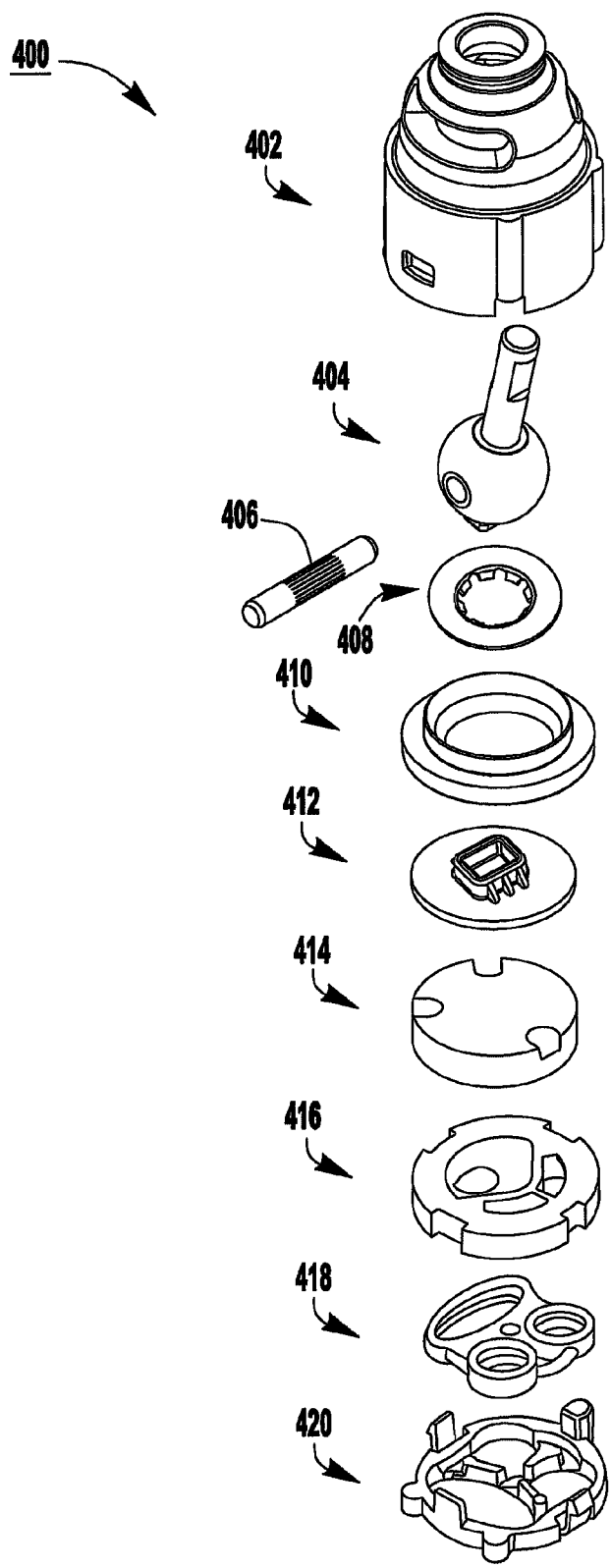
FIG. 12 is a perspective exploded view of a valve cartridge, according to another exemplary embodiment.
Figure 22A:
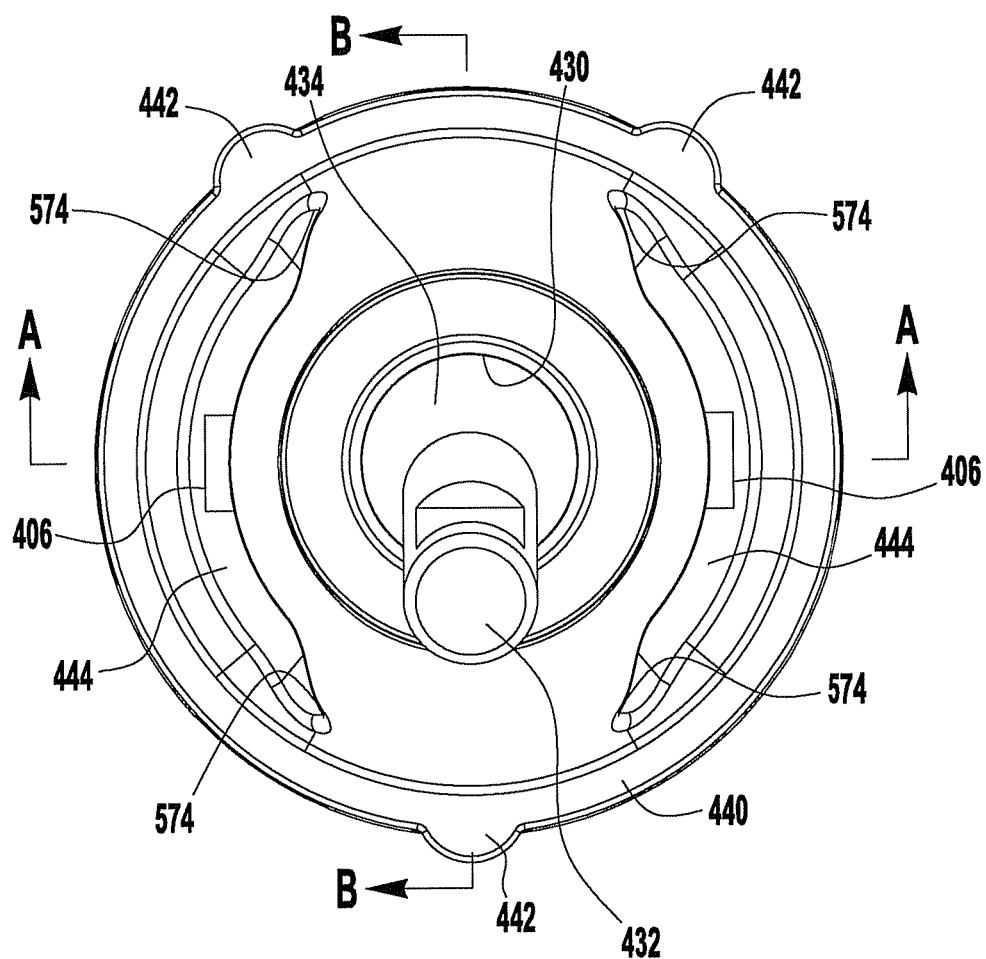
FIGS. 22A-22C show the exemplary valve cartridge of FIG. 12 in assembled form.
Figure 22B:
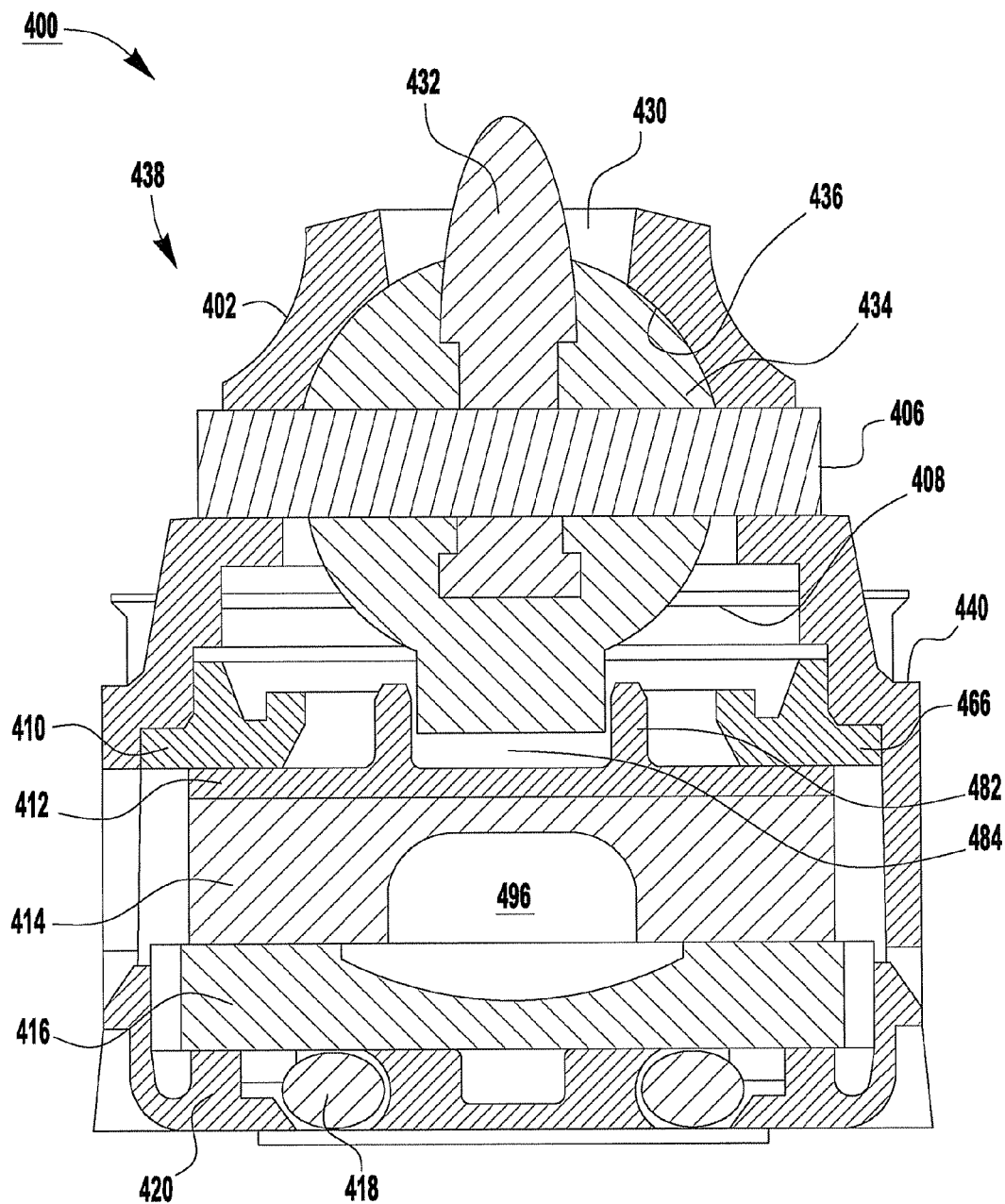
Figure 22C:
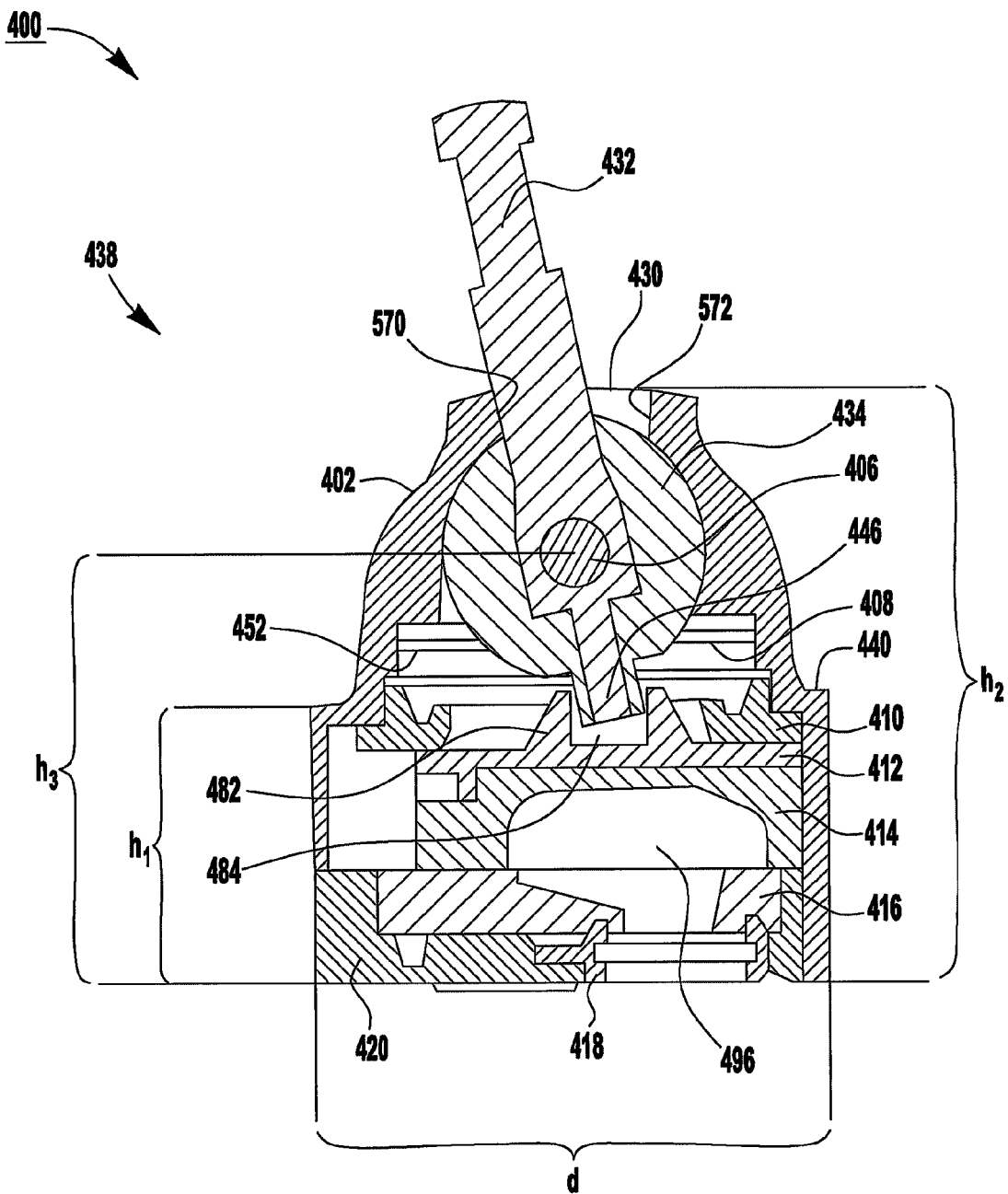

As shown in FIGS. 12 and 22B-22C, the exemplary valve cartridge 400 has several discrete components including an upper housing 402, a ball-stem 404, a pin 406, a spring 408, a bushing 410, a carrier 412, a movable disk 414, a fixed disk 416, a base seal 418 and a lower housing 420. The movable disk 414 and/or the fixed disk 416 can be made of a hard material. For example, the movable disk 414 and/or the fixed disk 416 can be made of ceramic. The upper housing 402, for example, can be made of plastic or metal.

Figure 13A:
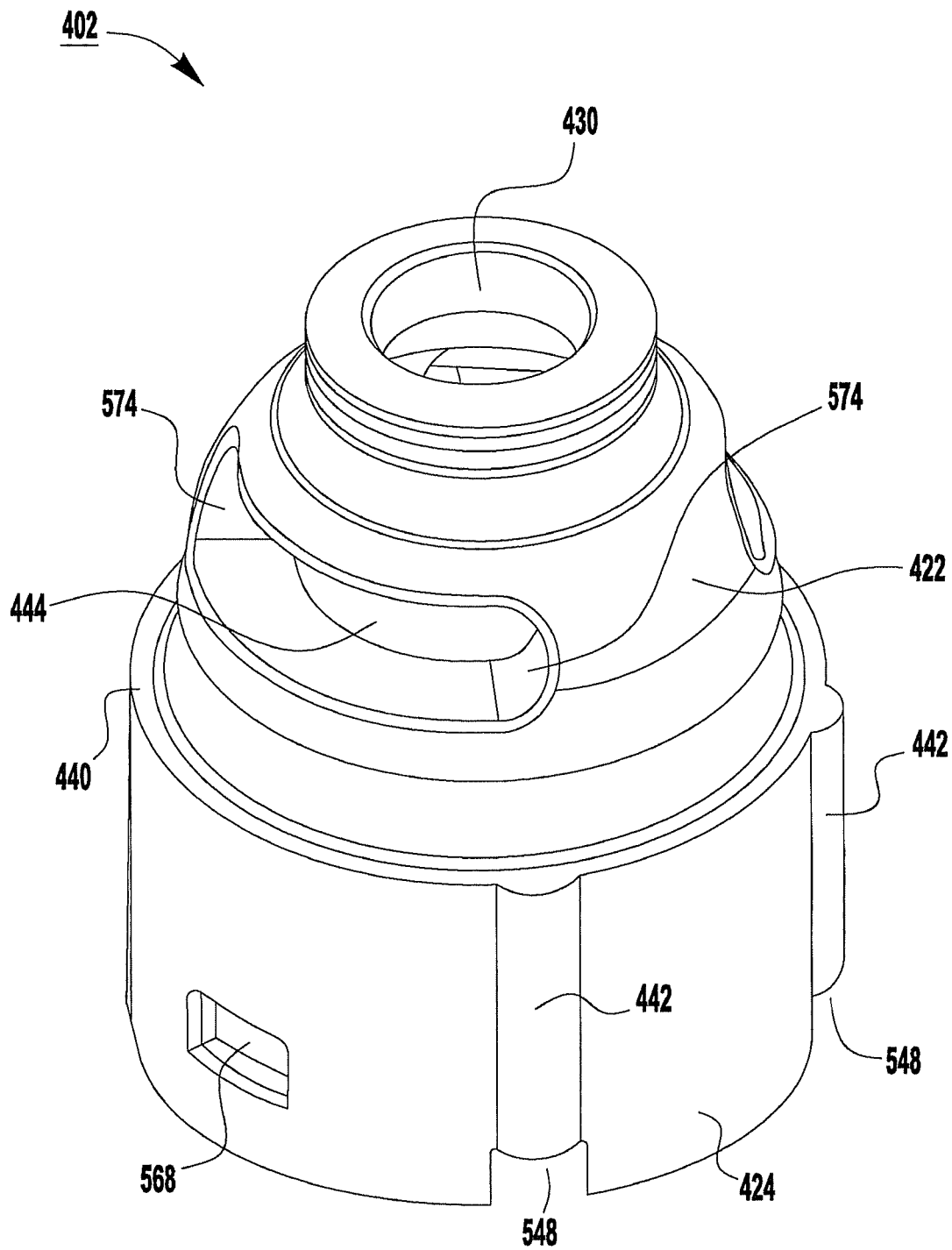
FIGS. 13A-13C show an exemplary upper housing used in the exemplary valve cartridge of FIG. 12.
Figure 13B:
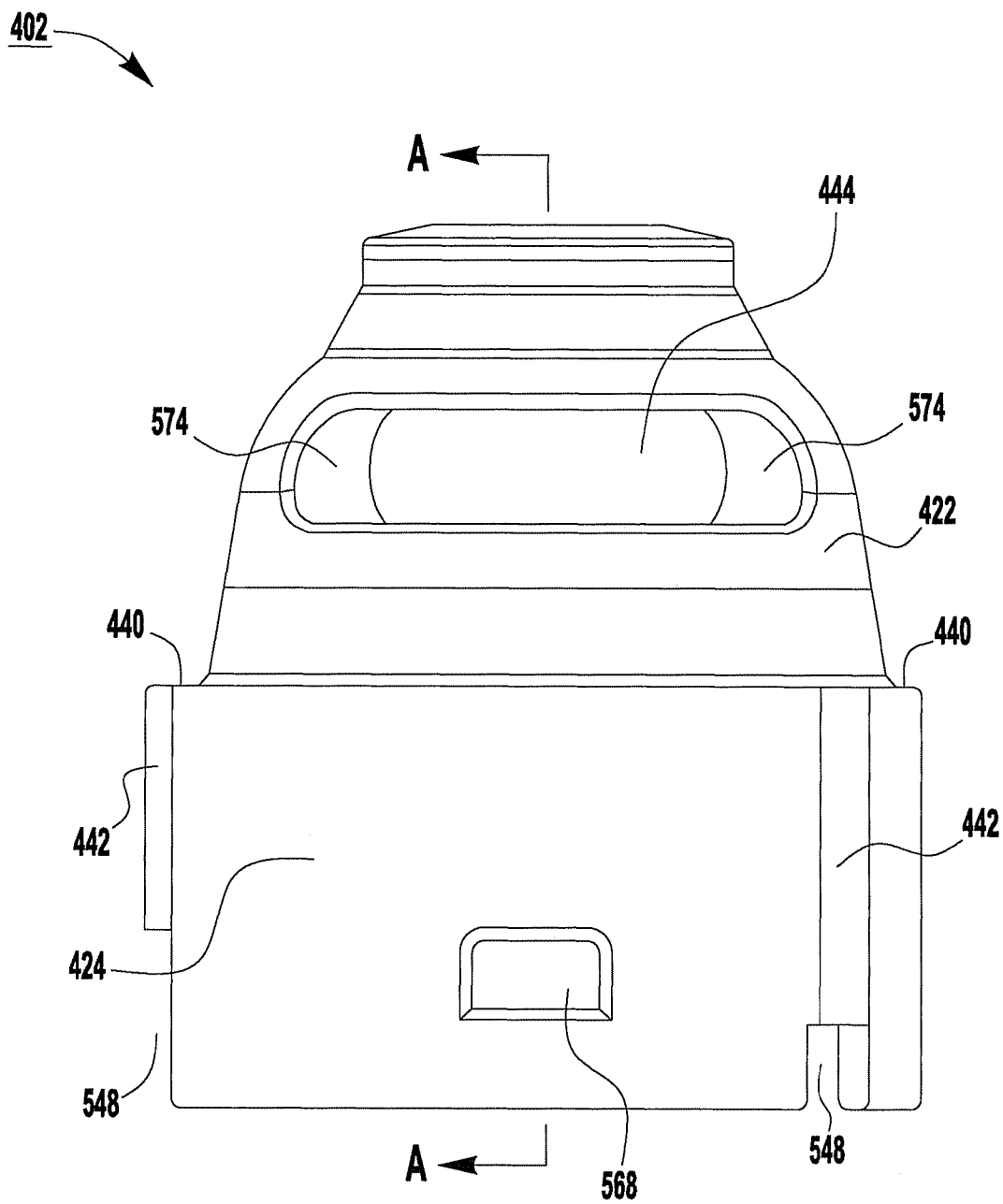
Figure 13C:
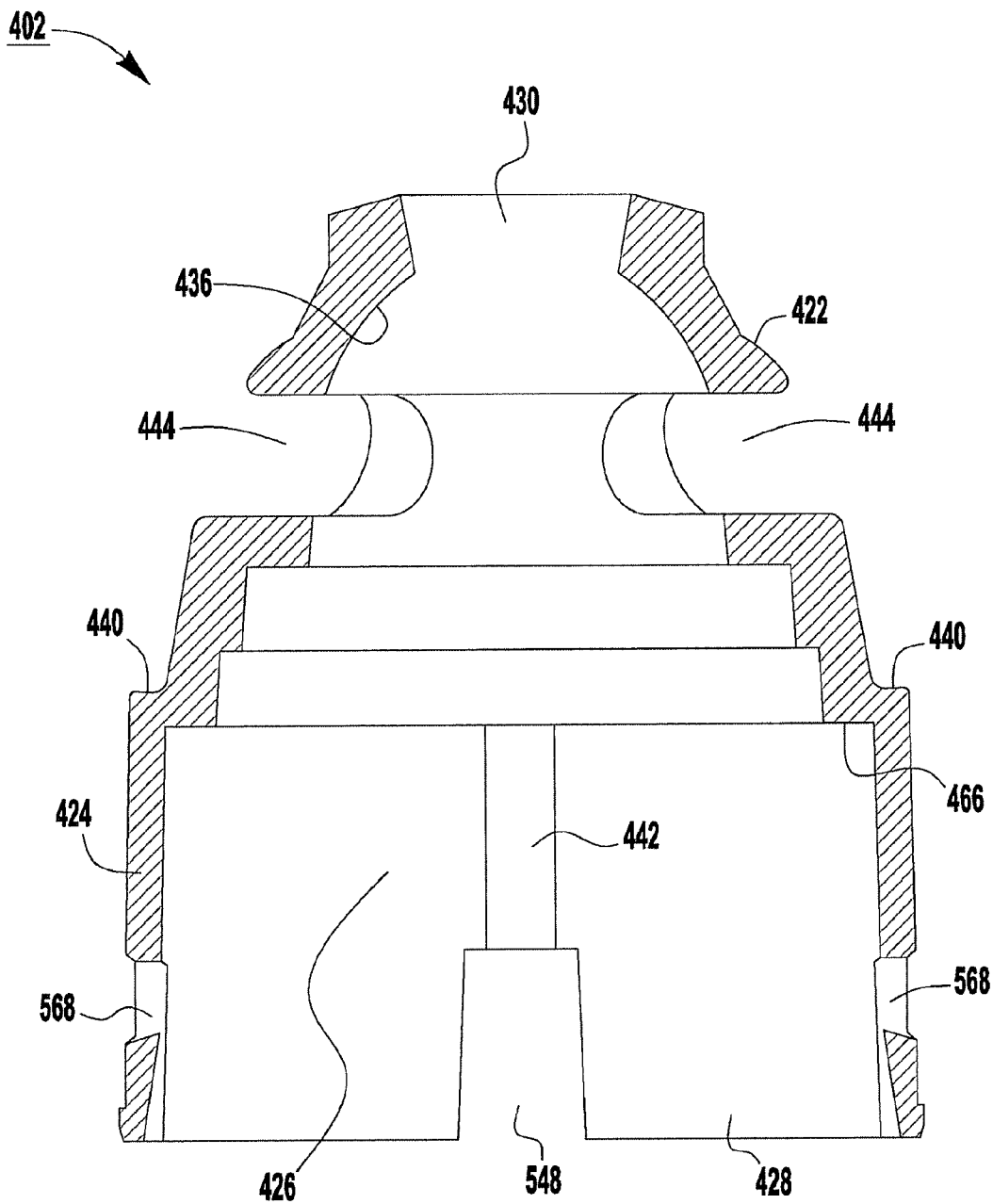

As shown in FIGS. 13A-13C, the upper housing 402 has a domed portion 422 and a cylindrical portion 424. A cavity 426 is formed in the upper housing 402 for receiving the remaining components of the valve cartridge 400. The cavity 426 extends inside the domed portion 422 and the cylindrical portion 424 of the upper housing 402. The cylindrical portion 424 of the upper housing 402 includes a lower opening 428 through which the components can be inserted into the upper housing 402. The dome portion 422 of the upper housing 402 includes an upper opening 430 through which a stem portion 432 of the ball-stem 404 extends. The cavity 426 in the upper housing 402 is wider near the lower opening 428 than near the upper opening 430. A portion of the cavity 426 near the upper opening 430 of the upper housing 402 receives a ball portion 434 of the ball-stem 404. Accordingly, a first inner surface 436 of the portion of the cavity 426 near the upper opening 430 has a shape that substantially conforms to a shape of the ball portion 434 of the ball-stem 404 (see FIGS. 13C and 22B).

A portion of the cavity 426 near the lower opening 428 of the upper housing 402 receives the bushing 410, the carrier 412, the movable disk 414, the fixed disk 416 and the base seal 418 (see FIGS. 22B-22C). Furthermore, as described below, the lower housing 420 interfaces with the upper housing 402 to form a housing assembly 438 that retains these components in the cavity 426 of the upper housing 402 (see FIGS. 22B-22C).

A portion of the upper housing 402 where the domed portion 422 meets the cylindrical portion 424 forms an installation ledge 440 on an outer surface of the upper housing 402 (see FIGS. 13A-13C and 22A-22C). The installation ledge 440 is substantially below the upper opening 430 of the upper housing 402. In one exemplary embodiment, a retention nut (e.g., the retention nut 234 shown in FIG. 11) engages the installation ledge 440 to secure the valve cartridge 400 in a valve body (e.g., the valve body 240 shown in FIG. 11). Furthermore, the upper housing 402 has one or more keys 442 that each engage a complementary-shaped recess in the valve body to prevent rotation of the upper housing 402 relative to the valve body after the valve cartridge 400 is installed. The one or more keys 442 can have a lobular shape. The upper housing 402 also includes a pair of slots 444 formed on opposing sides of the upper housing 402 that interface with distal ends of the pin 406 to function as temperature-limit stops, as described below.

Figure 14:
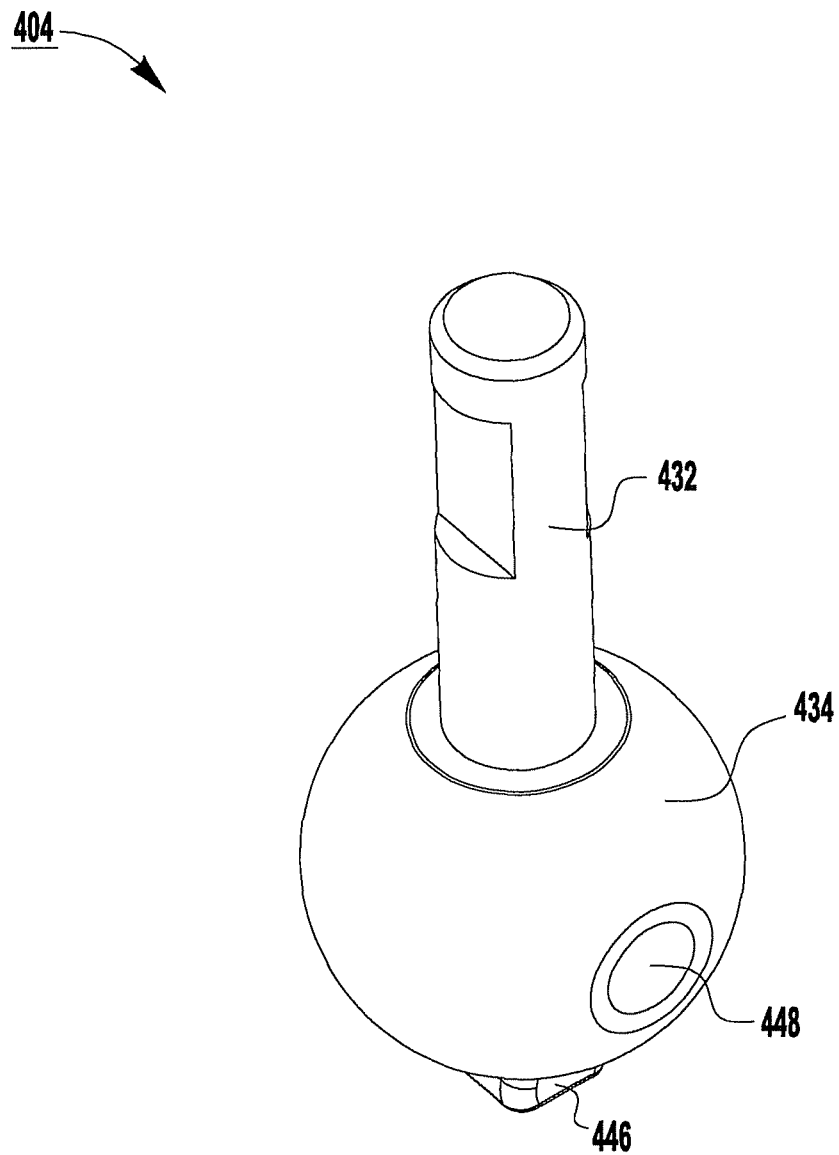
FIG. 14 is a perspective view of an exemplary ball-stem of the exemplary valve cartridge of FIG. 12.

As shown in FIG. 14, the ball-stem 404 is the actuating mechanism for the valve cartridge 400. The ball-stem 404 includes the ball portion 434 and the stem portion 432. The ball portion 434 and the stem portion 432 can be discrete components or can be formed integrally. The ball portion 434 includes a projection 446 extending from a side of the ball portion 446 that is opposite a side of the ball portion 434 from which the stem portion 432 extends. The projection 446 acts as a coupling device for connecting the ball-stern 404 to the carrier 412, as described below. The ball portion 434 and the projection 446 can be discrete components or can be formed integrally.

A bore 448 is formed through a center of the ball portion 434 of the ball-stem 404. The bore 448 is orthogonal to the stem portion 432 of the ball-stem 404. After the ball-stem 404 is inserted into the cavity 426 of the upper housing 402, the pin 406 can be inserted through one of the slots 444 in the upper housing 402 and into the bore 448 of the ball-stem 404. In this manner, the pin 406 retains the ball-stem 404 in the upper housing 402.

Figure 15A:
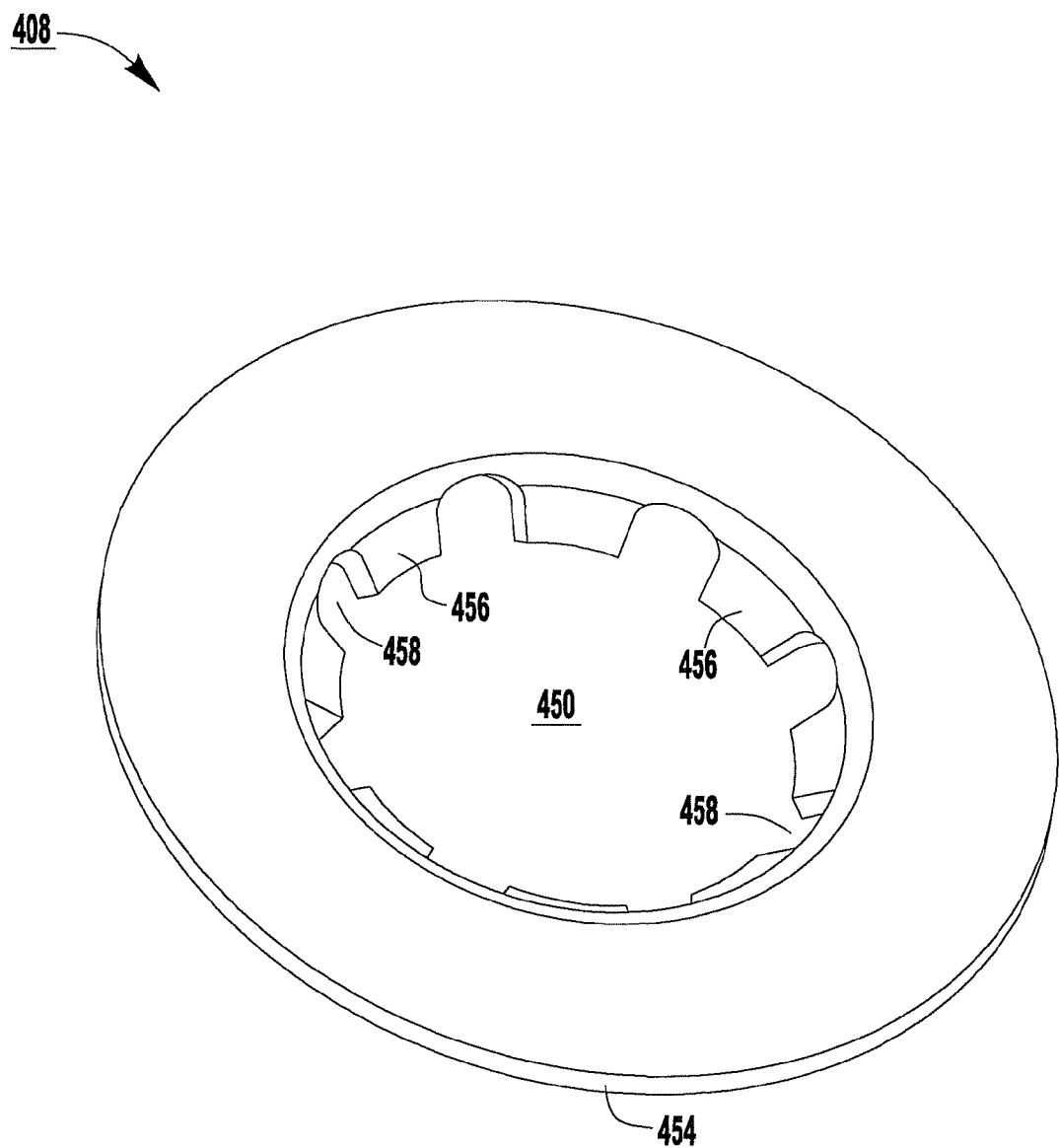
FIGS. 15A-15C show an exemplary spring used in the exemplary valve cartridge of FIG. 12.
Figure 15B:
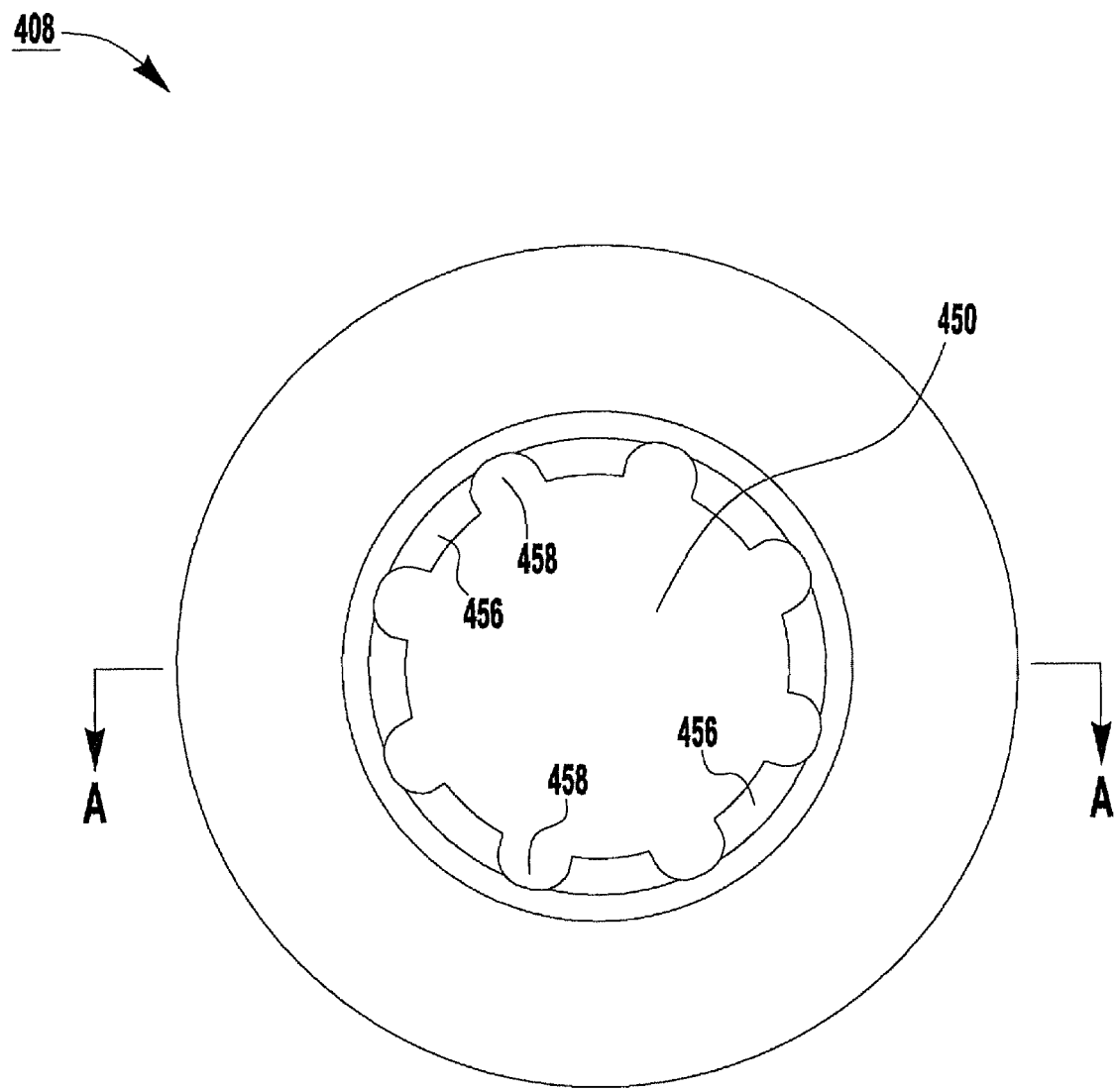
Figure 15C:
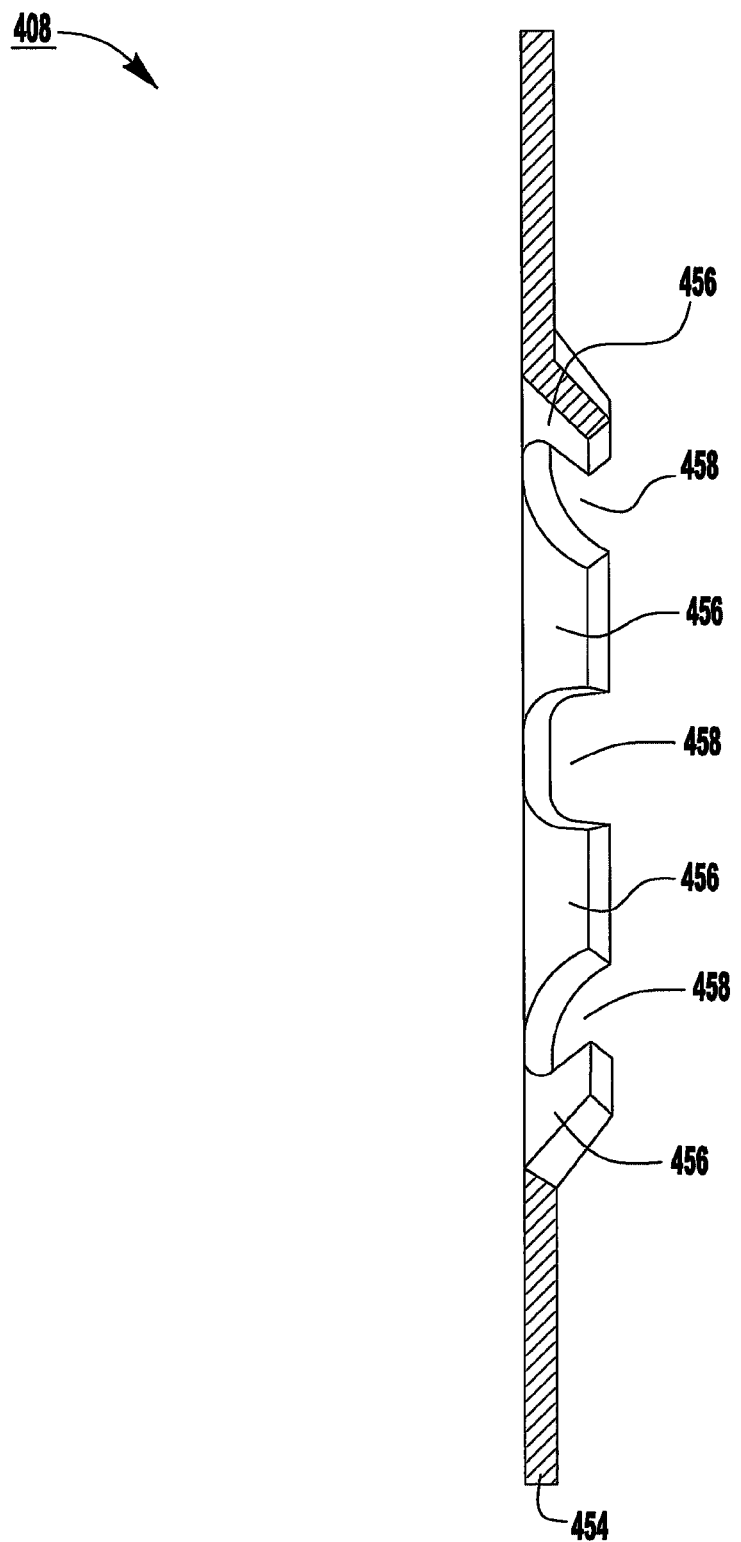

As shown in FIGS. 15A-15C, the spring 408 has an annular shape with a central opening 450. The spring 408 is disposed below the ball portion 434 of the ball-stem 404 in the upper housing 402 (see FIGS. 22B-22C). The spring 408 is connected to a second inner surface 452 of the upper housing 402 (e.g., by or through threading, function fitting, snap fitting, welding), such that the spring 408 also retains the ball-stem 404 in the upper housing 402 (see FIGS. 13C and 22C). In one exemplary embodiment, at least a portion of an outer periphery 454 of the spring 408 is welded to the second inner surface 452 of the upper housing 402.

The projection 446 of the ball-stem 404 extends through the central opening 450 in the spring 408. Some of the ball portion 434 of the ball-stem 404 can also extend through the central opening 450 in the spring 408. The spring 408 includes a plurality of elastic flanges 456 surrounding the central opening 450. The elastic flanges 456 are spaced apart from one another such that gaps 458 are formed between the elastic flanges 456. The elastic flanges 456 of the spring 408 contact the ball portion 434 of the ball-stem 404 and urge the ball portion 434 of the ball-stem 404 against the complementary-shaped first inner surface 436 of the upper housing 402. The gaps 458, for example, function to reduce the stress placed on the spring 408 from engaging the ball-stem 404.

Figure 16A:
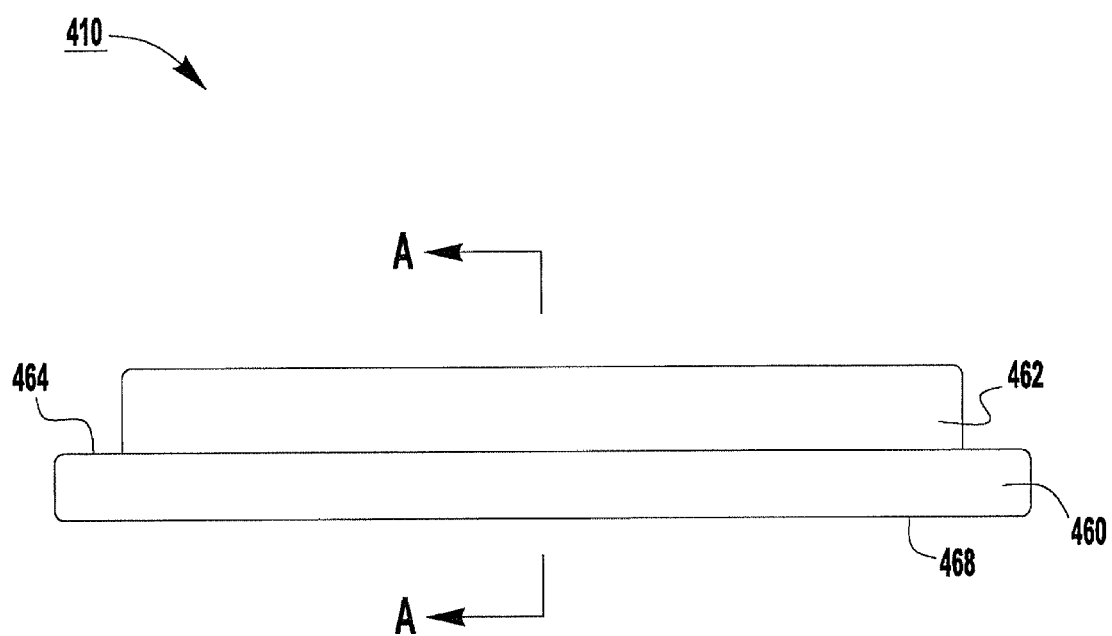
FIGS. 16A-16C show an exemplary bushing used in the exemplary valve cartridge of FIG. 12.
Figure 16B:
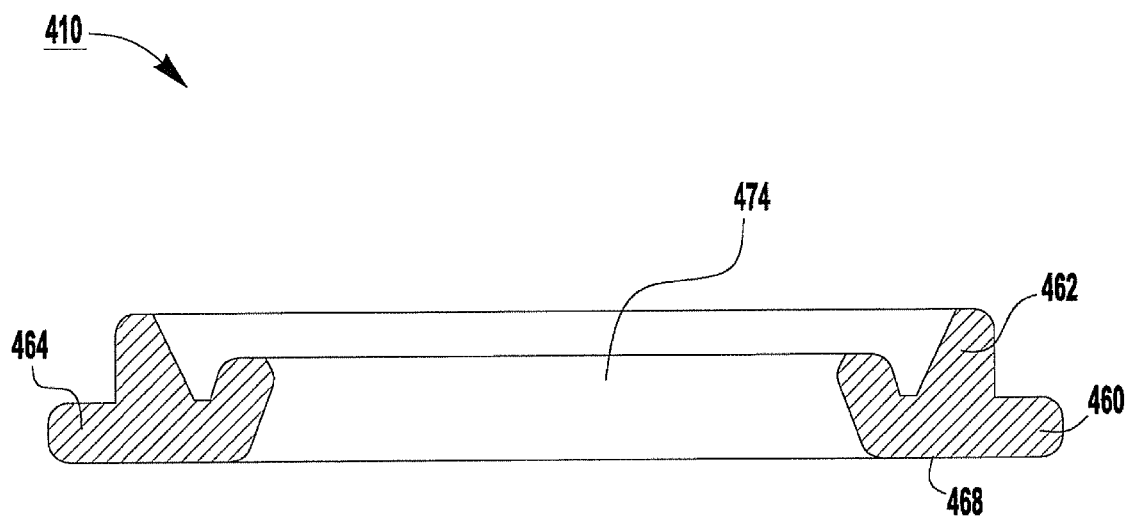
Figure 16C:
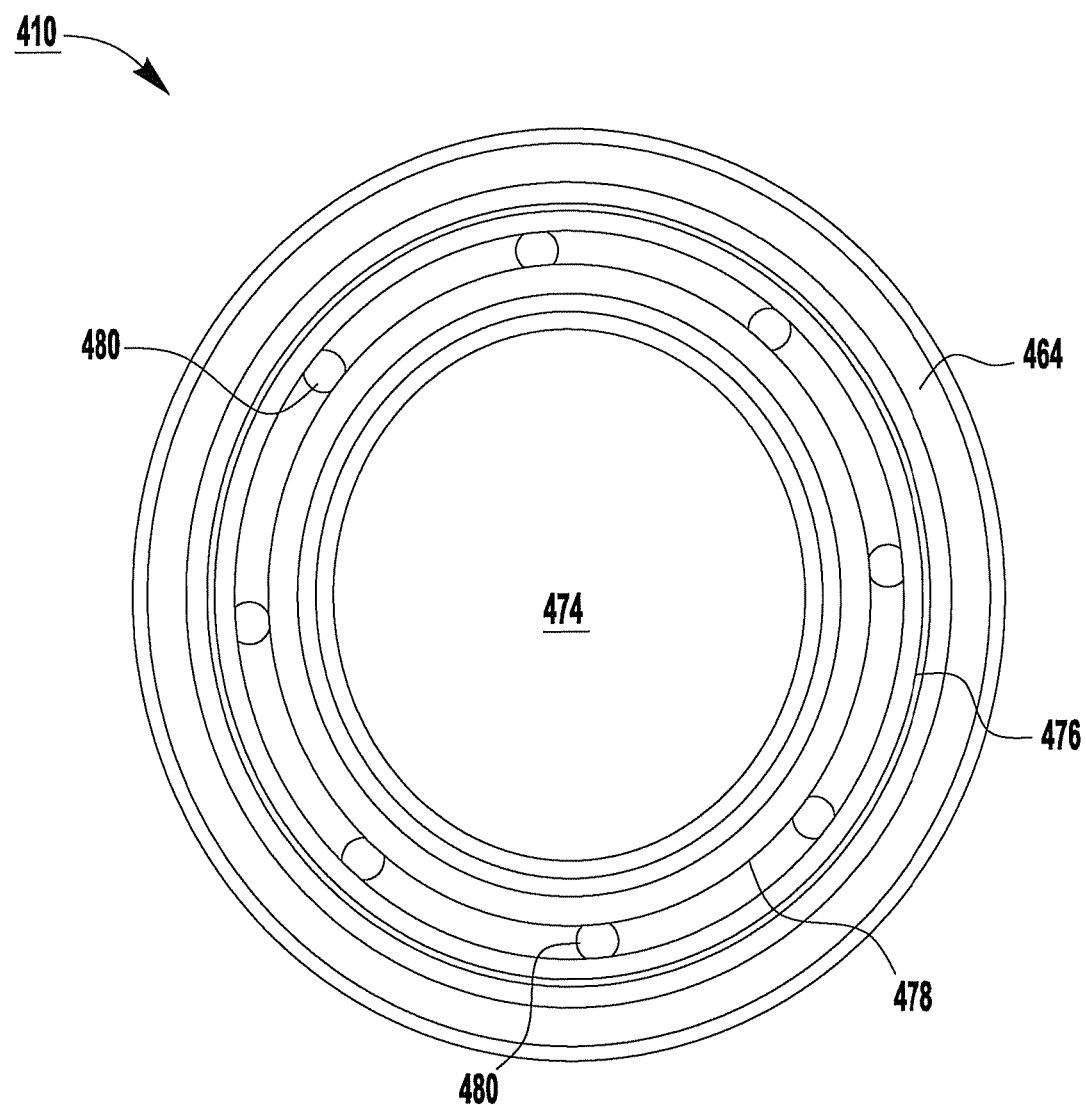
Figure 17A:
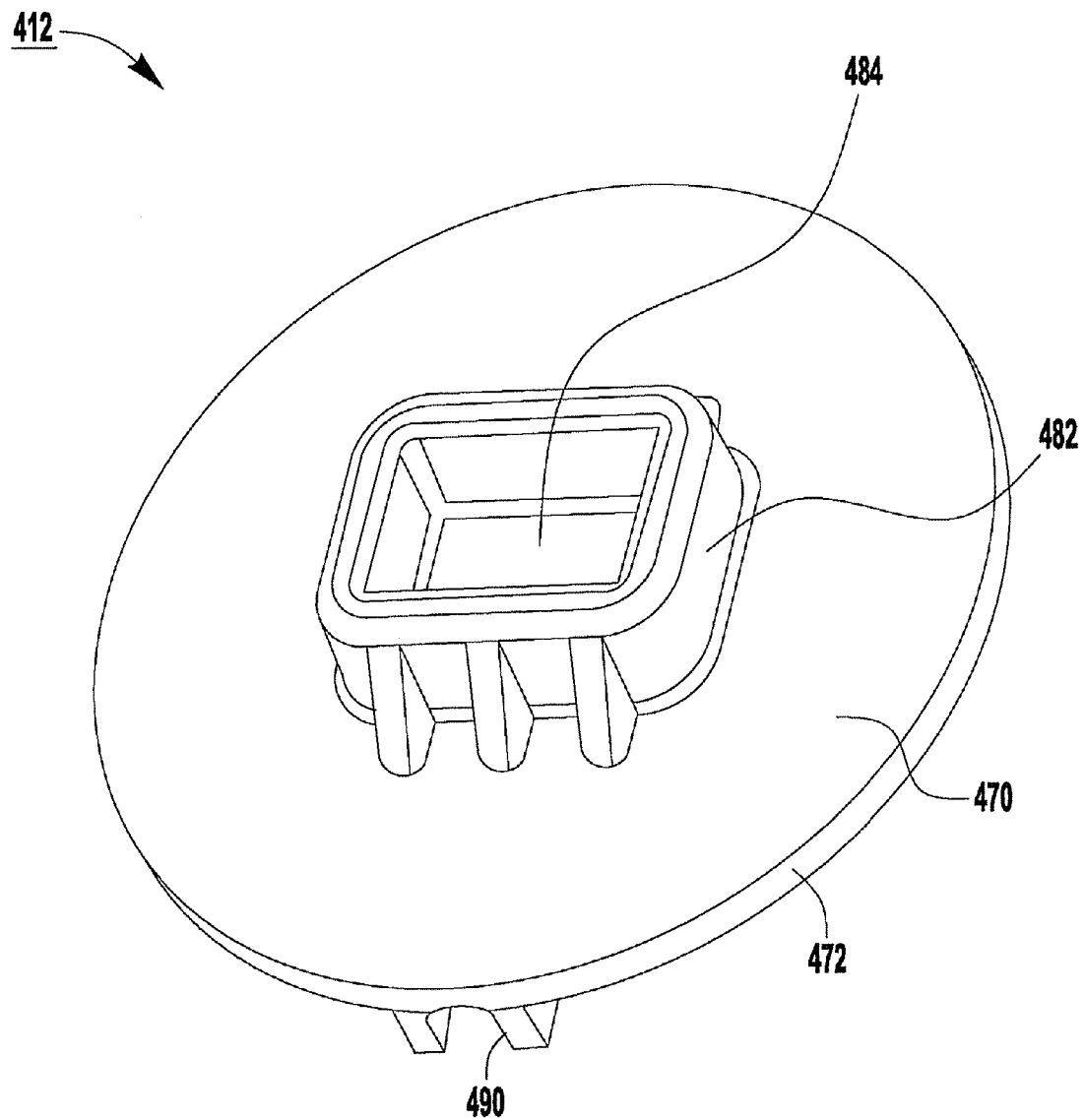
FIGS. 17A-17D show an exemplary carrier used in the exemplary valve cartridge of FIG. 12.
Figure 17B:
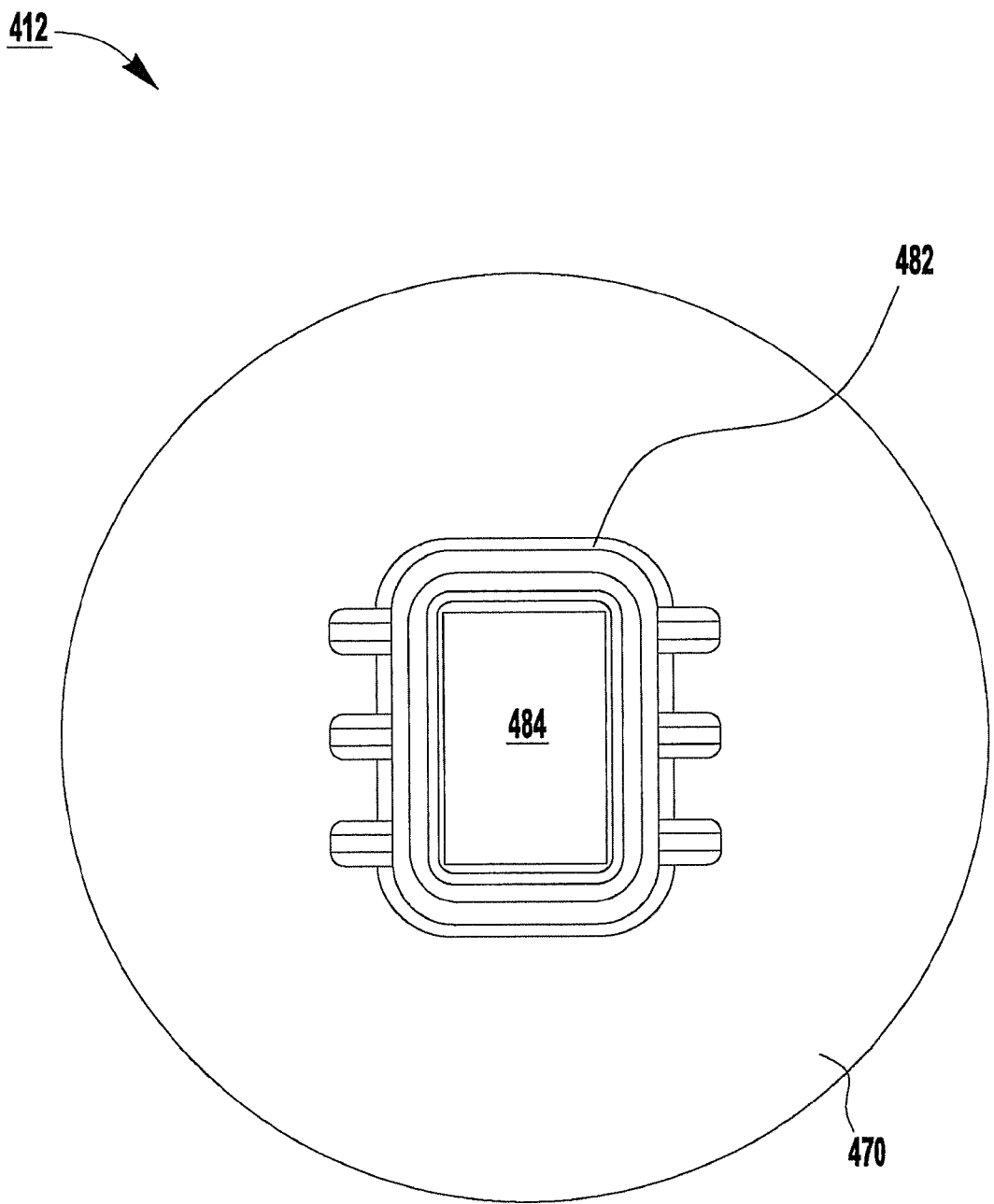
Figure 17C:
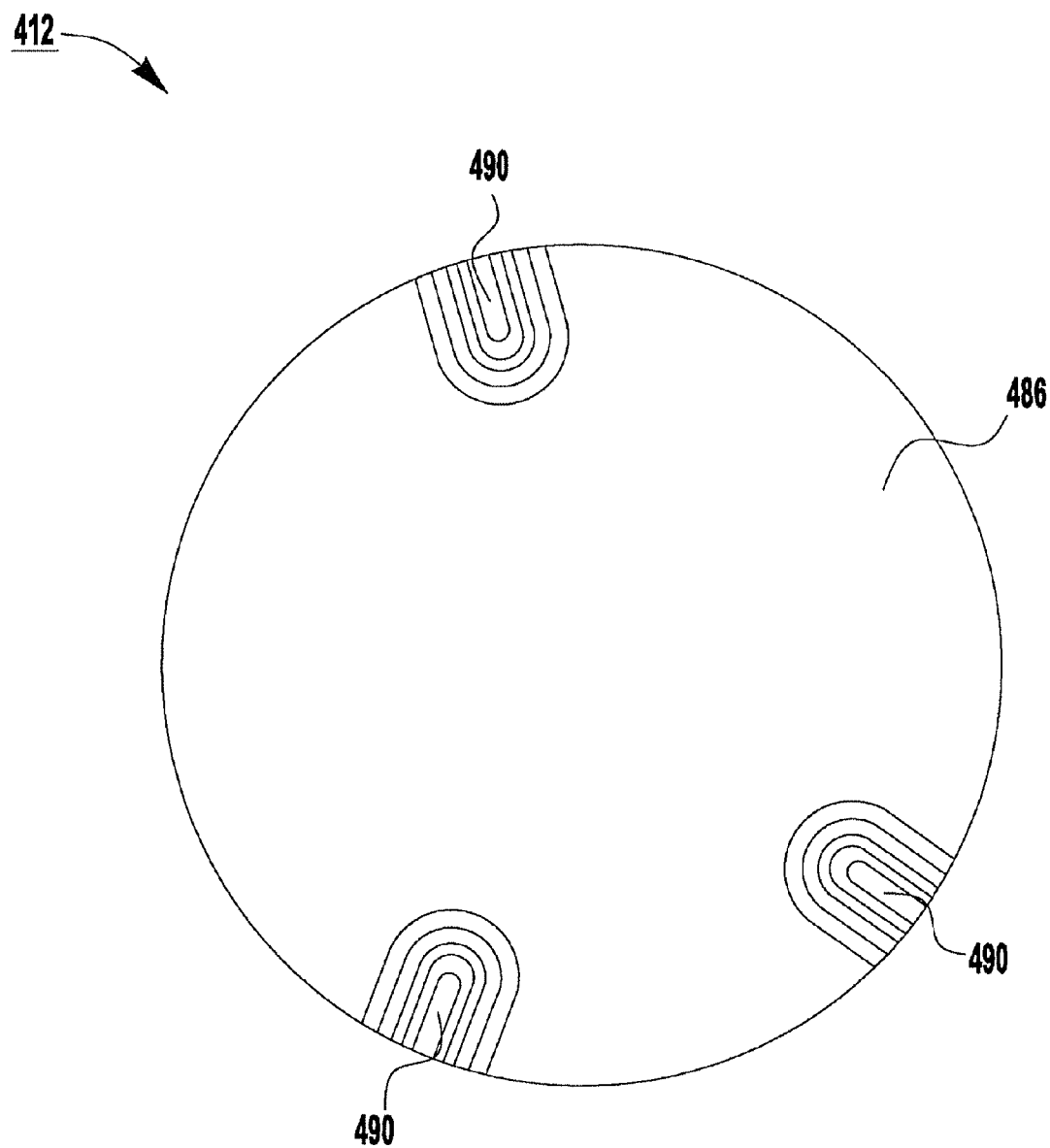
Figure 17D:
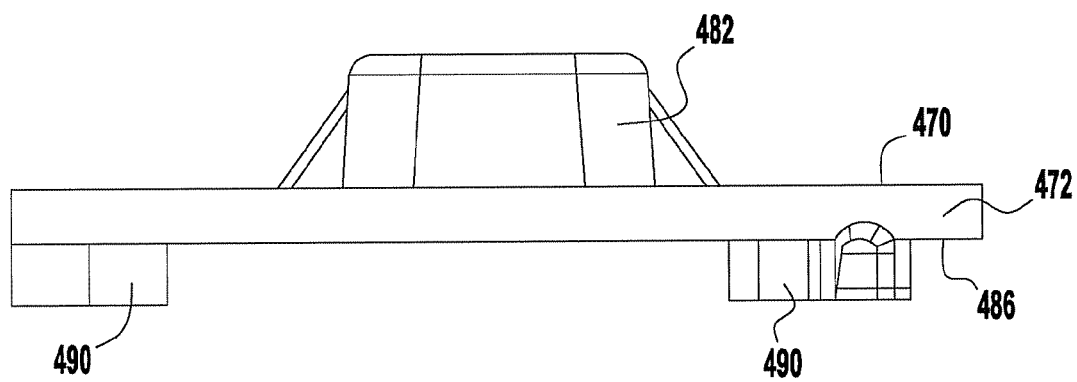

As shown in FIGS. 16A-16C, the bushing 410 includes a flat annular portion 460 and a raised annular portion 462. A diameter of the flat annular portion 460 is greater than a diameter of the raised annular portion 462. The bushing 410 is disposed below and can be spaced apart from the spring 408 in the cavity 426 of the upper housing 402 (see FIGS. 22B-22C). An upper surface 464 of the flat annular portion 460 of the bushing 410 contacts a third inner surface 466 of the upper housing 402, which is located below the installation ledge 440 (see FIGS. 13C and 22B). A lower surface 468 of the flat annular portion 460 of the bushing 410 rests on an upper surface 470 of a flat portion 472 of the carrier 412 (see FIGS. 17A-17B, 17D and 22B-22C). Additionally, the raised annular portion 462 of the bushing 410 extends into a portion of the cavity 426 of the upper housing 402 immediately above (and adjacent to) the installation ledge 440. The raised annular portion 462 of the bushing 410 is sized to fit closely in that portion of the cavity 426 of the upper housing 402 receiving the raised annular portion 462 of the bushing 410. Accordingly, the bushing 410 provides a support surface between the upper housing 402 and the carrier 412.

The bushing 410 has an opening 474 that extends through the flat annular portion 460 and the raised annular portion 462 of the bushing 410. The raised annular portion 462 can include a first raised annular portion 476 and a second raised annular portion 478 with ribs 480 disposed between the first and second raised annular portions 476, 478 (see FIG. 16C). A raised portion 482 of the carrier 412 extends into the opening 474 of the bushing 410 (see FIGS. 17A-17B and 17D). Additionally, a coupling recess 484 is formed in the raised portion 482 of the carrier 412. After the carrier 412 is installed in the valve cartridge 400, the raised portion 482 including the coupling recess 484 is positioned within the opening 474 of the bushing 410 and surrounded by the bushing 410 (see FIGS. 22B-22C).

The coupling recess 484 of the carrier 412 receives the projection 446 of the ball-stem 404, thereby connecting the actuating mechanism (i.e., the ball-stem 404) and the carrier 412 (see FIGS. 22B-22C). The projection 446 of the ball-stem 404 can have four sides that contact four corresponding sides of the coupling recess 484. The projection 446 of the ball-stem 404 does not contact a bottom surface of the coupling recess 484. It will be appreciated that notwithstanding the exemplary embodiments described herein, the ball-stem 404 can be connected to the carrier 412 in any suitable manner that allows the ball-stem 404 to impart translational and angular movement to the carrier 412.

As shown in FIGS. 17A-17D, the carrier 412 includes the flat portion 472 and the raised portion 482. A lower surface 486 of the flat portion 472 of the carrier 412 includes structure for interfacing with an upper surface 488 of the movable disk 414, such that the carrier 412 and the movable disk 414 are joined and do not move relative to one another. In one exemplary embodiment, the lower surface 486 of the carrier 412 includes three U-shaped projections 490 that friction fit into three corresponding U-shaped recesses 492 formed in the upper surface 488 of the movable disk 414. The spacing between adjacent U-shaped projections 490 (and, thus, the corresponding U-shaped recesses 492) can be varied so that the carrier 412 will only interface with the movable disk 414 in one orientation. Furthermore, as noted above, the carrier 412 also includes the coupling recess 484, which is formed in the raised portion 482 of the carrier 412. In this manner, the carrier 412 functions to interconnect the actuating mechanism (e.g., the ball-stem 404) and the dynamic sealing elements (e.g., the movable disk 414), in the valve cartridge 400.

Figure 18A:
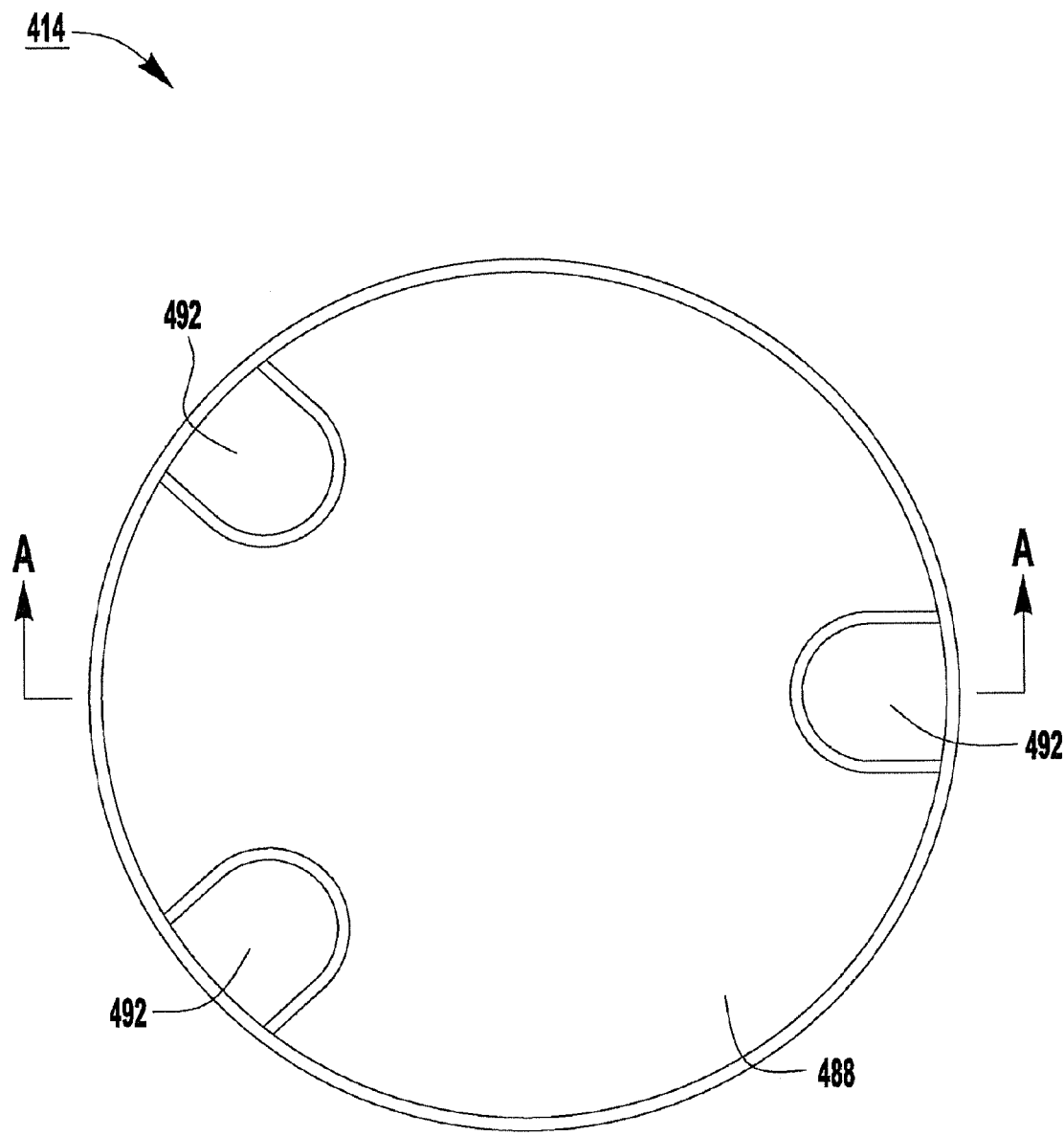
FIGS. 18A-18C show an exemplary movable disk used in the exemplary valve cartridge of FIG. 12.
Figure 18B:
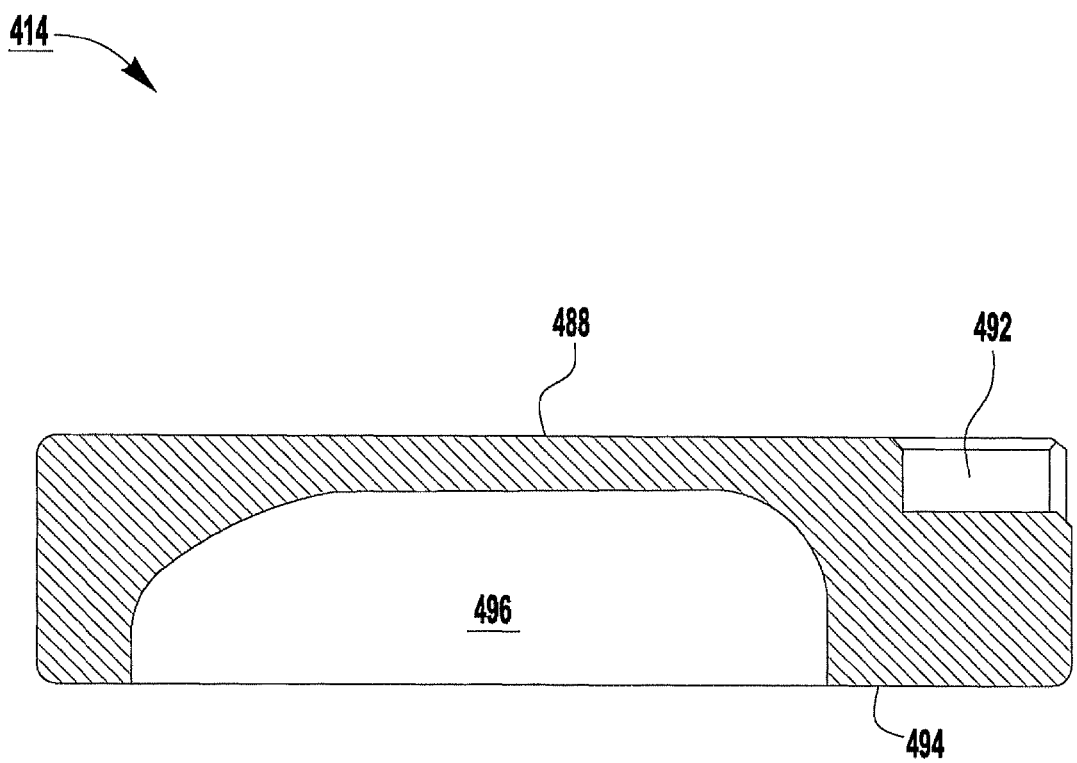
Figure 18C:
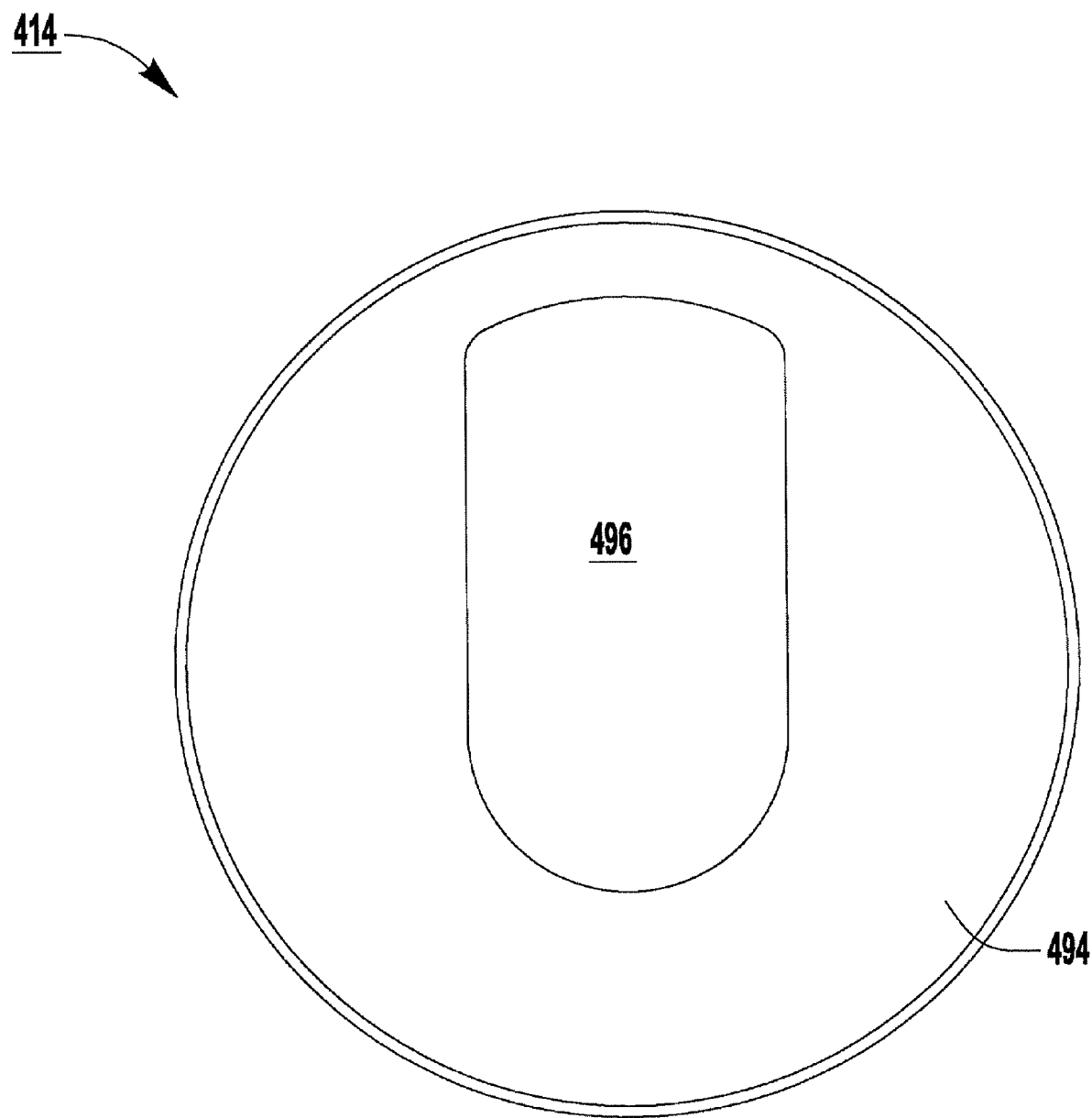
Figure 19A:
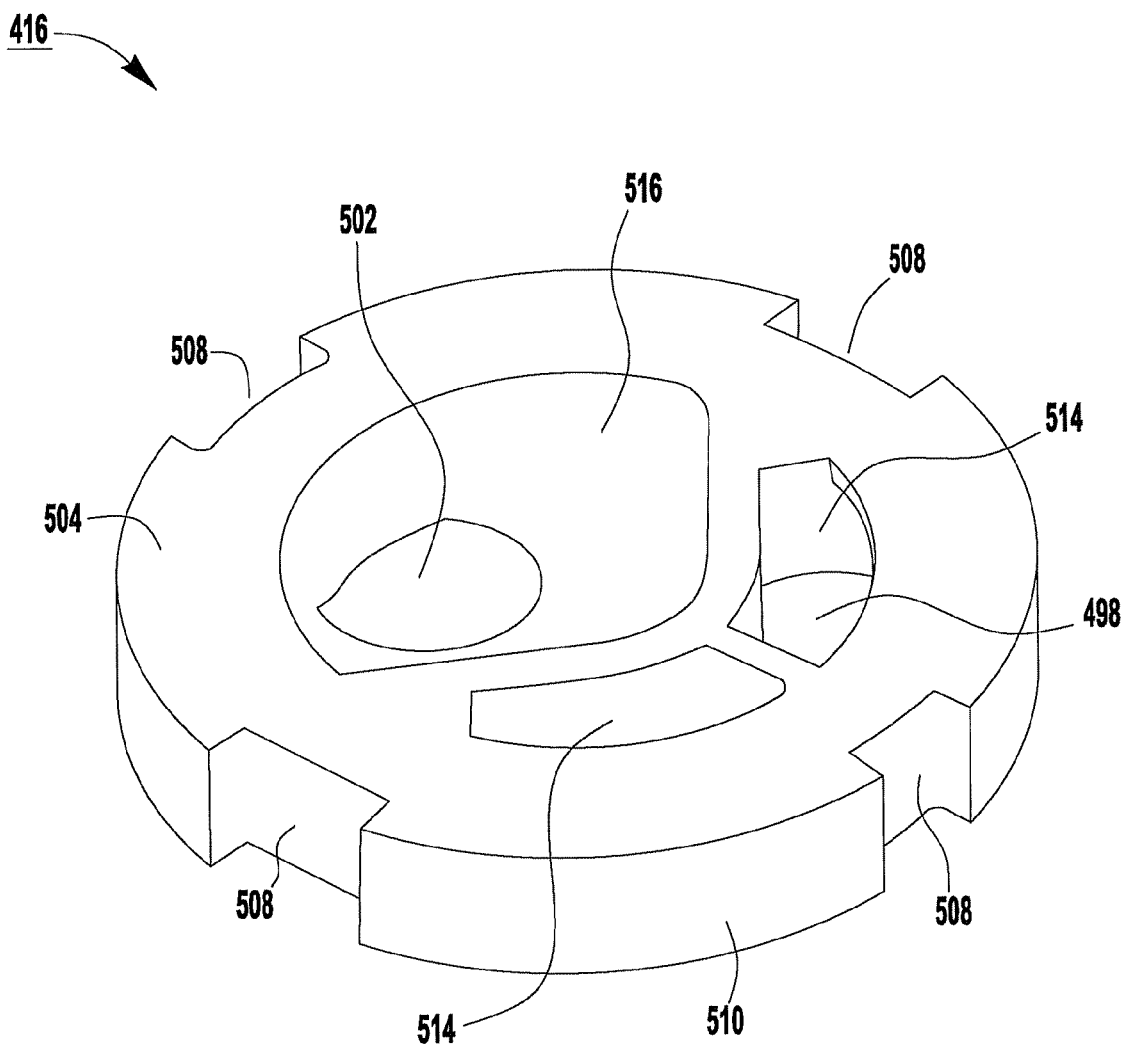
FIGS. 19A-19D show an exemplary fixed disk used in the exemplary valve cartridge of FIG. 12.
Figure 19B:
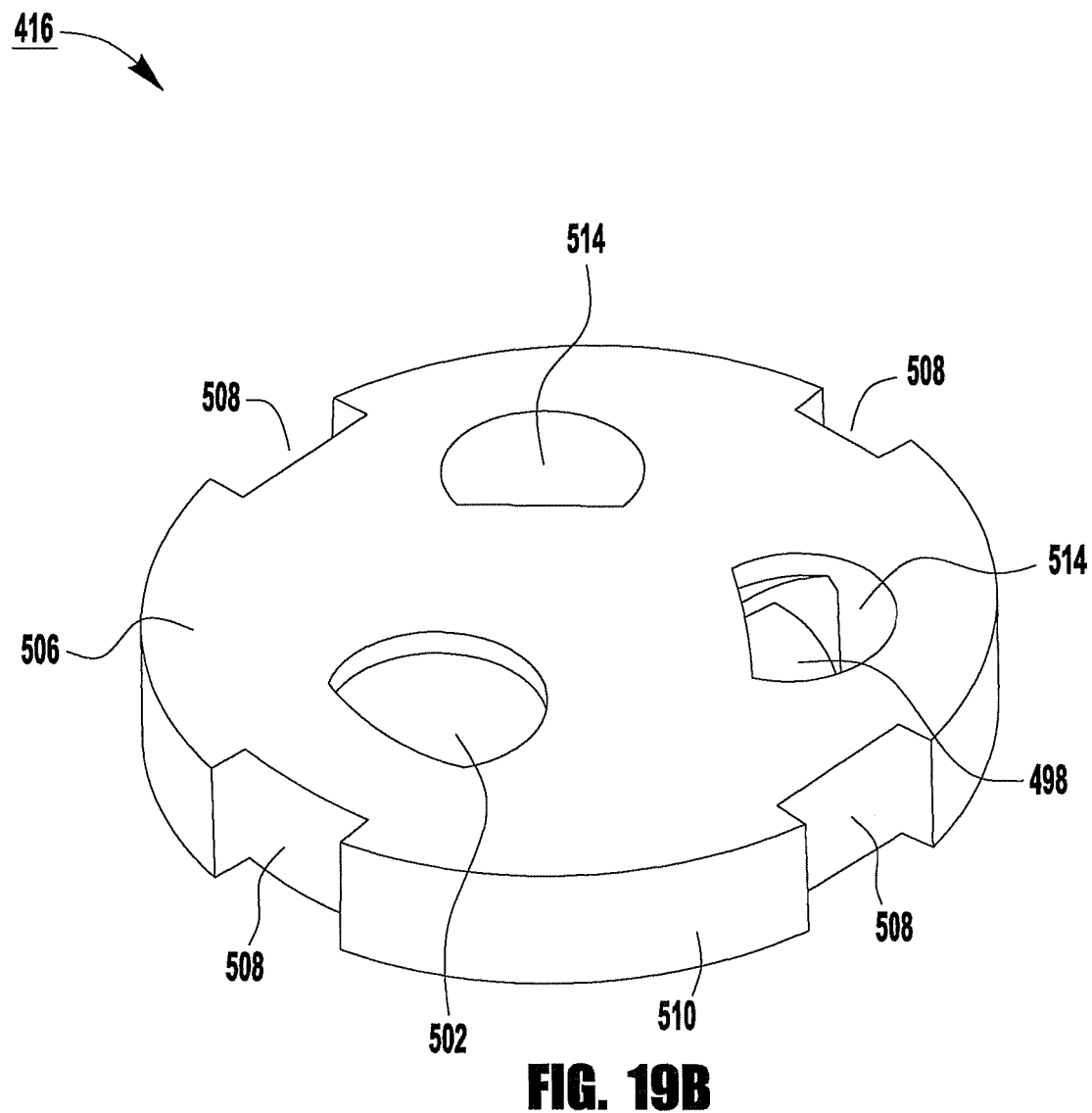
Figure 19C:
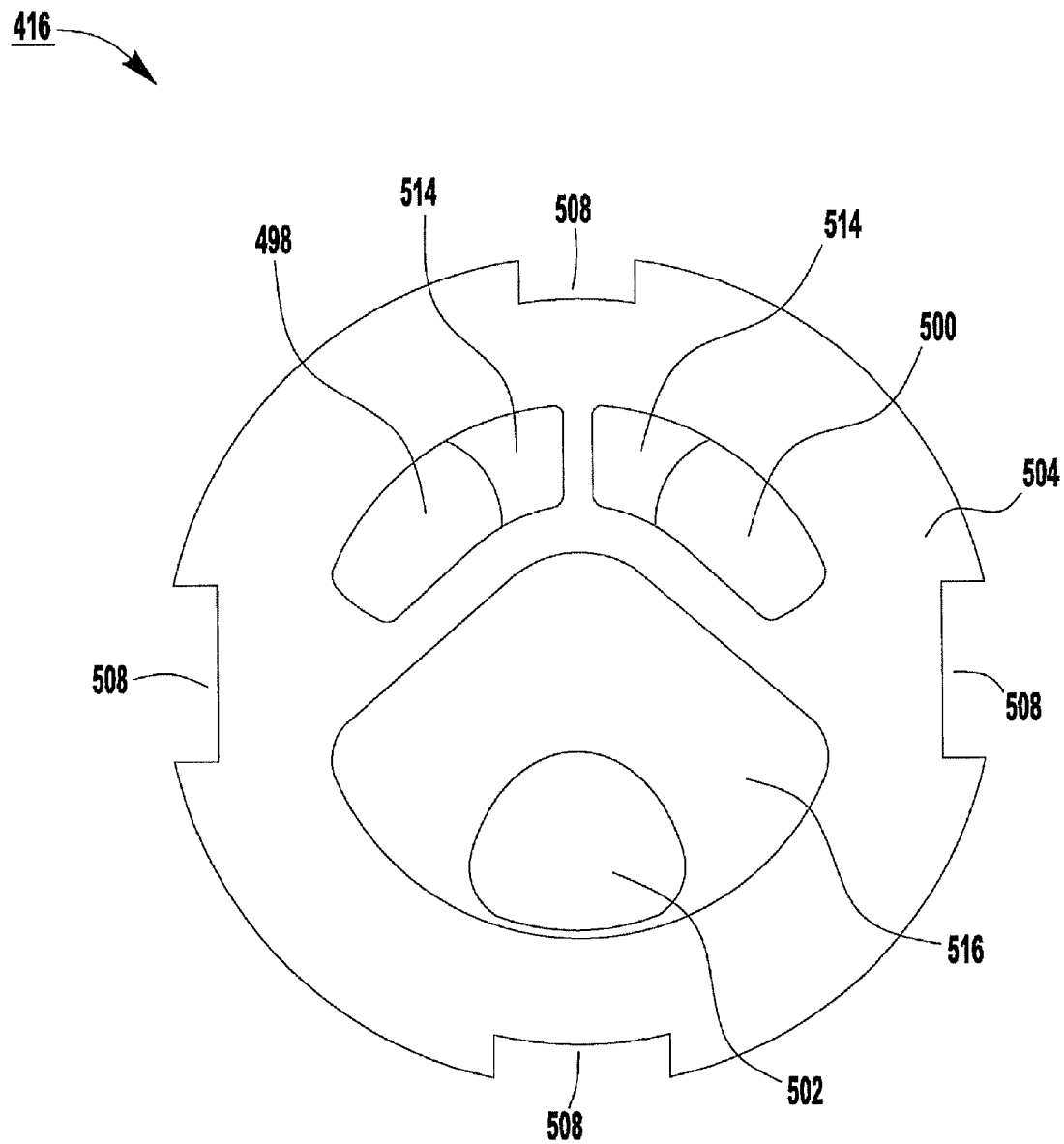
Figure 19D:
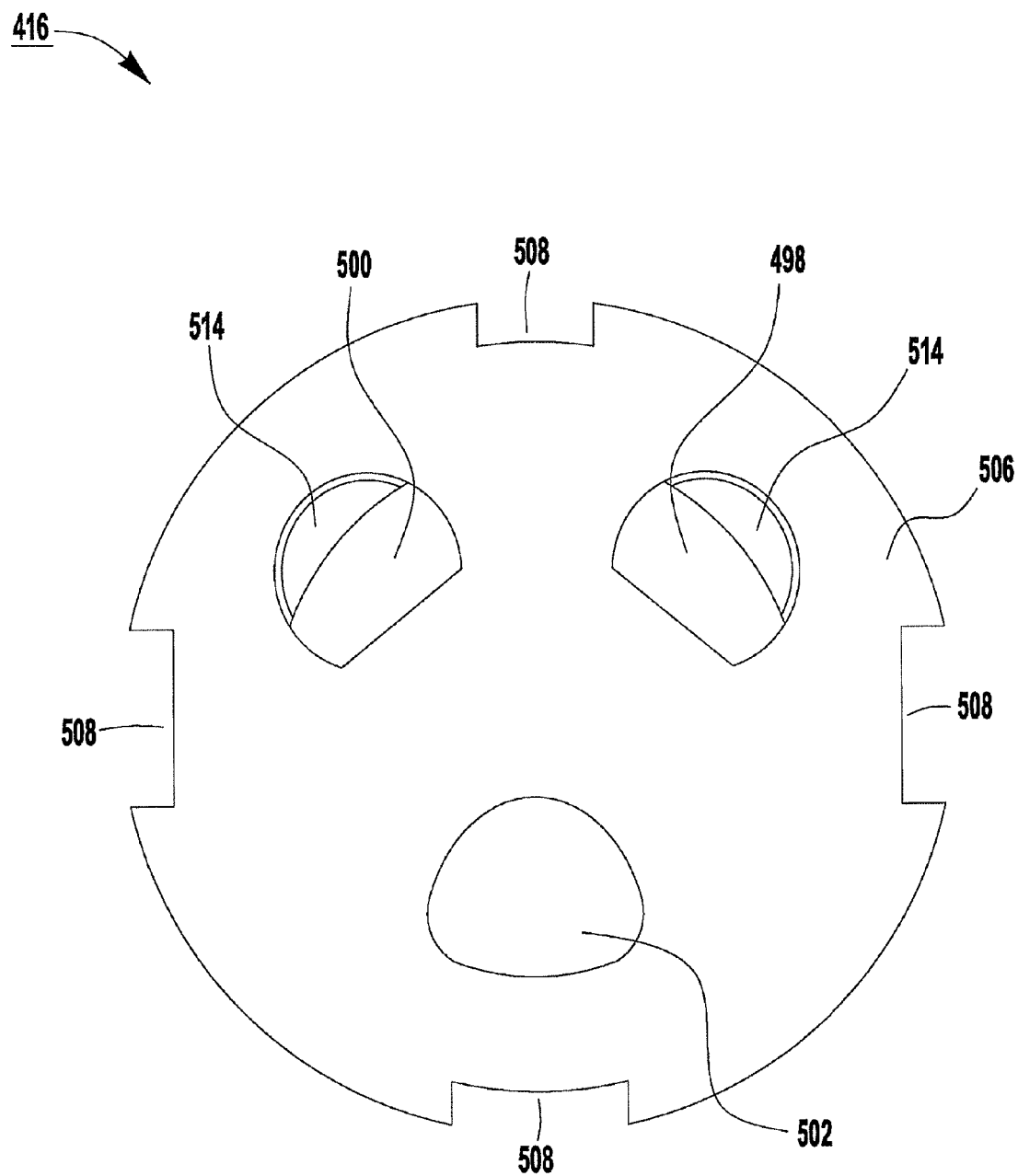

As shown in FIGS. 18A-18C, the movable disk 414 is a valve member formed as a plate, disk or the like that is movable relative to the upper housing 402. As noted above, the upper surface 488 of the movable disk 414 includes the U-shaped recesses 492. The upper surface 488 is substantially flat. A lower surface 494 of the movable disk 414 includes a mixing chamber 496 (i.e., a cavity formed in the movable disk 414). In an alternative exemplary embodiment, the mixing chamber 496 extends through the movable disk 414 (i.e., from the lower surface 494 to the upper surface 488). The lower surface 494 is substantially flat. The lower surface 494 of the movable disk 414 forms a sealing surface that can cover and uncover water inlet apertures 498 and 500 in the fixed disk 416 to allow only cold water, only hot water or both cold and hot water to flow through the fixed disk 416. The water flowing through the water inlet apertures 498 and 500 in the fixed disk 416 enters the mixing chamber 496 where the cold and hot water mix prior to being discharged through a water outlet aperture 502 in the fixed disk 416.

As shown in FIGS. 19A-19D, the fixed disk 416 is a valve member formed as a plate, disk or the like that is fixed relative to the upper housing 402. The fixed disk 416 has an upper surface 504 and a lower surface 506. The fixed disk 416 includes structure for interfacing with the lower housing 420 to fix (i.e., prevent rotation) of the fixed disk 416 relative to the housing assembly 438 once the valve cartridge 400 is assembled. For example, four notches 508 are formed along a periphery 510 of the fixed disk 416. One or more notches 508 engage corresponding projections 512 formed on the lower housing 420, thereby preventing the fixed disk 416 from rotating relative to the lower housing 420. In one exemplary embodiment, two notches 508 engage corresponding projections 512. By varying the size of and/or the spacing between the notches 508 (and, thus, the corresponding projections 512), it is possible to insure that the fixed disk 416 will interface with the lower housing 420 in only one orientation. Thus, because the fixed disk 416 is prevented from rotating relative to the lower housing 420 and the lower housing 420 is secured to the upper housing 402, as described below, the fixed disk 416 will not rotate within the housing assembly 438.

The fixed disk 416 includes the water inlet apertures 498 and 500, which correspond to a cold water inlet aperture and a hot water inlet aperture, respectively. The fixed disk 416 also includes the water outlet aperture 502 through which cold water flowing through the cold water inlet aperture 498, hot water flowing through the hot water inlet aperture 500 or a mixture of the cold and hot water can flow to a water outlet passage of the valve body. The cold water inlet aperture 498 and the hot water inlet aperture 500 of the fixed disk 416 each have walls 514 that slope from near the lower surface 506 of the fixed disk 416 to near the upper surface 504 of the fixed disk 416 to improve the flow of water through the fixed disk 416 and into the valve cartridge 400. The water outlet aperture 502 of the fixed disk 416 has walls 516 that slope from near the upper surface 504 of the fixed disk 416 to near the lower surface 506 of the fixed disk 416 to improve the flow of water through the fixed disk 416 and out of the valve cartridge 400.

Figure 20A:
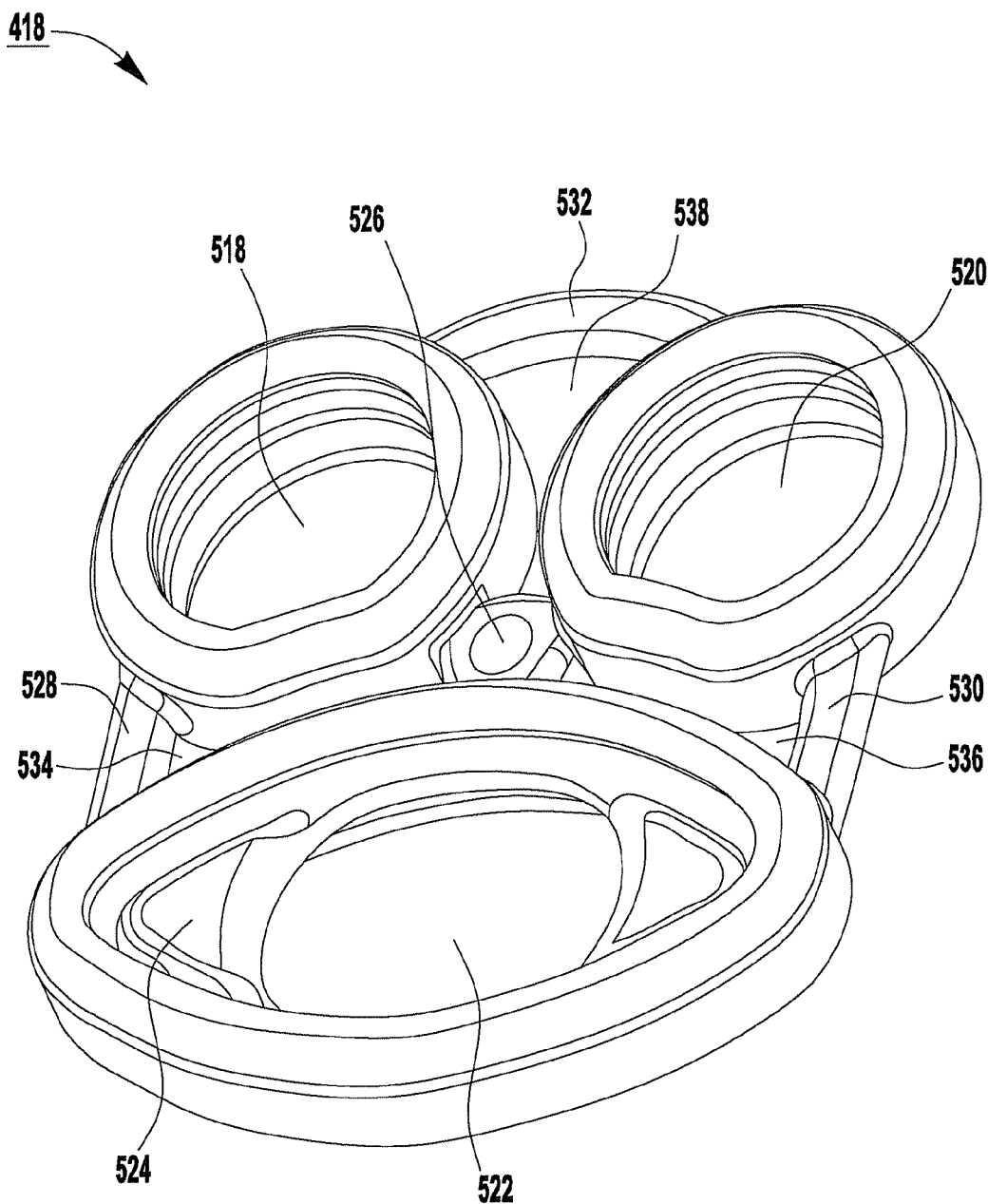
FIGS. 20A-20B show an exemplary base seal used in the exemplary valve cartridge of FIG. 12.
Figure 20B:
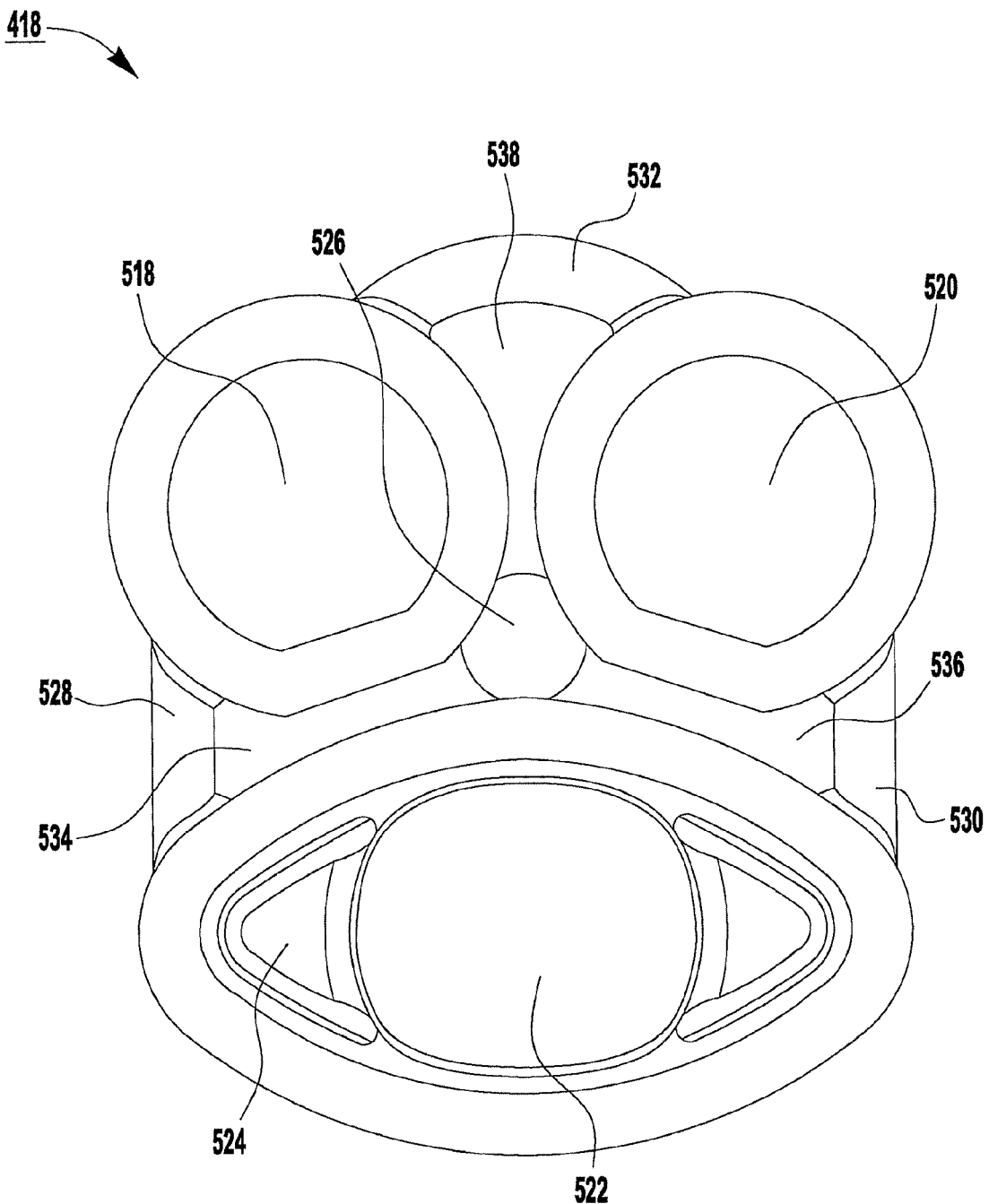
Figure 21A:
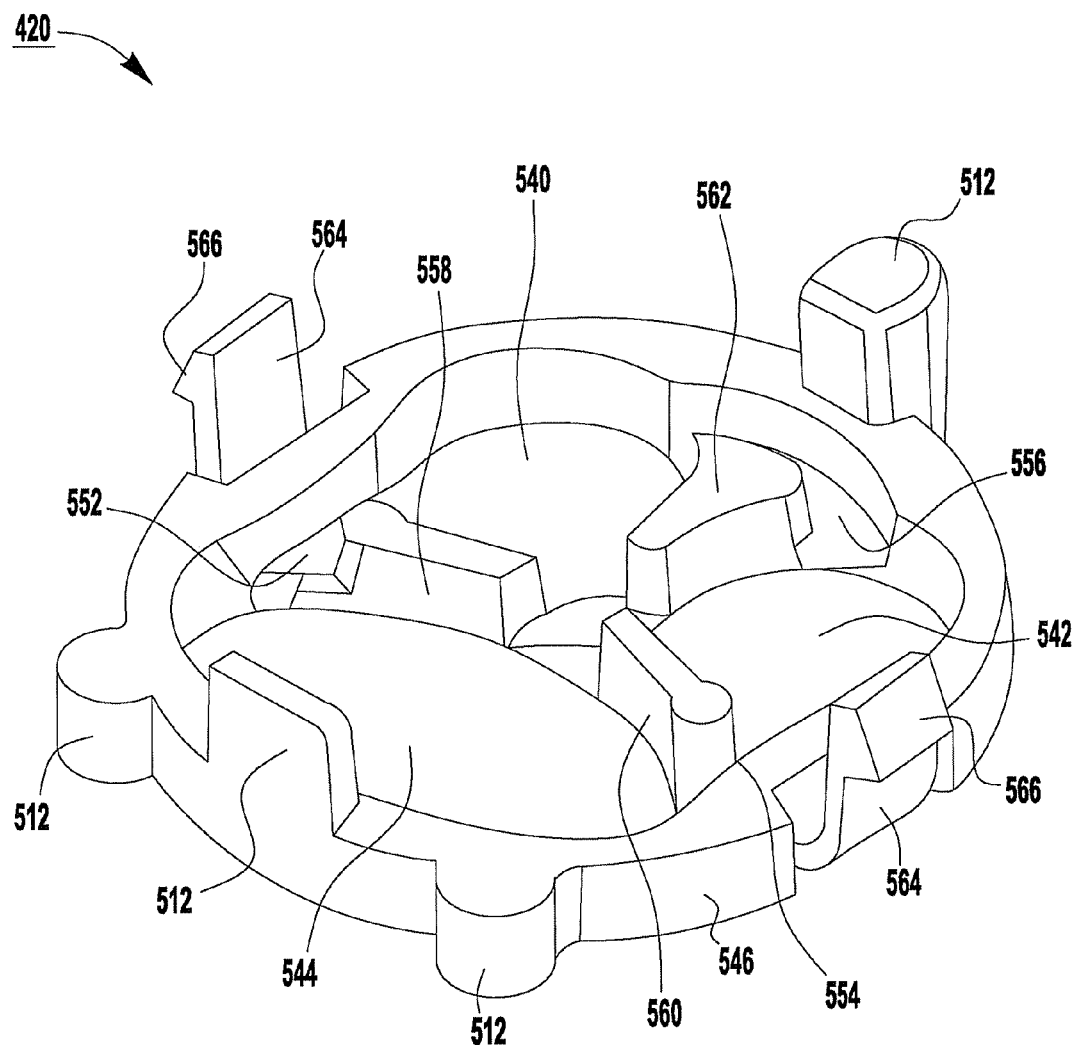
FIGS. 21A-21D show an exemplary lower housing used in the exemplary valve cartridge of FIG. 12.
Figure 21B:
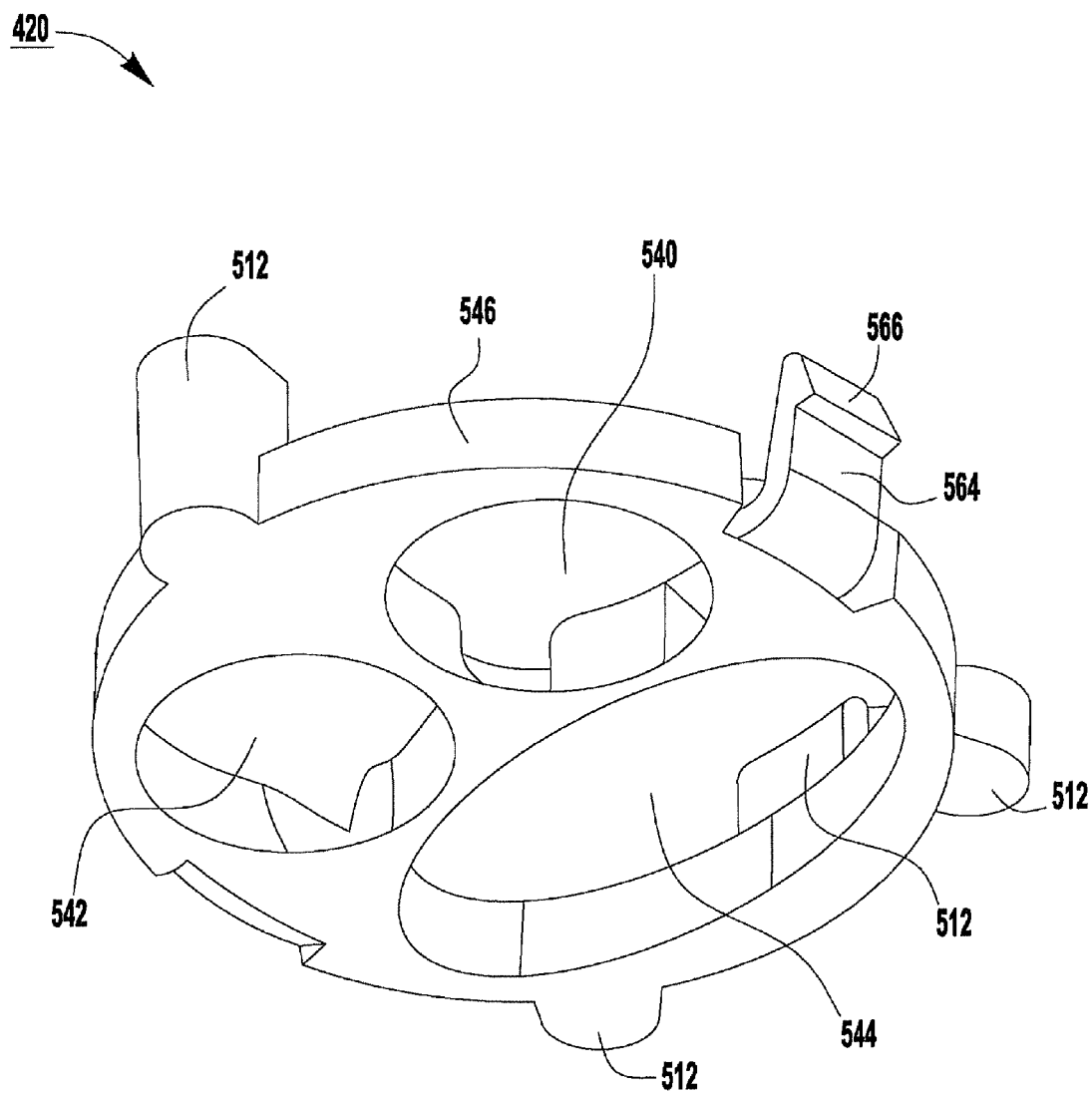
Figure 21C:
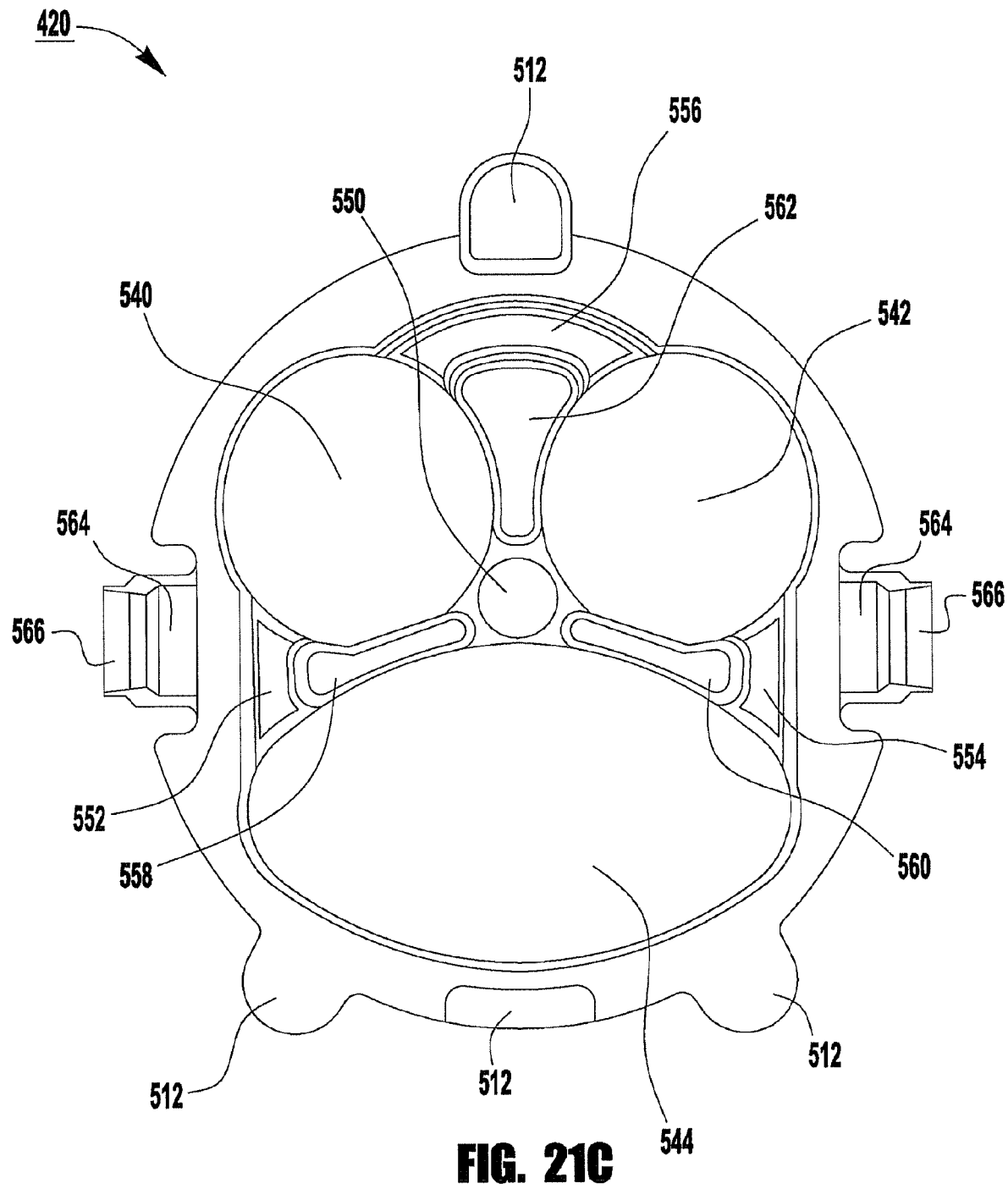
Figure 21D:
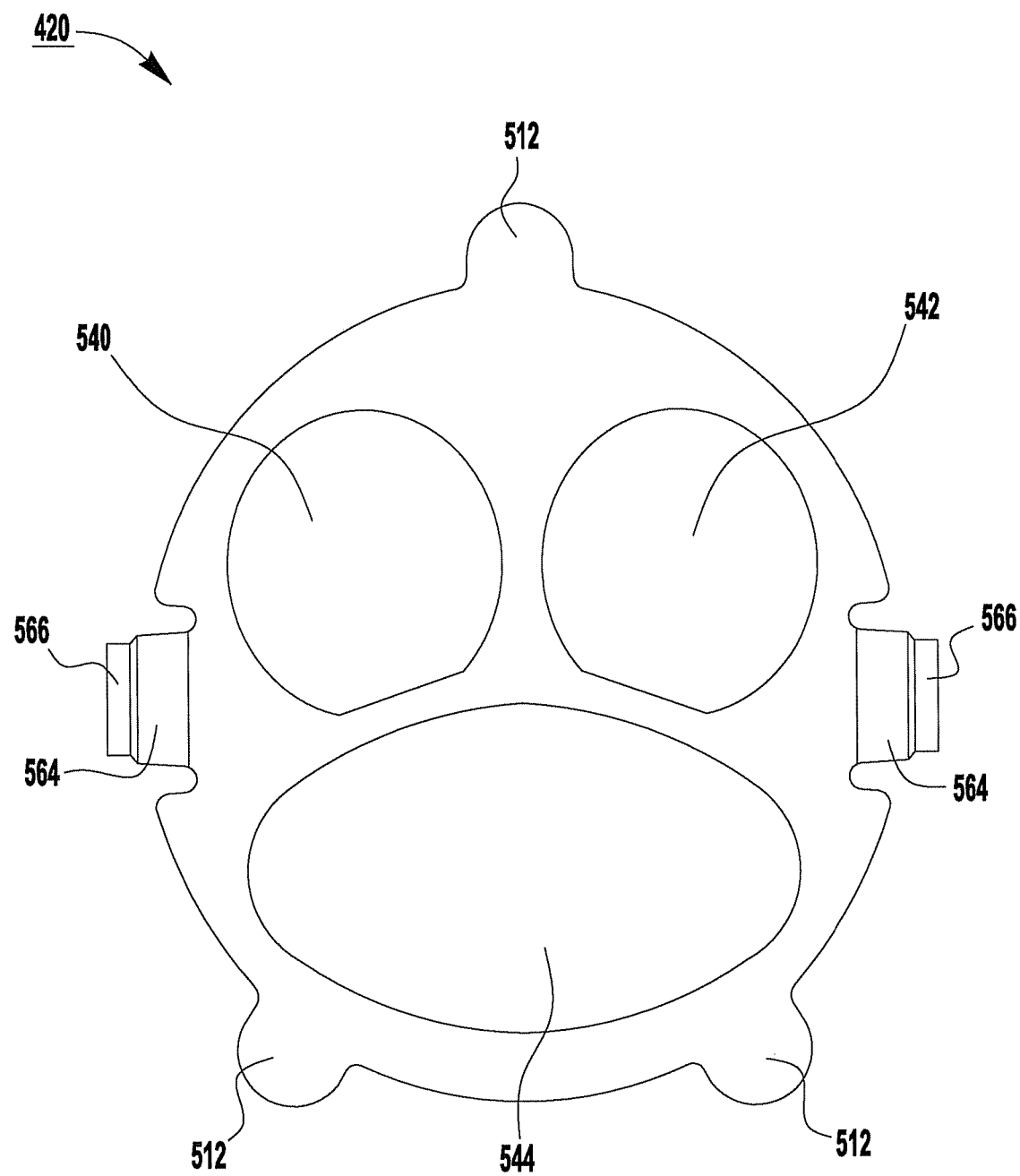

As shown in FIGS. 20A-20B, the base seal 418 is a sealing member formed of an elastic material (e.g., rubber). The base seal 418 forms a watertight seal around the cold water inlet aperture 498, the hot water inlet aperture 500 and the water outlet aperture 502 of the fixed disk 416. Like the fixed disk 416, the base seal 418 has a cold water inlet aperture 518, a hot water inlet aperture 520 and a water outlet aperture 522. In one exemplary embodiment, the water outlet aperture 522 of the base seal 418 is formed by inserting a member 524 (e.g., a plastic insert) having the water outlet aperture 522 therein into an opening in the base seal 418. In another exemplary embodiment, the base seal 418 is formed integrally with the lower housing 420.

The cold water inlet aperture 518, the hot water inlet aperture 520 and the water outlet aperture 522 are all connected by a hub 526 near the center of the base seal 418. Furthermore, the cold water inlet aperture 518 is connected to the water outlet aperture 522 by a first connection 528; the hot water inlet aperture 520 is connected to the water outlet aperture 522 by a second connection 530; and the cold water inlet aperture 518 is connected to the hot water inlet aperture 520 by a third connection 532. The joining of the cold water inlet aperture 518 to the water outlet aperture 522 by the first connection 528 forms a first space 534; the joining of the hot water inlet aperture 520 to the water outlet aperture 522 by the second connection 530 forms a second space 536; and the joining of the cold water inlet aperture 518 to the hot water inlet aperture 520 by the third connection 532 forms a third space 538.

It is important that the apertures 498, 500 and 502 in the fixed disk 416 are aligned with the apertures 518, 520 and 522 in the base seal 418 when the valve cartridge 400 is assembled. Accordingly, as described below, the hub 526, the first connection 528, the second connection 530, the third connection 532, the first space 534, the second space 536 and the third space 538 are used to align the base seal 418 in the lower housing 420 and, thus, with the fixed disk 418.

As shown in FIGS. 21A-21D and 22B-22C, the lower housing 420 interfaces with the upper housing 402 to form the housing assembly 438 for retaining the components (e.g., the bushing 410, the carrier 412, the movable disk 414, the fixed disk 416 and the base seal 418) therein (e.g., in the cavity 426 of the upper housing 402) after assembly of the valve cartridge 400. The lower housing 420, for example, can be made of plastic or metal. The lower housing 420 can be formed from the same material as the upper housing 402.

Furthermore, the lower housing 420 functions as a support member to orient and retain the fixed disk 416 and the base seal 418 prior to assembly of the valve cartridge 400. Similar to the fixed disk 416 and the base seal 418, the lower housing 420 includes a cold water inlet aperture 540, a hot water inlet aperture 542 and a water outlet aperture 544 (see FIGS. 21A-21D). As noted above, the lower housing 420 also includes the projections 512. One or more projections 512 can extend above a sidewall 546 of the lower housing 420. In one exemplary embodiment, two projections 512 extend above the sidewall 546. One or more projections 512 can have a height that is substantially the same as a height of the sidewall 546. In one exemplary embodiment, two projections 512 have a height that is substantially the same as the height of the sidewall 546.

One or more projections 512 can fit into corresponding openings 548 formed in the upper housing 402 below the keys 442 (see FIGS. 13A-13C). In one exemplary embodiment, three projections 512 fit into three openings 548. These projections 512 have a shape that is substantially the same as a shape of the keys 442, for example, a lobular shape. By fitting into the openings 548 below the keys 442, the projections 512 also function as part of the keys 442, for example, by engaging the complementary-shaped recesses in the valve body.

The size and/or shape of the projections 512 can be varied such that the lower housing 420 will interface with the fixed disk 416 and the upper housing 402 in only one orientation, thereby insuring that the fixed disk 416 will be properly oriented relative to the upper housing 402 and the lower housing 420 when the valve cartridge 400 is assembled. By engaging the notches 508 in the fixed disk 416, the projections 512 also prevent the fixed disk 416 from rotating relative to the lower housing 420 (and, thus, the upper housing 402).

The lower housing 420 includes a first recess 550, a second recess 552, a third recess 554 and a fourth recess 556. The lower housing 420 also includes a first projection 558, a second projection 560 and a third projection 562. The hub 526, the first connection 528, the second connection 530 and the third connection 532, respectively, of the base seal 418 fit into the first recess 550, the second recess 552, the third recess 554 and the fourth recess 556, respectively, of the lower housing 420. Furthermore, the first projection 558, the second projection 560 and the third projection 562, respectively, of the lower housing 420 fit into the first space 534, the second space 536 and the third space 538, respectively, of the base seal 418. Accordingly, the lower housing 420 orients, fixes and retains the base seal 418 in the lower housing 420.

The lower housing 420 also includes a pair of elastic flanges 564 that each have an angled upper portion 566. The notches 508 in the fixed disk 416 allow the elastic flanges 564 to be pressed inward (i.e., toward a central vertical axis of the valve cartridge 400), such that the angled upper portions 566 can enter the cavity 426 in the upper housing 402. When the angled upper portions 566 are aligned with corresponding openings 568 formed in the upper housing 402 (see FIGS. 13A-13C), the elastic flanges 564 press outward and the angled upper portions 566 are received in the openings 568. In this manner, the lower housing 420 (including the fixed disk 416 and the base seal 418 interfaced therewith) can be secured to the upper housing 402 (see FIGS. 22B-22C).

It should be noted that although the notches 508 of the fixed disk 416 interface with the projections 512 of the lower housing 420 to prevent the fixed disk 416 from rotating within the lower housing 420 (and, thus, the upper housing 402), the fixed disk 416 is nonetheless allowed to move axially within the housing assembly 438 (i.e., the upper housing 402 and the lower housing 420). In this manner, compression of the base seal 418 exerts a loading force on the movable disk 414 and the fixed disk 416. Accordingly, the movable disk 414 and the fixed disk 416 are kept in water-tight engagement with one another, after installation of the valve cartridge 400.

The position and the orientation of the movable disk 414 relative to the fixed disk 416 are controlled by the stem portion 432 of the ball-stem 404 projecting out of the upper housing 402 through the upper opening 430. For example, pivoting the stem portion 432 of the ball-stem 404 about a pivot (e.g., the pin 406) changes the position of the movable disk 414 relative to the fixed disk 416, which changes the flow rate of the water. Rotating the stem portion 432 of the ball-stem 404 changes the orientation of the movable disk 414 relative to the fixed disk 416, which changes the temperature of the water.

An operating member (e.g., the operating member 330 shown in FIG. 11) such as a handle, knob or the like can be connected to the stem portion 432 of the ball-stem 404 to facilitate manipulation of the stem portion 432 by a user. Accordingly, after the valve cartridge 400 is installed in the valve body, the user can manipulate the operating member which moves the stem portion 432 of the ball-stem 404 to change the position and/or orientation of the movable disk 414 relative to the fixed disk 416, thereby controlling the flow rate and temperature of the water flowing through the valve cartridge 400 and out a plumbing fixture (e.g., the plumbing fixture 332 shown in FIG. 11).

Pivoting of the stem portion 432 of the ball-stem 404 about the pin 406 can be limited by the stem portion 432 contacting opposing surfaces of the upper opening 430 of the upper housing 402. Thus, the stem portion 432 of the ball-stem 404 contacts a first surface 570 of the upper opening 430 of the upper housing 402 when the valve cartridge 400 is in a fully closed position corresponding to a flow rate of zero (see FIG. 22C). The stem portion 432 of the ball-stem 404 contacts a second surface 572 of the upper opening 430 of the upper housing 402 when the valve cartridge 400 is in a fully open position corresponding to a maximum flow rate.

Rotation of the stem portion 432 of the ball-stem 404 can be limited by the distal ends of the pin 406 contacting end portions 574 of the slots 444 (see FIG. 22A). Accordingly, the length of the slots 444, which function as temperature limit stops, define the range of temperatures for which the valve cartridge 400 can deliver the water.

The valve cartridge 400 has a low point of contact (i.e., the installation ledge 440 formed on the upper housing 402) on which the retention nut bears down. The installation ledge 440 is a circular ledge that extends around the upper housing 402 where the domed portion 422 of the upper housing 402 meets the cylindrical portion 424 of the upper housing 402. The installation ledge 440 is the highest point on the housing assembly 438 that contacts the retention nut.

In an exemplary embodiment of the exemplary valve cartridge 400, one or more installation ledges (e.g., the installation ledge 440 are formed on the housing assembly 438 of the valve cartridge 400. The highest of the installation ledges is a low point of contact on the housing assembly 438 for installing the valve cartridge 400 in the valve body.

A ratio $R_1$ of a height $h_1$ of the highest installation ledge on the housing assembly 438 to a largest outer diameter d of the housing assembly 438 is less than or equal to 0.53 (see FIG. 22C), which can be expressed as $h_1/d \leq 0.53$. In another exemplary embodiment of the exemplary valve cartridge 400, the ratio $R_1$ of the height $h_1$ to the largest outer diameter d is less than or equal to 0.52. In still another exemplary embodiment, the ratio $R_1$ of the height $h_1$ to the largest outer diameter d is approximately equal to 0.53.

According to still another exemplary embodiment of the exemplary valve cartridge 400, a ratio $R_2$ of the height $h_1$ to a height $h_2$ of the housing assembly 438 is less than or equal to 0.49 (see FIG. 22C), which can be expressed as $h_1/h_2 \leq 0.49$ In another exemplary embodiment, the ratio $R_2$ of the height $h_1$ to the height $h_2$ is less than or equal to 0.47. In still another exemplary embodiment, the ratio $R_2$ of the height $h_1$ to the height $h_2$ is approximately equal to 0.48.

According to yet another exemplary embodiment of the exemplary valve cartridge 400, a ratio $R_3$ of the height $h_1$ to a height $h_3$ of the pin 406 (e.g., from a bottom of the housing assembly 438 to a centerline of the pin 406) is less than or equal to 0.67 (see FIG. 22C), which can be expressed as $h_1/h_3 \leq 0.67$. In another exemplary embodiment, ratio $R_3$ of the height $h_1$ to the height $h_3$ is less than or equal to 0.65. In still another exemplary embodiment, ratio $R_3$ of the height $h_1$ to the height $h_1$ is approximately equal to 0.66.

According to another exemplary embodiment of the exemplary valve cartridge 400, the highest installation ledge on the housing assembly 438 is below an actuating mechanism (e.g., the ball-stem 404) of the valve cartridge 400 (see FIG. 22C). In still another exemplary embodiment of the exemplary valve cartridge 400, the highest installation ledge on the housing assembly 438 is below the actuating mechanism and above a mixing chamber (e.g., the mixing chamber 496) of the valve cartridge 400. In yet another exemplary embodiment of the exemplary valve cartridge 400, the highest installation ledge on the housing assembly 438 is below the actuating mechanism and above a fixed disk (e.g., the fixed disk 416) of the valve cartridge 400.

According to an exemplary embodiment of the exemplary valve cartridge 400, the height $h_1$ of the highest installation ledge on the housing assembly 438 is between 0.641 and 0.651 inches. In one exemplary embodiment, the height $h_1$ of the highest installation ledge on the housing assembly 438 is approximately equal to 0.646 inches.

According to another exemplary embodiment of the exemplary valve cartridge 400, the height $h_2$ of the housing assembly 438 is between 1.339 and 1.369 inches. In one exemplary embodiment, the height $h_2$ of the housing assembly 438 is approximately equal to 1.354 inches.

According to still another exemplary embodiment of the exemplary valve cartridge 400, the height $h_3$ of the pin 406 is between 0.973 and 0.993 inches. In one exemplary embodiment, the height $h_3$ of the pin 406 is approximately equal to 0.983 inches.

According to yet another exemplary embodiment of the exemplary valve cartridge 400, the outer diameter d of the housing assembly 438 is between 1.220 and 1.228 inches. In one exemplary embodiment, the outer diameter d of the housing assembly 438 is approximately equal to 1.224 inches.

As illustrated by way of the exemplary embodiments described herein, the installation ledge 440 (as a highest installation ledge on the housing assembly 438) is a low point of contact on the housing assembly 438 on which the retention nut can bear down during installation of the valve cartridge 400 in the valve body. Accordingly, the valve cartridge 400 has a compact structure that provides increased flexibility in the design of plumbing fixtures (e.g., the plumbing fixture 332 shown in FIG. 11) that will accommodate the valve cartridge 400. Furthermore, the low installation ledge 440 allows less material to be used in forming the valve body, since sidewalls of the valve body can be made shorter (see FIG. 11). As a result, the low installation ledge 440 provides a cost savings.

The above description of specific embodiments has been given by way of example. From the disclosure given, those skilled in the art will not only understand the general inventive concept and its attendant advantages, but will also find apparent various changes and modifications to the structures and methods disclosed. It is sought, therefore, to cover all such changes and modifications as fall within the spirit and scope of the general inventive concept, as defined herein, and equivalents thereof.

The invention claimed is:

1. A valve cartridge for controlling a flow rate of a fluid and operable to be secured in a valve body by a retaining member, the valve cartridge comprising:
 a housing having a domed portion proximate a top surface of the housing and a cylindrical portion proximate a bottom surface of the housing;
 an actuating mechanism; and
 a fluid control member,
 wherein the fluid control member is disposed in the cylindrical portion of the housing,
 wherein a first portion of the actuating mechanism extends through an opening in the top surface of the housing and a second portion of the actuating mechanism is disposed in the domed portion of the housing,
 wherein movement of the actuating mechanism moves the fluid control member to vary the flow rate of the fluid,
 wherein an installation ledge is formed where the domed portion of the housing meets the cylindrical portion of the housing, the installation ledge being the highest point on the housing for contacting the retaining member, a height of the installation ledge being the height from the bottom surface of the housing to the installation ledge, and
 wherein the installation ledge is closer to the bottom surface of the housing than the top surface of the housing.

2. The valve cartridge of claim 1, wherein a ratio of the height of the installation ledge on the housing to a largest outer diameter of the housing is less than or equal to 0.50.

3. The valve cartridge of claim 2, wherein the height of the installation ledge is between 0.486 and 0.494 inches.

4. The valve cartridge of claim 1, wherein a ratio of the height of the installation ledge on the housing to a height of the housing between the top surface and the bottom surface is less than or equal to 0.39.

5. The valve cartridge of claim 4, wherein the height of the installation ledge is between 0.486 and 0.494 inches.

6. The valve cartridge of claim 1, wherein a pin secures the actuating mechanism in the housing so that the actuating mechanism is operable to pivot about the pin, and
 wherein a ratio of the height of the installation ledge on the housing to a height of a center of the pin from the bottom surface of the housing is less than or equal to 0.55.

7. The valve cartridge of claim 6, wherein the height of the installation ledge is between 0.486 and 0.494 inches.

8. The valve cartridge of claim 1, wherein a ratio of the height of the installation ledge on the housing to a largest outer diameter of the housing is less than or equal to 0.53.

9. The valve cartridge of claim 8, wherein the height of the installation ledge is between 0.641 and 0.651 inches.

10. The valve cartridge of claim 1, wherein a ratio of the height of the installation ledge on the housing to a height of the housing between the top surface and the bottom surface is less than or equal to 0.49.

11. The valve cartridge of claim 10, wherein the height of the installation ledge is between 0.641 and 0.651 inches.

12. The valve cartridge of claim 1, wherein a pin secures the actuating mechanism in the housing so that the actuating mechanism is operable to pivot about the pin, and
 wherein a ratio of the height of the installation ledge on the housing to a height of a center of the pin from the bottom surface of the housing is less than or equal to 0.67.

13. The valve cartridge of claim 12, wherein the height of the installation ledge is between 0.641 and 0.651 inches.

14. The valve cartridge of claim 1, wherein the installation ledge is located below a lowermost portion of the actuating mechanism.

15. The valve cartridge of claim 14, wherein the installation ledge is located above the fluid control member.

16. The valve cartridge of claim 1, wherein the installation ledge extends around an outer circumference of the housing.

17. The valve cartridge of claim 1, wherein the housing is a unitary body.

18. The valve cartridge of claim 1, wherein the second portion of the actuating mechanism is spherical.

19. A valve cartridge for controlling a flow rate and a mixture ratio of cold water and hot water and operable to be secured in a valve body by a retaining member, the valve cartridge comprising:
 a housing having a domed portion proximate a top surface of the housing and a cylindrical portion proximate a bottom surface of the housing;
 an actuating mechanism;
 a movable control member; and a fixed control member, wherein at least one of the movable control member and the fixed control member are disposed in the cylindrical portion of the housing, wherein a first portion of the actuating mechanism extends through an opening in the top surface of the housing and a second portion of the actuating mechanism is disposed in the domed portion of the housing, wherein movement of the actuating mechanism about a first axis is operable to move the movable control member relative to the fixed control member to vary the flow rate of at least one of the cold water and the hot water, wherein movement of the actuating mechanism about a second axis is operable to move the movable control member relative to the fixed control member to vary the mixture ratio of the cold water and the hot water, wherein an installation ledge is formed where the domed portion of the housing meets the cylindrical portion of the housing, the installation ledge being the highest point on the housing for contacting the retaining member, a height of the installation ledge being the height from the bottom surface of the housing to the installation ledge, and wherein the installation ledge is closer to the bottom surface of the housing than the top surface of the housing.

20. The valve cartridge of claim 19, wherein the installation ledge is located below a lowermost portion of the actuating mechanism.

21. The valve cartridge of claim 20, wherein the installation ledge is above the fixed control member.

22. The valve cartridge of claim 20, further comprising a mixing chamber within the housing for mixing the cold water and the hot water, and wherein the installation ledge is located above the mixing chamber.

23. The valve cartridge of claim 19, wherein the installation ledge extends around an outer circumference of the housing.

24. The valve cartridge of claim 19, wherein the housing is a unitary body.

25. The valve cartridge of claim 19, wherein the second portion of the actuating mechanism is spherical.

* * * * *